US012469331B2

(12) United States Patent
Iwasaki

(10) Patent No.: US 12,469,331 B2
(45) Date of Patent: Nov. 11, 2025

(54) DISPLAY APPARATUS AND DISPLAY SYSTEM

(71) Applicant: SONY GROUP CORPORATION, Tokyo (JP)

(72) Inventor: Masanori Iwasaki, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 55 days.

(21) Appl. No.: 18/562,937

(22) PCT Filed: Jan. 28, 2022

(86) PCT No.: PCT/JP2022/003205
§ 371 (c)(1),
(2) Date: Nov. 21, 2023

(87) PCT Pub. No.: WO2022/249544
PCT Pub. Date: Dec. 1, 2022

(65) Prior Publication Data
US 2024/0221424 A1    Jul. 4, 2024

(30) Foreign Application Priority Data
May 28, 2021    (JP) ................. 2021-090055

(51) Int. Cl.
*G06V 40/18*     (2022.01)
*G06F 3/14*      (2006.01)
*G06V 10/141*    (2022.01)

(52) U.S. Cl.
CPC ............. *G06V 40/193* (2022.01); *G06F 3/14* (2013.01); *G06V 10/141* (2022.01)

(58) Field of Classification Search
CPC ...... G06V 40/193; G06V 10/141; G06F 3/14; A61F 2/1605; A61F 2/16; G02B 27/0075;
(Continued)

(56) References Cited

U.S. PATENT DOCUMENTS

2010/0149073  A1*  6/2010  Chaum ............... G02B 27/0075
                                                             345/8
2014/0266990  A1   9/2014  Makino
                           (Continued)

FOREIGN PATENT DOCUMENTS

EP         3435138        1/2019
JP         H02-224636     9/1990
                       (Continued)

OTHER PUBLICATIONS

International Search Report and Written Opinion prepared by the Japan Patent Office on Apr. 7, 2022, for International Application No. PCT/JP2022/003205, 2 pgs.

*Primary Examiner* — John W Miller
*Assistant Examiner* — Omer Khalid
(74) *Attorney, Agent, or Firm* — Sheridan Ross PC

(57) ABSTRACT

The present technology provides a display apparatus capable of improving visibility of a display image. The display apparatus according to the present technology includes an irradiation system that radiates light to at least a part of a second region outside a first region corresponding to a central visual field of a retina of at least one of both eyes of a user. In accordance with the present technology, the display apparatus capable of improving visibility of the display image can be provided.

30 Claims, 52 Drawing Sheets

(58) Field of Classification Search
CPC .... G02B 2027/0123; G02B 2027/0147; G02B 27/0172; G02B 27/02; G02B 27/017; G02C 7/04; G03B 21/006; G03B 21/2033; H04N 13/332
USPC ............................................ 348/78; 345/633
See application file for complete search history.

(56) References Cited

U.S. PATENT DOCUMENTS

| | | |
|---|---|---|
| 2017/0038588 A1 | 2/2017 | Passmore |
| 2017/0357089 A1 | 12/2017 | Tervo |
| 2018/0033405 A1* | 2/2018 | Tall ........................... G06T 9/00 |
| 2018/0367769 A1 | 12/2018 | Greenberg |
| 2019/0079284 A1 | 3/2019 | Le Provost |
| 2019/0302459 A1* | 10/2019 | Wiemer ............... H04N 9/3141 |
| 2019/0349575 A1 | 11/2019 | Knepper |
| 2019/0355287 A1* | 11/2019 | Lemoff .............. G02B 27/0172 |
| 2020/0348518 A1 | 11/2020 | Georgiou |
| 2020/0393678 A1 | 12/2020 | Leuenberger et al. |

FOREIGN PATENT DOCUMENTS

| | | |
|---|---|---|
| JP | H09-009253 | 1/1997 |
| JP | 2010-506240 | 2/2010 |
| JP | 2014-209256 | 11/2014 |
| JP | 2018-538573 | 12/2018 |
| WO | WO 2019/101994 | 5/2019 |

\* cited by examiner

DISPLAY APPARATUS AND DISPLAY SYSTEM

CROSS REFERENCE TO RELATED APPLICATIONS

This application is a national stage application under 35 U.S.C. 371 and claims the benefit of PCT Application No. PCT/JP2022/003205, having an international filing date of 28 Jan. 2022, which designated the United States, which PCT application claimed the benefit of Japanese Patent Application No. 2021-090055, filed 28 May 2021, the entire disclosures of each of which are incorporated herein by reference.

TECHNICAL FIELD

The technology according to the present disclosure (hereinafter, also referred to as "present technology") relates to a display apparatus and a display system.

BACKGROUND ART

In recent years, technologies for improving human visual perception have been developed actively.

For example, Patent Literatures 1 and 2 have disclosed technologies for improving peripheral vision by correcting aberrations of light beams reaching a peripheral visual field (at the periphery of a visual field area).

CITATION LIST

Patent Literature

Patent Literature 1: Japanese Patent Application Laid-open No. 2014-209256
Patent Literature 2: Japanese Unexamined Patent Application Publication No. 2010-506240

DISCLOSURE OF INVENTION

Technical Problem

However, there is room for improvement associated with improving visibility of a display image in the technologies disclosed in Patent Literatures 1 and 2.

In view of this, it is a main object of the present technology to provide a display apparatus capable of improving visibility of a display image and a display system including the display apparatus.

Solution to Problem

The present technology is a display apparatus including an irradiation system that radiates light to at least a part of a second region outside a first region corresponding to a central visual field of a retina of at least one of both eyes of a user.

The central visual field may have a visual angle of 3 degrees or less.

The central visual field may have a visual angle of 6.5 degrees or less.

The first region may be included in a fovea centralis of the retina.

A center of the central visual field may substantially correspond to a center of a fovea centralis of the retina.

A center of the first region may substantially match a center of a fovea centralis of the retina.

The second region may be positioned outside a fovea centralis of the retina.

The irradiation system may radiate the light only to at least the part of the second region.

The second region may include a peripheral visual field corresponding region on the retina, the peripheral visual field corresponding region corresponding to a peripheral visual field, and the irradiation system may radiate the light to at least the peripheral visual field corresponding region.

The peripheral visual field corresponding region may include a region corresponding to areas in which visual field areas of the both eyes overlap each other, the areas excluding the central visual field, and the irradiation system may radiate the light to at least the region.

The peripheral visual field corresponding region may include a region corresponding to an inside of a visual field area of one eye of the both eyes and an outside of a visual field area of another eye, and the irradiation system may radiate the light to at least a region of a retina of the one eye of the both eyes, the region corresponding to an inside of the visual field area of the one eye and an outside of the visual field area of the other eye.

The peripheral visual field corresponding region may include a region corresponding to an outside of a visual field area of one eye of the both eyes and an inside of a visual field area of another eye, and the irradiation system may radiate the light to at least a region on the retina of the one eye of the both eyes, the region corresponding to an outside of the visual field area of the one eye and an inside of the visual field area of the other eye.

The second region may include a binocular visual field area outside corresponding region on the retina, the binocular visual field area outside corresponding region corresponding to an outside of visual field areas of the both eyes, and the irradiation system may radiate the light to at least the binocular visual field area outside corresponding region.

The second region may further include a binocular visual field area outside corresponding region on the retina, the binocular visual field area outside corresponding region corresponding to an outside of visual field areas of the both eyes, and the irradiation system may radiate the light to the peripheral visual field corresponding region and the binocular visual field area outside corresponding region.

The irradiation system may also radiate light to the first region, and a resolution of an image displayed by the light radiated to the second region may be lower than a resolution of an image displayed by the light radiated to the first region.

The second region may include a peripheral visual field corresponding region on the retina, the peripheral visual field corresponding region corresponding to a peripheral visual field.

The peripheral visual field corresponding region may include a first peripheral visual field corresponding region corresponding to areas in which visual field areas of the both eyes overlap each other, the areas excluding the central visual field, and a second peripheral visual field corresponding region corresponding to an inside of a visual field area of one eye of the both eyes and an outside of a visual field area of another eye, the irradiation system may radiate the light to the first peripheral visual field corresponding region and the second peripheral visual field corresponding region on the retina of the one eye of the both eyes, and a resolution of an image displayed by the light radiated to the second peripheral visual field corresponding region may be lower than a resolution of an image displayed by the light radiated to the first peripheral visual field corresponding region and/or the light that displays content simpler than content displayed by the light radiated to the first peripheral visual field corresponding region may be radiated to the second peripheral visual field corresponding region.

The peripheral visual field corresponding region may include a first peripheral visual field corresponding region corresponding to areas in which visual field areas of the both eyes overlap each other, the areas excluding the central visual field, and a third peripheral visual field corresponding region corresponding to an outside of the visual field area of the one eye of the both eyes and an inside of the visual field area of another eye, the irradiation system may radiate the light to the first peripheral visual field corresponding region and the third peripheral visual field corresponding region on the retina of the one eye of the both eyes, and a resolution of an image displayed by the light radiated to the first peripheral visual field corresponding region may be lower than a resolution of an image displayed by the light radiated to the third peripheral visual field corresponding region and/or the light that displays content simpler than content displayed by the light radiated to the first peripheral visual field corresponding region may be radiated to the third peripheral visual field corresponding region.

The peripheral visual field corresponding region may include a second peripheral visual field corresponding region corresponding to an inside of a visual field area of one eye of the both eyes and an outside of a visual field area of another eye, and a third peripheral visual field corresponding region corresponding to an outside of the visual field area of the one eye and an inside of the visual field area of the other eye, the irradiation system may radiate the light to the second peripheral visual field corresponding region and the third peripheral visual field corresponding region on the retina of the one eye of the both eyes, and an image displayed by the light radiated to the second peripheral visual field corresponding region and an image displayed by the light radiated to the third peripheral visual field corresponding region may be different from each other in resolution and/or simplicity of display content.

The resolution of the image displayed by the light radiated to the second peripheral visual field corresponding region may be lower than the resolution of the image displayed by the light radiated to the third peripheral visual field corresponding region and/or the content displayed by the light radiated to the second peripheral visual field corresponding region may be simpler than the content displayed by the light radiated to the third peripheral visual field corresponding region.

The resolution of the image displayed by the light radiated to the second peripheral visual field corresponding region may be lower than the resolution of the image displayed by the light radiated to the third peripheral visual field corresponding region and/or the content displayed by the light radiated to the second peripheral visual field corresponding region may be simpler than the content displayed by the light radiated to the third peripheral visual field corresponding region.

The second region may further include a binocular visual field area outside corresponding region on the retina, the binocular visual field area outside corresponding region corresponding to an outside of visual field areas of the both eyes, the irradiation system may radiate the light to the peripheral visual field corresponding region and the binocular visual field area outside corresponding region, and a resolution of an image displayed by light radiated to the binocular visual field area outside corresponding region may be lower than a resolution of an image displayed by light radiated to the peripheral visual field corresponding region and/or content displayed by the light radiated to the binocular visual field area outside corresponding region may be simpler than content displayed by the light radiated to the peripheral visual field corresponding region.

The irradiation system may change an irradiation area so that light radiated to one region on the retina is radiated to another region.

The one region may be a region on the retina in which a visual field of the user is not ensured, and the other region may be a region on the retina in which the visual field of the user is ensured.

The region in which the visual field of the user is not ensured may include a visual field region lost due to a defect of the visual field.

The region in which the visual field of the user is not ensured may include a region on the retina, the region corresponding to an outside of visual field areas of the both eyes.

The irradiation system may include a display element integrated with one eye of the both eyes and/or a display element integrated with another eye at least during use.

The display element may be a display element wearable on an eye.

The display element may be a display element implantable in an eye.

The display element may be a self light emitting-type display element.

The display element may include a light deflector and a light source.

The display element may include a liquid-crystal display unit and a light source.

The irradiation system may include an optical element integrated with one eye of the both eyes and/or an optical element integrated with another eye at least during use, and a light projection unit that projects light toward the optical element.

The optical element may be an optical element wearable on the eyes.

The optical element may be an optical element implantable in the eyes.

The light projection unit may include a light deflector and a light source.

The light projection unit may include a self-light-emitting element or a liquid-crystal display unit and a light source.

The present technology also provides a display system, including:
the above-mentioned display apparatus; and
a control apparatus that controls the display apparatus.

MODE(S) FOR CARRYING OUT THE INVENTION

Figure 1A:
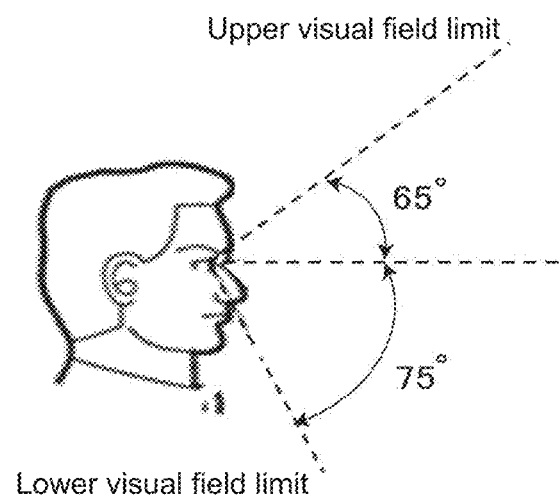
FIG. 1A is a view for describing a conventional vertical visual field area.

Hereinafter, favorable embodiments of the present technology will be described in detail with reference to the accompanying drawings. It should be noted that in the present specification and the drawings, components having substantially the same functional configurations will be denoted by the same reference signs and duplicate descriptions thereof will be omitted. The embodiments described below represent typical embodiments of the present technology. The scope of the present technology should not be understood narrowly due to these embodiments. In the present specification, even in a case where it is described that each of a display apparatus and a display system according to the present technology provides a plurality of effects, each of the display apparatus and the display system according to the present technology only needs to provide at least one of the effects. The effects described in the present specification are merely exemplary and not limitative and other effects may be provided.

Moreover, descriptions will be given in the following order.
1. Introduction
2. Normal Field-of-View Area
3. Extended Field-of-View Area
4. Ambient Light Irradiation Area
5. Central Field-of-View and First Region
6. Second Region
7. Display Apparatus According to First Embodiment of Present Technology
  (1) Display Apparatus According to Example 1
  (2) Display Apparatus According to Example 2
  (3) Display Apparatus According to Example 3
  (4) Display Apparatus According to Example 4
  (5) Display Apparatus According to Example 5
  (6) Display Apparatus According to Example 6
  (7) Display Apparatus According to Example 7
  (8) Display Apparatus According to Example 8
8. Display Apparatus According to Second Embodiment of Present Technology
  (1) Display Apparatus According to Example 1
  (2) Display Apparatus According to Example 2
  (3) Display Apparatus According to Example 3
  (4) Display Apparatus According to Example 4
  (5) Display Apparatus According to Example 5
  (6) Display Apparatus According to Example 6
  (7) Display Apparatus According to Example 7
  (8) Display Apparatus According to Example 8
9. Display Apparatus According to Modified Example of First Embodiment of Present Technology
10. Display Apparatus According to Modified Example of Second Embodiment of Present Technology
11. Display Apparatus According to Modified Example 1 of Present Technology
12. Display Apparatus According to Modified Example 2 of Present Technology
13. Display Apparatus According to Modified Example 3 of Present Technology
14. Display System According to Third Embodiment of Present Technology
15. Other Modified Example of Present Technology 1. Introduction Human visual field areas are normally limited by light beam angles of ambient light that can enter retinas of both eyes. Here, the ambient light refers to light including, for example, natural light such as sun light and artificial light such as illumination light.

Most humans do various activities relying on visual information in such certain visual field areas.

There is conventionally known an augmented reality (AR) display technology of displaying an image superimposed in visual field areas. According to this AR-display technology, the image is normally displayed in the visual field areas at a uniform resolution. However, for example, it is known that visual perception in peripheral visual fields of a visual field area is significantly inferior to visual perception in a central visual field, and uniformly allocating a limited number of pixels to the entire region of the visual field area is not necessarily effective in terms of an improvement in visibility.

Moreover, binocular rivalry may occur for example in a case where different images appear in visual field areas of both eyes. It can be a big problem for an improvement in visibility.

In view of this, the inventor has made a display apparatus according to the present technology as a display apparatus capable of improving visibility of a display image and a display system including the display apparatus as a result of great effort.

2. Normal Visual Field Area

Hereinafter, the following definitions will be used: a direction toward the front side from the rear side of the face is a front direction; a direction toward the rear side from the front side of the face is a rear direction; a direction toward the lower side from the upper side of the face is a lower direction; a direction toward the upper side from the lower side of the face is an upper direction; a direction toward the right-hand side from the left-hand side of the face is a right-hand direction; and a direction toward the left-hand side from the right-hand side of the face is a left-hand direction.

A normal vertical visual field area of each eye (e.g., in a vertical direction (the same shall apply hereafter)) can be defined as an area between an upper visual field limit forming an angle of 65 degrees, for example, upward with respect to the line of sight direction facing directly forward (a direction in which the ambient light enters at this angle) and a lower visual field limit forming an angle of 75 degrees, for example, downward with respect to the line of sight direction (a direction in which the ambient light enters at this angle), for example, as shown in FIG. 1A.

Figure 1B:
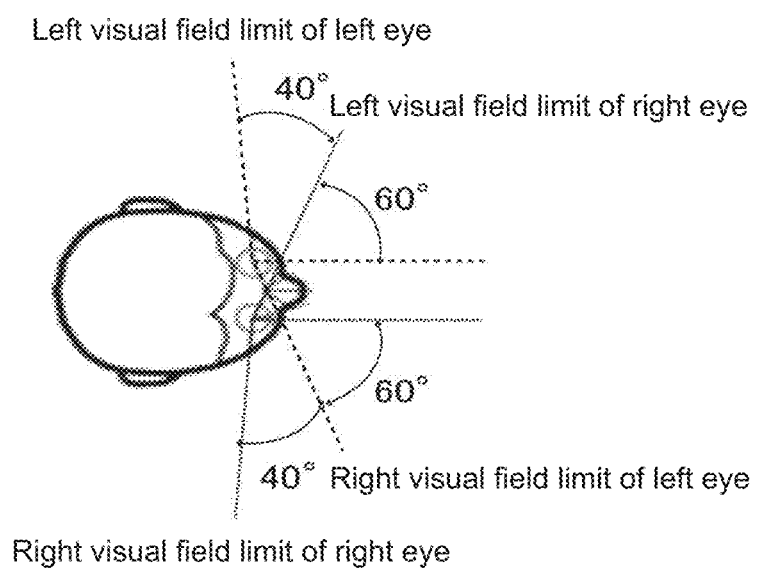
FIG. 1 B is a view for describing a conventional horizontal visual field area.

A normal horizontal visual field area of the right eye (e.g., in a horizontal direction (the same shall apply hereafter)) can be defined as an area between a right-hand visual field limit forming an angle of 100 degrees, for example, rightward with respect to the line of sight direction facing directly forward (a direction in which the ambient light enters at this angle) and a left-hand visual field limit forming an angle of 60 degrees, for example, leftward with respect to the line of sight direction (a direction in which the ambient light enters at this angle), for example, as shown in FIG. 1 B.

A normal horizontal visual field area of the left eye can be defined as an area between a left-hand visual field limit forming an angle of 100 degrees, for example, leftward with respect to the line of sight direction facing directly forward (a direction in which the ambient light enters at this angle) and a right-hand visual field limit forming an angle of 60 degrees, for example, rightward with respect to the line of sight direction (a direction in which the ambient light enters at this angle)), for example, as shown in FIG. 1 B.

Figure 2:
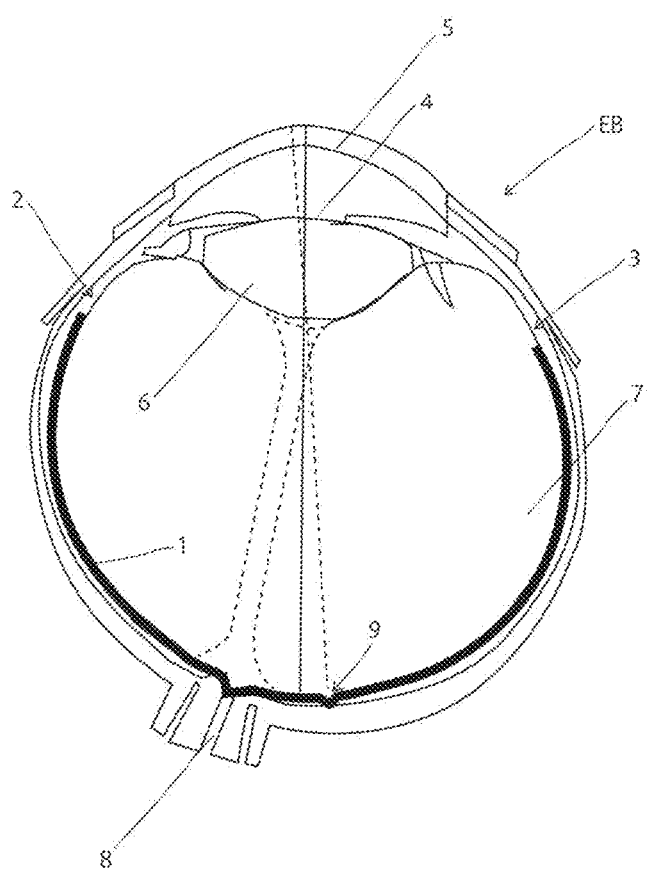
FIG. 2 A horizontal cross-sectional view of an eyeball.

By the way, as shown in FIG. 2 (extract from pp. 190 of "sensation+perception" published by SEISHIN SHOBO), a light beam enters an eyeball EB, passes through a cornea 5, a pupil 4, a lens 6, and a vitreous body 7 and reaches a retina 1.

Human visual perception is achieved in such a manner that light radiated to the retina 1 is converted into electrical signals by photoreceptor cells of the retina 1 and transmitted to a visual cortex of the brain through an optic nerve 8.

As shown in FIG. 2, the retina 1 in the eyeball EB is found in substantially the entire region from the fundus to a ciliary body adjacent to the periphery of the lens (a position adjacent to the ciliary body shown in the cross-section of the eyeball) (in a substantially spherical shell shape, and more particularly, in a state in which the spherical shell is partially cut).

However, for example, the face and head limit an area of the ambient light radiated to the retina 1 via the pupil 4 and only a light beam in a certain area reaches the retina 1 via the pupil 4 as an image. The certain area of this light beam of the ambient light that reaches the retina 1 via the pupil 4 is a normal visual field area. Hereinafter, the area on the retina 1 to which the ambient light is radiated via the pupil 4 will be also referred to as an "ambient light irradiation area". That is, the ambient light irradiation area is an area on the retina 1, which corresponds to the normal visual field area. In the present specification, the "visual field area" means the "normal visual field area" unless otherwise stated herein.

Figure 3A:
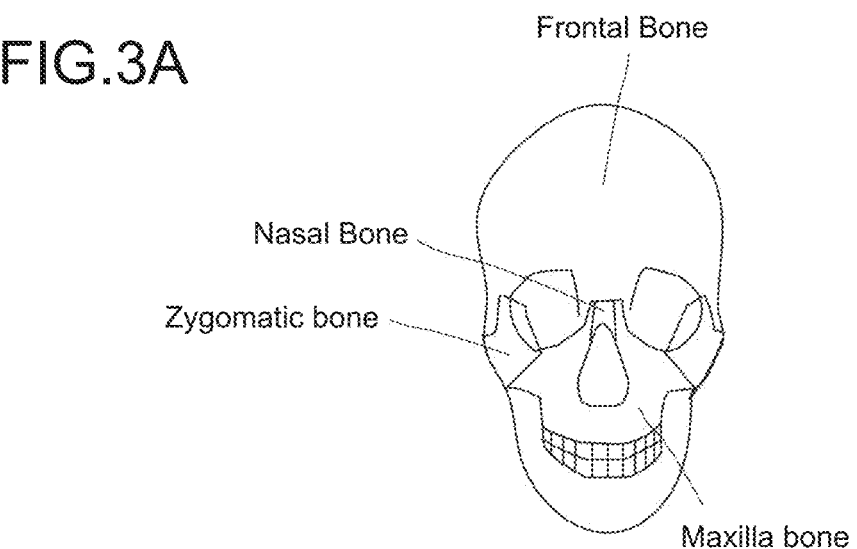
FIG. 3A is a schematic front view of a skull.
Figure 3B:
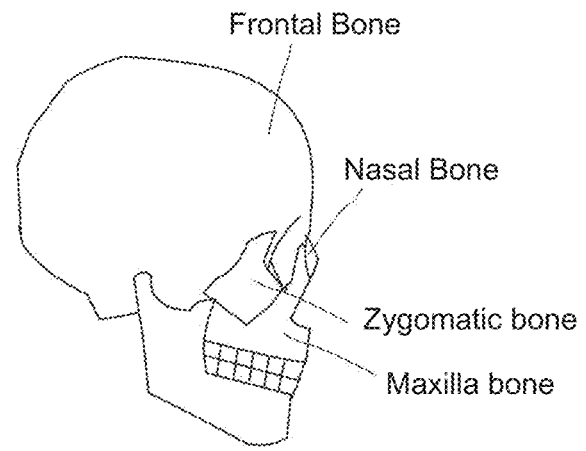
FIG. 3 B is a schematic right side view of the skull.

The contours formed by a frontal bone positioned on the upper side, a maxilla bone and zygomatic bones positioned on the lower side, and a nasal bone positioned horizontally inside as viewed from the eyeballs, for example, shown FIG. 3A and FIG. 3 B limit the visual fields. Since only an outside of the horizontal visual field among such visual fields is not limited by skeletons, it provides the widest visual field.

Figure 4:
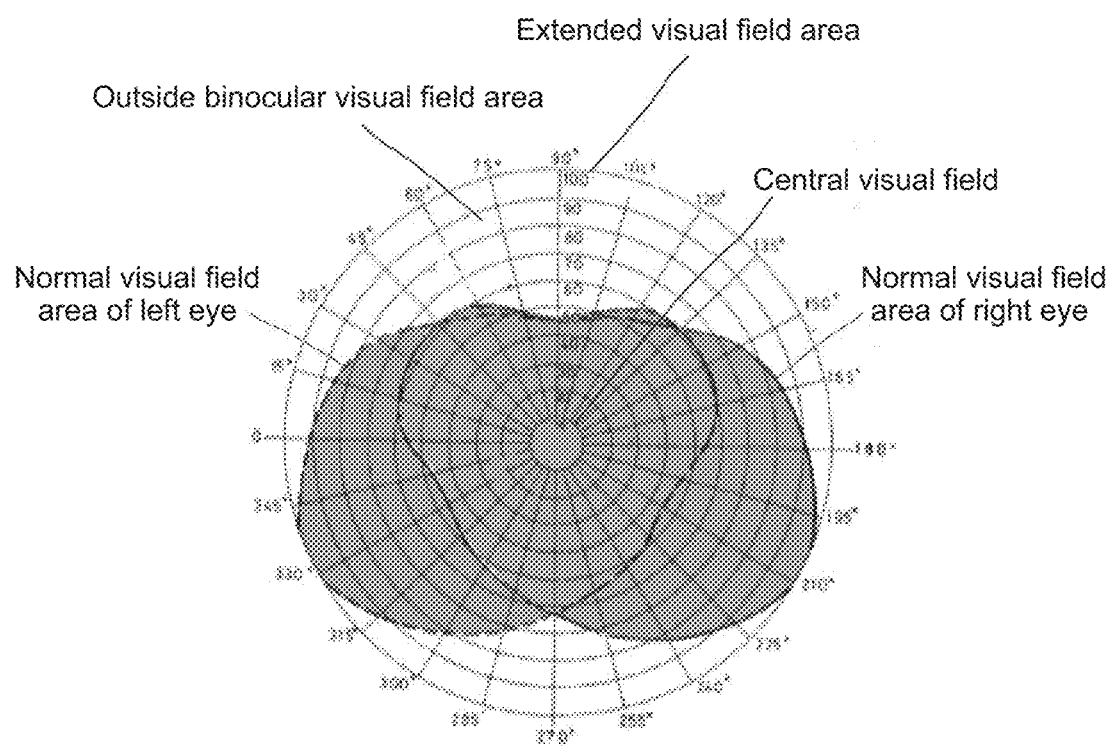
FIG. 4 A diagram for describing normal visual field areas.

Conversely, no light beams of the ambient light outside the normal visual field area reach the retina as an image. At a position on the retina that no light beams reach, photoreceptor cells are not stimulated by light and are not activated, so the photoreceptor cells do not transmit visual information to the optic nerve (no visual perception can be provided). FIG. 4 shows normal visual field areas (the gray color areas in FIG. 4) corresponding to ambient light irradiation areas of the respective eyes. In FIG. 4, the normal visual field area of the right eye is shown as the solid line and the normal visual field area of the left eye is shown as the broken line. In FIG. 4, a minimum circle positioned at the center is a central visual field and areas obtained by removing the central visual field from an area combining the visual field areas (normal visual field areas) of the both eyes are peripheral visual fields.

In this manner, photoreceptor cells are widely found on the retinas in the eyeballs.

However, there is a problem in that no visual perception can be provided in areas that the face, head, and the like prevent light from reaching (regions outside the ambient light irradiation area, white areas in FIG. 4).

Here, it has been reported that light in chest and neck outside the normal visual field area can be seen when transcranial magnetic stimulation (TMS) is applied to the visual cortex of the brain (Reference Document: Hideyuki Matsumoto "Single-pulse stimulation" in Japanese journal of clinical neurophysiology, 40(4)).

Although it relates to the visual field of the brain, it suggests that if light can be radiated to the area of the retina that no light reaches normally by some method, electrical signals are generated by photoreceptor cells in this area and processed as an image by the visual field. That is, it suggests that radiating light to this area can provide visual perception.

Moreover, the eyeball structure is approximately rotationally symmetric (see FIG. 2) except for distributions of photoreceptor cells on the retina (they are different between the nose side and the ear side). It can be thus considered that if there is no limitation due to the shapes of the face and the head, visual perception can also be provided in a uniform area in the upper and lower and left- and right-hand directions or an area on the retina 1 in which photoreceptor cells are found other than the area corresponding to the normal visual field area.

That is, it can be considered that if the area on the retina that no ambient light reaches (the region outside the ambient light irradiation area) can be irradiated with light, visual perception can also be provided from photoreceptor cells in this area, and information can be displayed and visually recognized in a wider area than the normal visual field area (see FIG. 4).

In order to demonstrate it, the inventor has verified whether or not light can be seen in the region outside the visual field area by using RETISSA OptHead (retinal projector) with horizontal display of 60 degrees. Specifically, in a case of verifying the upper side, a moving display positioned upward at 60 degrees was able to be seen even when looking at a gazing point set at a lower end of the screen with the eyeballs oriented downward. In a case of verifying the nose side, a moving display positioned on the nose side at 60 degrees was able to be seen even when looking at a gazing point set on a side opposite to the nose side with the eyeballs oriented on the side opposite to the nose side. These experiments suggest that the retina is found in all directions. The inventor has concluded that the image display area can be larger than in the prior art.

3. Extended Visual Field area

As described above, an extended visual field area obtained by extending the normal visual field area to a potential visual field area can be defined.

The extended visual field area of each eye can be considered, divided into a vertical area (an area in the vertical cross-section) and a horizontal area (an area in the horizontal cross-section).

Figure 5A:
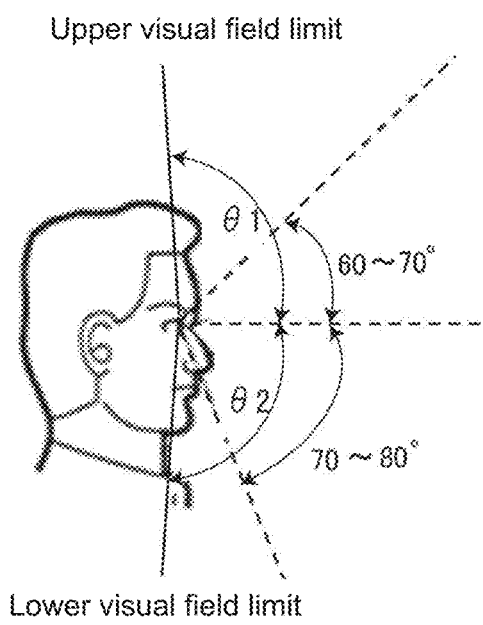
FIG. 5A is a view for describing an extended visual field area with respect to a vertical direction.

The vertical extended visual field area of each eye can be defined as an area between an upper visual field limit forming an angle of $\theta1$ (e.g., $\theta1 \geq 70$ degrees) with respect to the horizontal direction in FIG. 5A and a lower visual field limit forming an angle of $\theta2$ (e.g., $\theta2 \geq 80$ degrees) with respect to the horizontal direction.

Figure 5B:
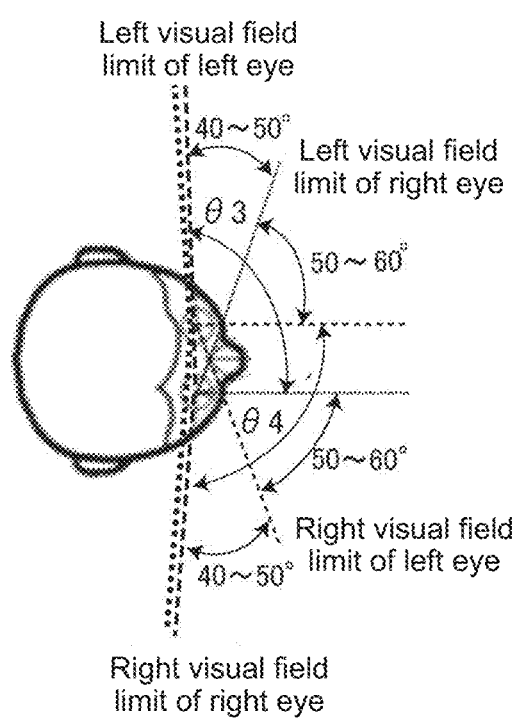
FIG. 5 B is a view for describing an extended visual field area with respect to a horizontal direction.

The extended visual field area of each eye in the horizontal direction can be defined as an area between a left-hand visual field limit of the left eye forming an angle of $\theta3$ (e.g., $\theta3 \geq 60$ degrees) with respect to the front direction in FIG. 5 B and a right-hand visual field limit of the right eye forming an angle of $\theta4$ (e.g., $\theta4 \geq 60$ degrees) with respect to the front direction. That is, the extended visual field area of each eye in the horizontal direction includes normal visual field areas of the both eyes in the horizontal direction.

4. Ambient Light Irradiation Area

The ambient light irradiation area is an area on the retina 1 to which the ambient light is radiated via the pupil 4 as described above.

The ambient light irradiation area depends on sites of the face (e.g., nose, eyelids, eyelashes, and eye corners) in the periphery of the retina 1, which prevent the ambient light from reaching the retina 1, and/or an object worn by the face or head.

Examples of the object can include eyeglasses, a helmet, a mask for covering the mouth and nose, and a band for wrapping the face and head.

The ambient light irradiation area can be considered, divided into a horizontal area (an area in the horizontal cross-section) and a vertical area (an area in the vertical cross-section) on the retina.

(Horizontal Ambient Light Irradiation Area)

Hereinafter, a horizontal ambient light irradiation area 10H on the retina (in the horizontal cross-section) will be described.

Figure 6:
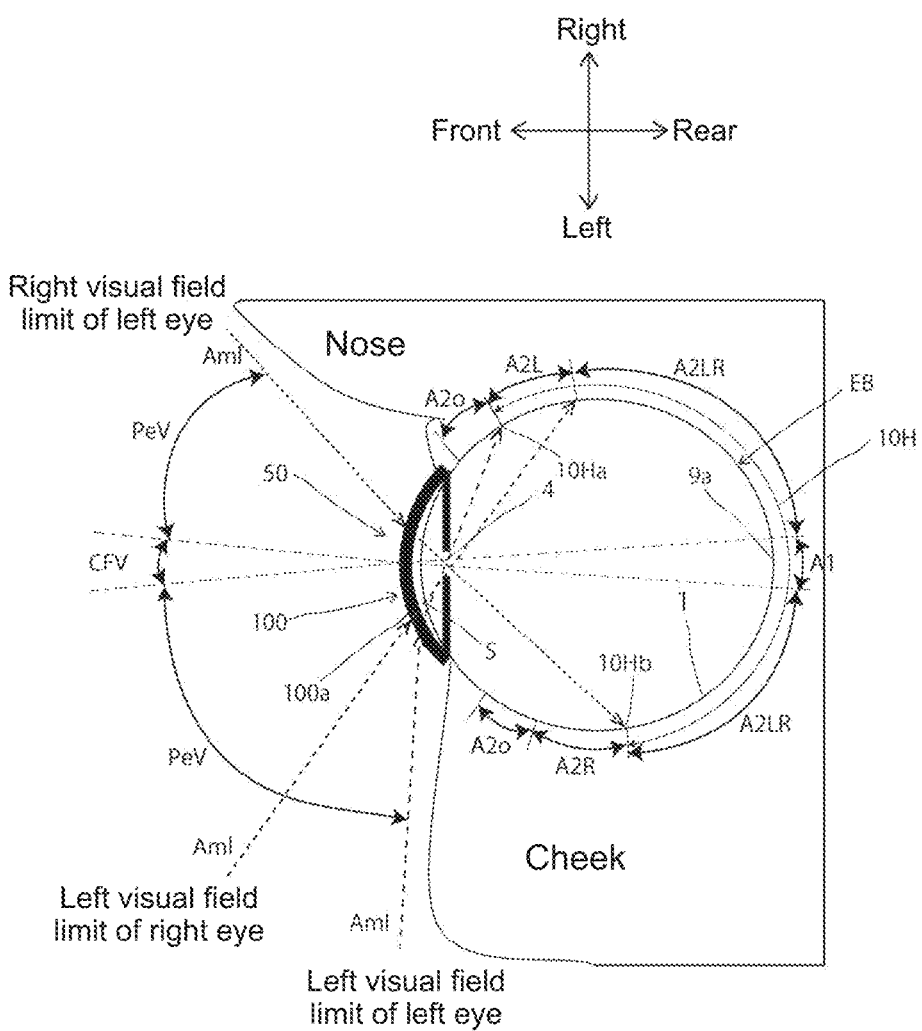
FIG. 6 A horizontal cross-sectional view for describing configurations and functions of a display apparatus according to a first embodiment of the present technology.

Here, an ambient light irradiation area in one horizontal cross-section of the retina of the left eye (e.g., a horizontal cross-section passing through the center of the pupil) as shown in FIG. 6 will be described as an example. However, a similar discussion can be established also as to an ambient light irradiation area in another horizontal cross-section on the retina of the left eye.

As shown in FIG. 6, the horizontal ambient light irradiation area 10H on the retina of the left eye 1 is a substantially C-shaped area of the horizontal cross-section with a gap on the side of the pupil 4. Similarly, a horizontal ambient light irradiation area on the retina of the right eye is also a substantially C-shaped area of the horizontal cross-section with a gap on the side of the pupil.

As shown in FIG. 6, a position on the retina 1 that ambient light Aml reaches is a right end 10Ha of the horizontal ambient light irradiation area 10H on the retina of the left eye 1, the ambient light Aml having entered the left eye from the left-hand visual field limit of the left eye (a direction forming an angle of 90 degrees to 110 degrees, for example, on the left-hand side with respect to a direction perpendicular to a radial direction of the pupil 4) and passed through the pupil 4. A position on the retina 1 that ambient light Aml reaches is a left end 10Hb of the horizontal ambient light irradiation area 10H on the retina of the left eye 1, the ambient light Aml having entered the left eye from the left-hand visual field limit (a direction forming an angle of 50 degrees to 60 degrees, for example, on the right-hand side with respect to the direction perpendicular to the radial direction of the pupil 4) and passed through the pupil 4.

Similarly, a position on the retina that ambient light reaches is a left end of the horizontal ambient light irradiation area on the retina of the right eye, the ambient light having entered the eyeball of the right eye from the right-hand visual field limit of the right eye (a direction forming an angle of 90 degrees to 110 degrees, for example, on the right-hand side with respect to the direction perpendicular to the radial direction of the pupil) and passed through the pupil. A position on the retina that ambient light reaches is a right end of the horizontal ambient light irradiation area on the retina of the right eye, the ambient light having entered the right eye from the right-hand visual field limit of the right eye (a direction forming an angle of 50 degrees to 60 degrees, for example, on the left-hand side with respect to the direction perpendicular to the radial direction of the pupil) and passed the pupil.

(Vertical Ambient Light Irradiation Area)

Hereinafter, a vertical ambient light irradiation area 10V on the retina 1 (in the vertical cross-section) will be described.

Figure 7:
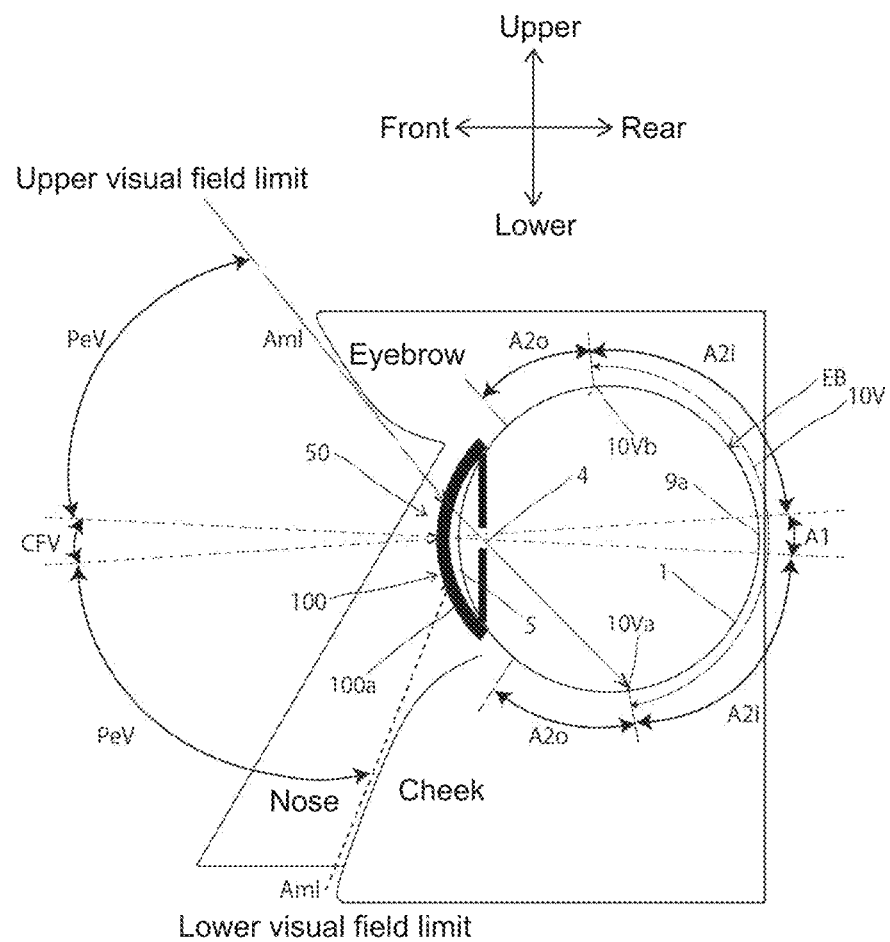
FIG. 7 A vertical cross-sectional view for describing configurations and functions of the display apparatus according to the first embodiment of the present technology.

Here, an ambient light irradiation area in one vertical cross-section of the retina of the left eye (e.g., a vertical cross-section passing through the center of the pupil) as shown in FIG. 7 will be described as an example. However, a similar discussion can be established also as to an ambient light irradiation area in another vertical cross-section of the retina of the left eye and an ambient light irradiation area in an arbitrary cross-section of the retina of the right eye. It should be noted that the vertical ambient light irradiation areas on the retinas of the both eyes can be considered to be substantially the same with no problem.

As shown in FIG. 7, the vertical ambient light irradiation area 10V on the retina of the left eye 1 is a substantially C-shaped area of the vertical cross-section with a gap on the side of the pupil 4. Similarly, the vertical ambient light irradiation area of the right eye is also a substantially C-shaped area of the vertical cross-section with a gap on the side of the pupil.

As shown in FIG. 7, a position on the retina 1 that the ambient light Aml reaches is a lower end 10Va of the vertical ambient light irradiation area 10V on the retina of the left eye 1, the ambient light Aml having entered the left eye from a direction forming an angle (e.g., 60 degrees to 70 degrees) on the upper side with respect to the upper visual field limit, i.e., the direction perpendicular to the radial direction of the pupil 4 (e.g., the horizontal direction) and passed through the pupil 4. A position on the retina 1 that the ambient light Aml reaches is an upper end 10Vb of the vertical ambient light irradiation area 10V on the retina of the left eye 1, the ambient light Aml having entered the left eye from the lower visual field limit (a direction forming an angle of 70 degrees to 80 degrees, for example, on the lower side with respect to the direction perpendicular to the radial direction of the pupil 4 (e.g., the horizontal direction)) and passed through the pupil 4.

Here, as shown in FIGS. 6 and 7, the normal visual field area of the left eye is divided into a central visual field CFV and peripheral visual fields PeV.

An area on the retina of the left eye 1, which corresponds to the extended visual field area, is divided into a first region A1 corresponding to the central visual field CFV and second regions A2 outside the first region A1. Here, a horizontal cross-section and a vertical cross-section of the left eye will be described with reference to FIGS. 6 and 7. However, a similar discussion can be established also as to a horizontal cross-section and a vertical cross-section of the right eye.

5. Central Visual Field and First Region

The central visual field CFV can be defined as a visual field area having a visual angle of 3 degrees or less as an example. This area is an area considering microsaccades. The central visual field CFV is a concept including a central vision (a visual angle of 1.5 degrees). Specifically, the visual angle of the central visual field CFV can be, for example, a one-side angle of 2 degrees obtained by adding 0.5 degrees that is a half of 1 degree of the amplitude of microsaccades to a visual angle of 1.5 degrees of the central vision. Moreover, the visual angle of the central visual field CFV can be a one-side angle of 2.5 to 3 degrees, assuming that variations due to individual differences are approximately 0.5 to 1 degrees.

The central visual field CFV can also be defined as a visual field area having a visual angle of 6.5 degrees or less as an example. This area is an area considering microsaccades. Specifically, the central visual field CFV can have, for example, a one-side angle of 5.5 degrees obtained by adding 0.5 degrees that is a half of 1 degree of the amplitude of microsaccades to a visual angle of 5 degrees of the fovea centralis 9. Moreover, the visual angle of the central visual field CFV can be a one-side angle of 6.0 to 6.5 degrees, assuming that variations due to individual differences are approximately 0.5 to 1 degrees.

The first region A1 corresponding to the central visual field CFV may be included in the fovea centralis 9 (see FIG. 2) of the retina 1 or may include the fovea centralis 9.

The center of the central visual field CFV can be considered to substantially correspond to a center 9a (foveola) of the fovea centralis 9 of the retina 1 with no problem.

The center of the first region A1 may be considered to substantially match the center 9a of the fovea centralis 9 of the retina 1.

The above discussion can be established as to not only the horizontal cross-section but also the vertical cross-section.

6. Second Region

The second regions A2 include, in the horizontal cross-section as shown in FIG. 6, peripheral visual field corresponding regions corresponding to the peripheral visual fields PeV and binocular visual field area outside corresponding regions A2o corresponding to the outside of the visual field areas of the both eyes (hereinafter, also referred to as "binocular visual field area outside").

The peripheral visual field corresponding regions include first peripheral visual field corresponding regions A2LR, a second peripheral visual field corresponding region A2L, and a third peripheral visual field corresponding region A2R.

The first peripheral visual field corresponding regions A2LR correspond to areas that are areas in which the visual field areas of the both eyes overlap each other and that exclude the central visual field CFV. The first peripheral visual field corresponding regions A2LR are positioned on both external sides (right-hand side and left-hand side) of the first region A1.

The second peripheral visual field corresponding region A2L corresponds to an area inside the visual field area of the left eye and outside the visual field area of the right eye. The second peripheral visual field corresponding region A2L is positioned on the front side of the first peripheral visual field corresponding regions A2LR on the right-hand side.

The third peripheral visual field corresponding region A2R corresponds to an area outside the visual field area of the left eye and inside the visual field area of the right eye. The third peripheral visual field corresponding region A2R is positioned on the front side of the first peripheral visual field corresponding regions A2LR on the left-hand side.

The binocular visual field area outside corresponding regions A2o are positioned on the front side of the second peripheral visual field corresponding region A2L and on the front side of the third peripheral visual field corresponding region A2R.

The second regions A2 include, in the vertical cross-section as shown in FIG. 7, peripheral visual field corresponding regions A2i corresponding to the peripheral visual fields PeV and the binocular visual field area outside corresponding regions A2o corresponding to the outside of the visual field areas of the both eyes.

The peripheral visual field corresponding regions A2i are positioned on both external sides (upper side and lower side) of the first region A1.

The binocular visual field area outside corresponding regions A2o are positioned on the front side of the peripheral visual field corresponding region A2i on the upper side and on the front side of the peripheral visual field corresponding region A2i on the lower side.

The second regions A2 are favorably positioned outside the fovea centralis 9 of the retina 1. It should be noted that the second regions A2 may be partially positioned inside the fovea centralis 9 of the retina 1.

7. Display Apparatus According to First Embodiment of Present Technology (Overall Configuration of Display Apparatus)

Hereinafter, a display apparatus according to a first embodiment of the present technology will be described.

Figure 8:
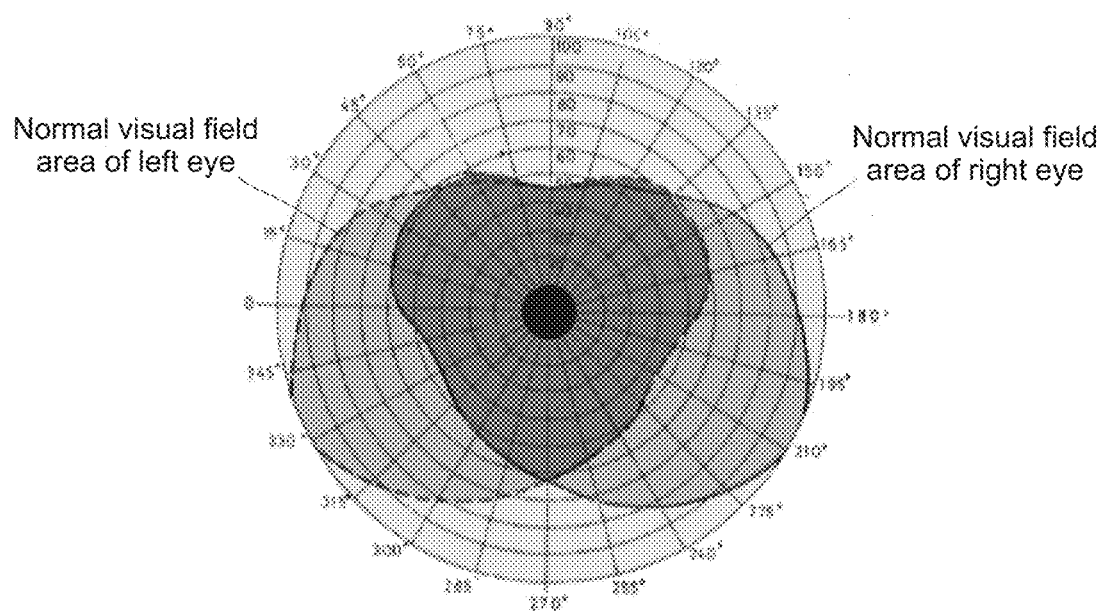
FIG. 8 A diagram showing a resolution distribution of regions in which an image is displayed by a display apparatus according to Example 1 of the present technology.

A display apparatus 50 according to the first embodiment radiates light (display light) to the retina 1 via the pupil 4 of the eyeball EB and displays an image of the light as shown in FIGS. 7 and 8.

The display light is light that displays brightness/darkness, a color pattern, a figure, a word, an image, etc.

The display apparatus 50 includes an irradiation system 100 that radiates light to at least a part of the second regions A2 outside the first region A1 corresponding to the central visual field CFV on the retina 1 of at least one of both eyes of the user. The irradiation system 100 may radiate light only to at least the part of the second regions A2 or may radiate light to the first region A1 besides the second regions A2.

The irradiation system 100 capable of irradiating the retina 1 with light via the pupil 4 as an example.

The irradiation system 100 includes a display element 100a integrated with the eyeball at least during use as an example. FIGS. 6 and 7 show a state in which the display element 100a is worn by the left eye as an example. It should be noted that the display element(s) 100a may be worn by the right eye in addition to or instead of the left eye.

The display element 100a is, for example, a display element wearable on an eye ball (contact lens-type). That is, the display element 100a is worn by the eyeball EB so as to cover the cornea 5 for use.

The display element 100a causes at least a part of light (e.g., visible light) having a particular wavelength to pass therethrough. Accordingly, the visible light of the ambient light Aml passes through the display element 100a in a state in which the display element 100a is worn by the eyeball EB of the user. Therefore, the user can visually recognize a real landscape (background) via the display element 100a.

The display element 100a may be, as an example, a self light emitting-type display element (e.g., a light emitting diode (LED) array or an organic electro-luminescence (organic EL) element array), may include a liquid-crystal display unit and a light source (e.g., light-emitting diode (LED)) that radiates light to the liquid-crystal display unit, and may include a light deflector (e.g., a micro electro mechanical systems (MEMS) mirror) and a light source (e.g., a laser) that radiates light to the light deflector.

More particularly, the display element 100a is, as an example, a display element with an ON chip structure.

The display element 100a is capable of irradiating the entire region of the retina 1, which corresponds to the extended visual field area including the normal visual field area, for example, with the display light (light).

The display element 100a is capable of irradiating an arbitrary position in the region of the retina 1, which corresponds to the extended visual field area including the normal visual field area, for example, with the display light.

The display element 100a is capable of performing image display (AR-display) superimposed on the background in the normal visual field area of the left eye by radiating light to the ambient light irradiation area on the retina of the left eye 1. The display element 100a is capable of displaying an image in an area of the left eye, which is inside the extended visual field area and outside the normal visual field area (an area of the left eye in which the background is not visually recognized) by radiating light to the binocular visual field area outside corresponding regions A2o on the retina of the left eye 1.

Here, an image displayed, superimposed on the background inside the normal visual field area of the extended visual field area, influences the visibility because the background can be seen through the image. On the other hand, an image displayed outside the normal visual field area in the extended visual field area does not influence the visibility because the background cannot be seen through the image. However, it is assumed to take time for the visual perception to function normally because it is a region in which the visual perception is not usually used.

By the way, a massive number of pixels is required for a display element in a case of displaying an image in the central visual field as well as an area outside the central visual field in the extended visual field area. For example, in a case of displaying an image in an area of 200 degrees in the horizontal direction in a display element having 2000 pixels horizontally, the display is performed with 10 pixels per 1 degree in the horizontal direction, so the display is very rough.

In view of this, for example, since the visual perception is usually inferior and it is difficult to recognize detailed information in the peripheral visual field or outside the binocular visual field area, a smaller number of pixels is used to perform low-density display (low-resolution display) in the peripheral visual field or outside the binocular visual field area and a larger number of pixels is used to perform high-density display (high-resolution display) in the central visual field having excellent visual perception. In this manner, a high-visibility image can be effectively displayed in a desired area including the central visual field by using the display element having a limited number of pixels.

For example, in a case where the display element is of a scan-type, the scan speed for the central visual field is lowered and the scan speed for the peripheral visual field or the outside of the binocular visual field area is increased. In this manner, image display with different resolutions between the areas can be performed.

It should be noted that examples of the scan-type display element can include those that perform linear scan (e.g., raster scan) and those that perform spiral scan.

Here, it is known that the visual perception in the central visual field is much more excellent than the visual perception in the peripheral visual field. However, the peripheral visual field has a function of assisting the visual perception in the central visual field (e.g., a function that serves to identify the outline and the like of a display image that cannot be identified only in the central visual field). Therefore, it is essential for recognizing the display image.

Moreover, the visual perception in the peripheral visual field is assumed to be more excellent than the visual perception outside the binocular visual field area.

Moreover, as to the inside of the peripheral visual field, the visual perception in regions that are regions in which the visual field areas of the both eyes overlap each other and that exclude the central visual field is considered to be more excellent than the visual perception in a region inside the visual field area of one eye of the both eyes and outside the visual field area of the other eye.

In view of this, the inventor focused on the point that as to the extended visual field area, the visibility of an image displayed in the extended visual field area can be improved by further enhancing the visibility in the region having relatively excellent visual perception rather than enhancing the visibility in the region having relatively inferior visual perception.

Specifically, the inventor has found that higher-definition image display can be performed in the extended visual field area and the visibility can be improved by displaying an image at a higher resolution in a region having more excellent visual perception in the extended visual field area as a first method.

The inventor focused the point that the visibility of the display image can be effectively improved in accordance with the level of visual perception for each region by displaying a simple image in a region having relatively inferior visual perception and displaying a complicated image in a region having relatively excellent visual perception in the extended visual field area.

Specifically, the inventor has found that the visibility can be improved in the extended visual field area by displaying a simpler image in a region having inferior visual perception in the extended visual field area as a second method.

The inventor has made the display apparatus according to the first embodiment in order to achieve the first and second methods. It should be noted that hereinafter, carrying out the first method using the display apparatus according to the first embodiment will be described. However, the second method can also be carried out by using the display apparatus according to the first embodiment by changing the simplicity of the display image between the regions (e.g., changing the image displayed to be simpler in the region having inferior visual perception) in addition to or instead of varying the resolution between the regions. Here, in general, brightness representation is simpler than a figure, a figure is simpler than a word, and a pattern with less colors is simpler than a pattern with more colors, for example.

Hereinafter, the display apparatus according to the first embodiment of the present technology will be described by taking some examples.

In the display apparatus according to the first embodiment, the irradiation system 100 radiates light to the first region A1 as well as the second regions A2 and the resolution of the image displayed by the light radiated to the first region A1 is higher than the resolution of the image displayed by the light radiated to the second regions A2.

The irradiation system 100 includes the display element 100a worn by the left eye of the user as described above. The display element 100a is of the above-mentioned scan-type.

Hereinafter, display apparatuses according to the respective examples will be described with reference to a horizontal cross-sectional view and a vertical cross-sectional view of the left eye. However, a similar discussion can be established also as to a horizontal cross-section and a vertical cross-section of the right eye.

(1) Display Apparatus According to Example 1

A display apparatus 50-1 according to Example 1 (see FIGS. 9 and 10) displays an image in substantially the entire region of the extended visual field area of the left eye.

FIG. 8 shows a resolution distribution of an image displayed on the extended visual field area of the left eye. In FIG. 8, the image has a higher resolution in the darker region. To be more specific, in FIG. 8, an image displayed in the central visual field has the highest resolution, an image displayed in areas that are areas in which the visual field areas of the both eyes overlap each other and that exclude the central visual field has the second-highest resolution, an image displayed inside the visual field area of the left eye and outside the visual field area of the right eye and an image displayed outside the visual field area of the left eye and inside the visual field area of the right eye have the third-highest resolution, and an image displayed outside the binocular visual field area has the lowest resolution.

That is, in the display apparatus 50-1 according to Example 1, four degrees of resolution are used.

Figure 9:
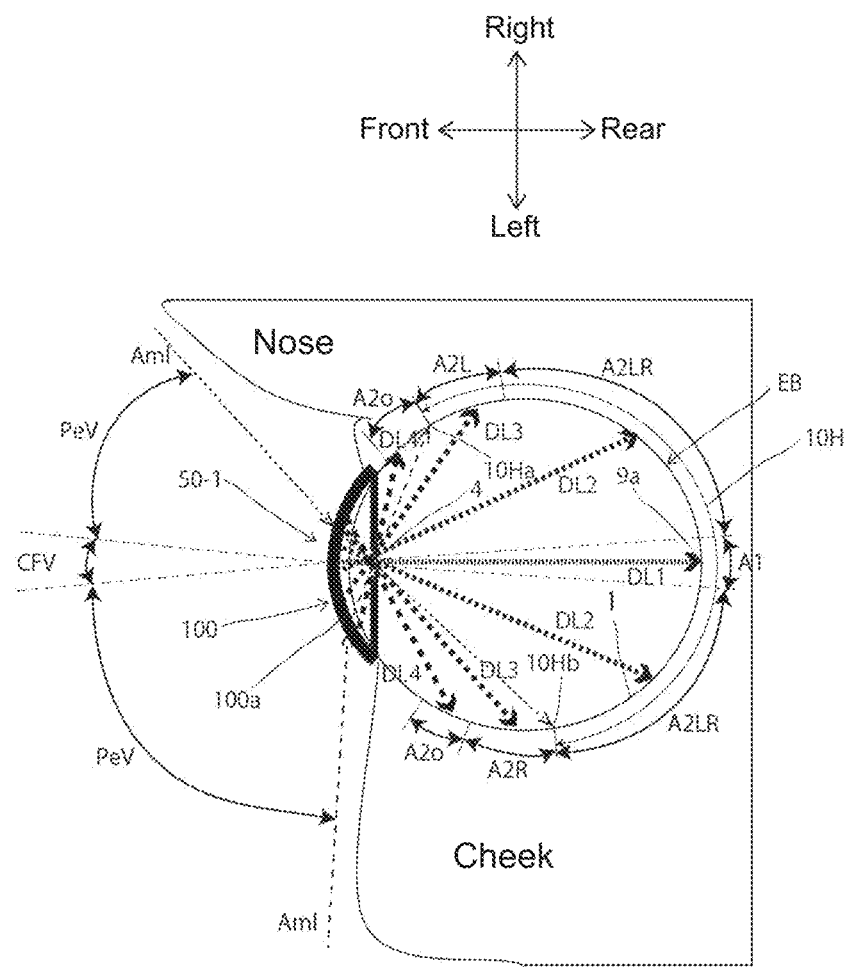
FIG. 9 A horizontal cross-sectional view showing a state in which display light is radiated to the retina from the display apparatus according to Example 1 of the present technology.

In order to achieve the resolution distribution in FIG. 8, in the display apparatus 50-1 according to Example 1, display light DL1 (light for each pixel of the display element (the same shall apply hereafter)) is radiated to the first region A1 at the highest density, display light DL2 is radiated to the first peripheral visual field corresponding regions A2LR at the second-highest density, display light DL3 is radiated to the second peripheral visual field corresponding region A2L and the third peripheral visual field corresponding region A2R at the third-highest density, and display light DL4 is radiated to the binocular visual field area outside corresponding regions A2o at the lowest density in the horizontal cross-section as shown in FIG. 9 via the pupil 4 from the display element 100a. It should be noted that as the space between dashes constituting the broken line representing each display light ray becomes narrower, it indicates that the irradiation density of the display light becomes higher (hereinafter, the same shall apply).

Figure 10:
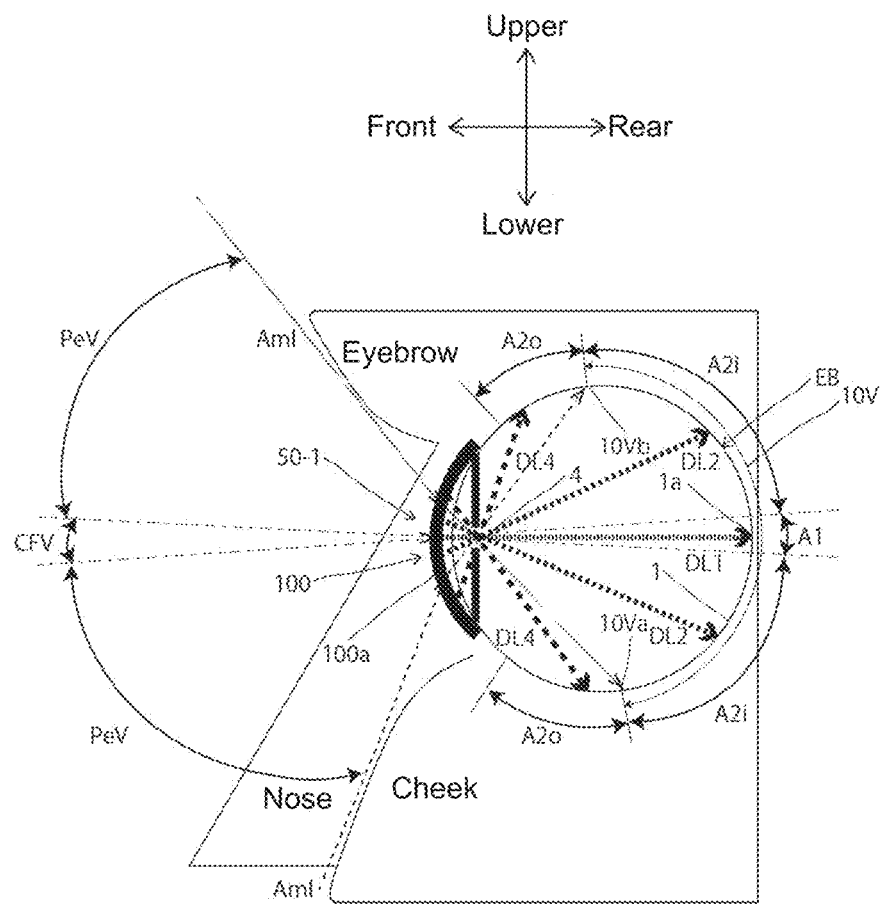
FIG. 10 A vertical cross-sectional view showing a state in which display light is radiated to a retina from the display apparatus according to Example 1 of the present technology.

In order to achieve the resolution distribution in FIG. 8, in the display apparatus 50-1 according to Example 1, display light DL1 is radiated to the first region A1 at the highest density, display light DL2 is radiated to the peripheral visual field corresponding regions A2i at the second-highest density, and display light DL4 is radiated to the binocular visual field area outside corresponding regions A2o at the lowest density in the vertical cross-section as shown in FIG. 10 via the pupil 4 from the display element 100a.

As it can be seen from FIGS. 9 and 10, the display light DL1, DL2, DL3, and DL4 are emitted from the display element 100a so as to intersect with each other in the vicinity of the pupil 4. Accordingly, substantially the entire region of the retina 1 can be irradiated with the display light via the pupil 4. That is, the respective display light rays can be prevented from being blocked (shielded) by the peripheral part (e.g., the iris) of the pupil 4.

In the display apparatus 50-1 according to Example 1 described hereinabove, the irradiation system 100 radiates light to the first and second regions A1 and A2 on the retina of the left eye 1 from the display element 100a.

The second regions A2 include peripheral visual field corresponding regions of the retina 1, which correspond to the peripheral visual fields.

The peripheral visual field corresponding regions include the first peripheral visual field corresponding regions A2LR corresponding to the areas that are areas in which the visual field areas of the both eyes overlap each other and that exclude the central visual field and the second peripheral visual field corresponding region A2L corresponding to the inside of the visual field area of the left eye and the outside of the visual field area of the right eye.

The irradiation system 100 radiates light to at least the first peripheral visual field corresponding regions A2LR and the second peripheral visual field corresponding region A2L on the retina of the left eye 1. The resolution of the image displayed by the light radiated to the second peripheral visual field corresponding region A2L is lower than the resolution of the image displayed by the light radiated to the first peripheral visual field corresponding regions A2LR.

The peripheral visual field corresponding regions further include the third peripheral visual field corresponding region A2R corresponding to the outside of the visual field area of the left eye and the inside of the visual field area of the right eye. The irradiation system 100 also radiates light to the third peripheral visual field corresponding region A2R.

The resolution of the image displayed by the light radiated to the first peripheral visual field corresponding regions A2LR is higher than the resolution of the image displayed by the light radiated to the third peripheral visual field corresponding region A2R.

Here, the resolution (former) of the image displayed by the light radiated to the third peripheral visual field corresponding region A2R and the resolution (latter) of the image displayed by the light radiated to the second peripheral visual field corresponding region A2L are the same, though they may be different from each other.

The second regions A2 further include the binocular visual field area outside corresponding regions A2o corresponding to the outside of the visual field areas of the both eyes on the retina of the left eye 1. The irradiation system 100 radiates light to the peripheral visual field corresponding regions and the binocular visual field area outside corresponding regions A2o.

The resolution of the image displayed by the light radiated to the peripheral visual field corresponding region is higher than the resolution of the image displayed by the light radiated to the binocular visual field area outside corresponding regions A2o.

In accordance with the display apparatus 50-1 according to Example 1, an image is displayed at a higher resolution in the region having more excellent visual perception in the entire region of the extended visual field area. Therefore, display that can effectively improve visibility in a very wide area can be performed.

(2) Display Apparatus According to Example 2

A display apparatus according to Example 2 displays an image in substantially the entire region of the extended visual field area of the left eye.

Figure 11A:
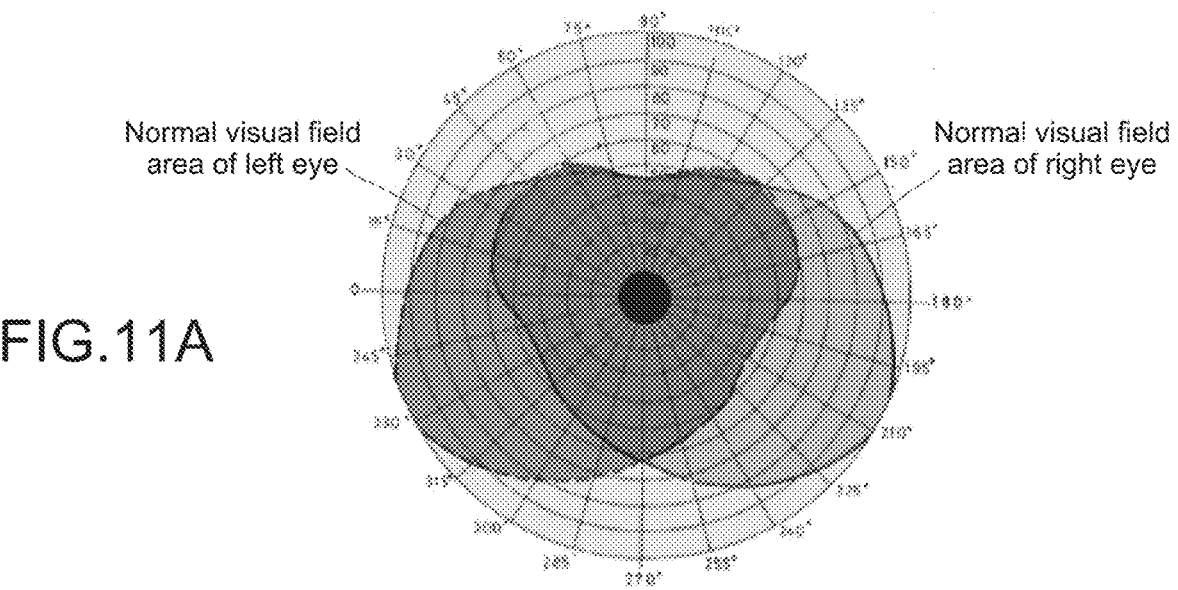
FIG. 11A and FIG. 11B are diagrams showing a resolution distribution of regions in which an image is displayed by a display apparatus according to Example 2 of the present technology.
Figure 11B:
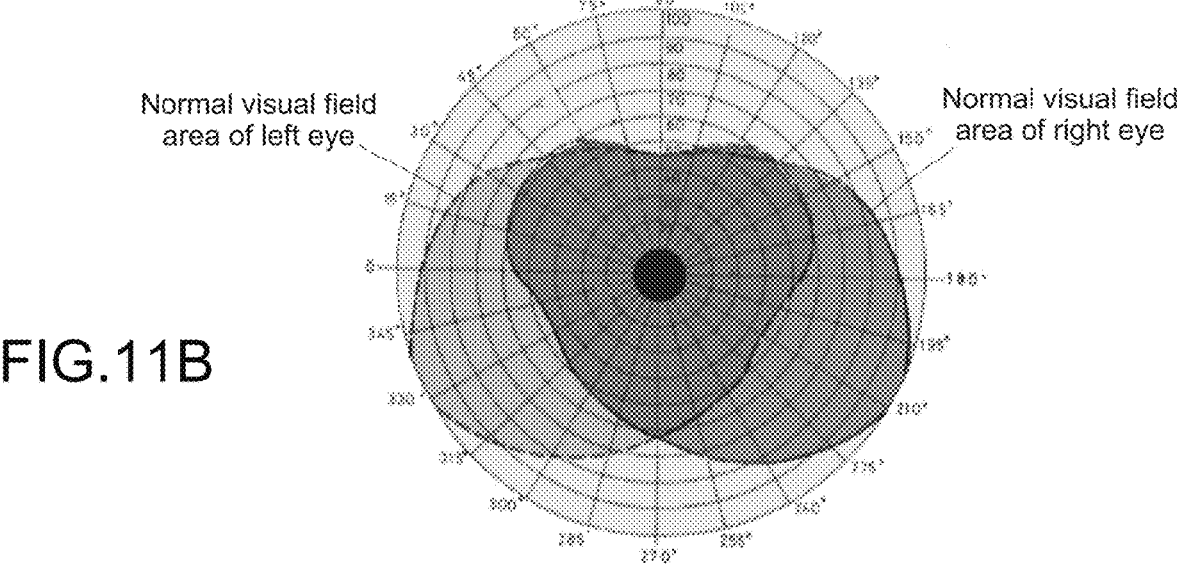

FIG. 11A shows a resolution distribution of an image displayed on the extended visual field area of the left eye. In FIG. 11A, the image has a higher resolution in the darker region (the same shall apply to FIG. 11 B). To be more specific, in FIG. 11A, an image displayed in the central visual field has the highest resolution, an image displayed in areas that are areas in which the visual field areas of the both eyes overlap each other and that exclude the central visual field has the second-highest resolution, an image displayed inside the visual field area of the left eye and outside the visual field area of the right eye has the third-highest resolution, an image displayed outside the visual field area of the left eye and inside the visual field area of the right eye has the fourth-highest resolution, and an image displayed outside the binocular visual field area has the lowest resolution.

In order to achieve the resolution distribution in FIG. 11A, in the display apparatus according to Example 2, the irradiation density of the display light radiated to the region (the second peripheral visual field corresponding region A2L) corresponding to the inside of the visual field area of the left eye and the outside of the visual field area of the right eye is set to be higher than the irradiation density of the display light radiated to the region (the third peripheral visual field corresponding region A2R) corresponding to the inside of the visual field area of the right eye and the outside of the visual field area of the left eye in the horizontal cross-section on the retina of the left eye 1 as compared to the display by the display apparatus 50-1 according to Example 1.

In order to achieve the resolution distribution in FIG. 11A, in the display apparatus according to Example 2, display light DL1 is radiated to the first region A1 at the highest density, display light DL2 is radiated to the peripheral visual field corresponding regions A2*i* at the second-highest density, and display light DL4 is radiated to the binocular visual field area outside corresponding regions A2*o* at the lowest density (see FIG. 10) in the vertical cross-section via the pupil 4 from the display element 100*a* as in the display apparatus 50-1 according to Example 1.

In the display apparatus according to Example 2 described hereinabove, the resolution of the image displayed by the light radiated to the second peripheral visual field corresponding region A2L and the resolution of the image displayed by the light radiated to the third peripheral visual field corresponding region A2R are different from each other.

Here, the irradiation density for the second peripheral visual field corresponding region A2L is set to be higher than the irradiation density for the third peripheral visual field corresponding region A2R. However, for example, in order to achieve the resolution distribution in FIG. 11 B, the irradiation density for the third peripheral visual field corresponding region A2R may be set to be higher than the irradiation density for the second peripheral visual field corresponding region A2L.

It should be noted that as to the left eye, it is difficult to say which one is more excellent, the visual perception in the second peripheral visual field corresponding region A2L or the visual perception obtained by radiating light to the third peripheral visual field corresponding region A2R, and their relationship about the visual perception will differ depending on a user, a use duration of the display apparatus, or the like. As a supplement, the background can be seen through the image in the visual field area corresponding to the second peripheral visual field corresponding region A2L while the visual perception is usually used with the ambient light radiated. Therefore, the visibility of the image is relatively good for users who do not care about the see-through property and the visibility of the image is not good for users who do care about the see-through property. The background cannot be seen through the image in the third peripheral visual field corresponding region A2R. However, it is assumed to take time for the visual perception to function normally because the third peripheral visual field corresponding region A2R is a region in which the visual perception is not usually used with no ambient light radiated.

Here, for example, in a case where there is a defect of the visual field of the second peripheral visual field corresponding region (the region corresponding to the inside of the visual field area of the right eye and the outside of the visual field area of the left eye) of the right eye of the user, radiating the display light to the third peripheral visual field corresponding region A2R of the left eye in addition to or instead of the second peripheral visual field corresponding region A2L of the left eye in order to support the information collection function of the right eye is effective for noticing the presence of an obstacle or the like located near the user with the left eye instead of the right eye as soon as possible, for example.

In accordance with the display apparatus according to Example 2, more degrees of resolution (five resolutions) are used and the light deflector control becomes slightly complicated but image display with good visibility can be performed depending on a user, a use duration of the display apparatus, or the like as compared to the display apparatus according to Example 1.

(3) Display Apparatus According to Example 3

A display apparatus 50-3 according to Example 3 (see FIG. 13) displays an image in substantially the entire region of the extended visual field area of the left eye.

Figure 12:
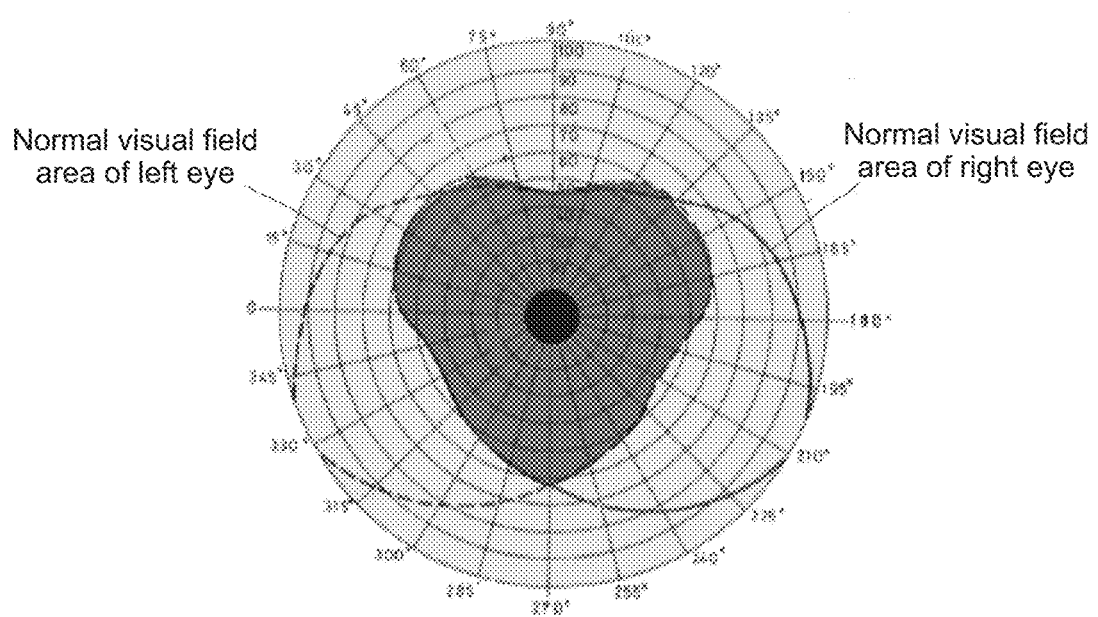
FIG. 12 A diagram showing a resolution distribution of regions in which an image is displayed by a display apparatus according to Example 3 of the present technology.

FIG. 12 shows a resolution distribution of an image displayed on the extended visual field area of the left eye. In FIG. 12, the image has a higher resolution in the darker region. To be more specific, in FIG. 12, an image displayed in the central visual field has the highest resolution, an image displayed in areas that are areas in which the visual field areas of the both eyes overlap each other and that exclude the central visual field has the second-highest resolution, and an image displayed inside the visual field area of the left eye and outside the visual field area of the right eye, an image displayed outside the visual field area of the left eye and inside the visual field area of the right eye, and an image displayed outside the binocular visual field area have the lowest resolution.

Figure 13:
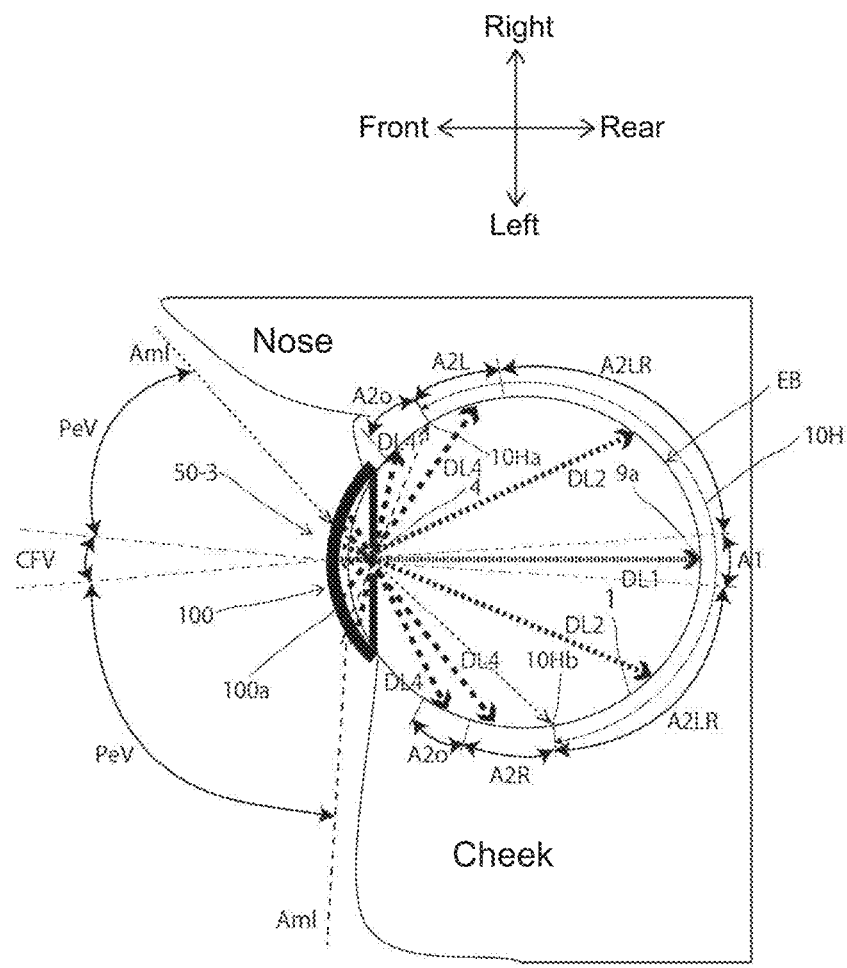
FIG. 13 A horizontal cross-sectional view showing a state in which display light is radiated to the retina from the display apparatus according to Example 3 of the present technology.

In order to achieve the resolution distribution in FIG. 12, in the display apparatus 50-3 according to Example 3, display light DL1 is radiated to the first region A1 at the highest density, display light DL2 is radiated to the first peripheral visual field corresponding regions A2LR at the second-highest density, and display light DL4 is radiated to the second peripheral visual field corresponding region A2L, the third peripheral visual field corresponding region A2R, and the binocular visual field area outside corresponding regions Ao at the lowest density in the horizontal cross-section as shown in FIG. 13 via the pupil 4 from the display element 100*a*.

In order to achieve the resolution distribution in FIG. 12, in the display apparatus according to Example 3, display light DL1 is radiated to the first region A1 at the highest density, display light DL2 is radiated to the peripheral visual field corresponding regions A2*i* at the second-highest density, and display light DL4 is radiated to the binocular visual field area outside corresponding regions A2*o* at the lowest density (see FIG. 10) in the vertical cross-section via the pupil 4 from the display element 100*a* as in the display apparatus 50-1 according to Example 1.

As it can be seen from FIG. 13, the display light DL1, DL2, and DL4 are emitted from the display element 100a so as to intersect with each other in the vicinity of the pupil 4. Accordingly, substantially the entire region of the retina 1 can be irradiated with the display light via the pupil 4. That is, the respective display light rays can be prevented from being blocked (shielded) by the peripheral part (e.g., the iris) of the pupil 4.

In accordance with the display apparatus 50-3 according to Example 3 described hereinabove, less degrees of resolution (three resolutions) are used as compared to the display apparatus 50-1 according to Example 1. Therefore, the light deflector control is easy. The occupation ratio of the low-resolution region to the display area is larger. Therefore, the high-resolution region can be displayed at a higher resolution in a case of performing display with a limited number of pixels.

(4) Display Apparatus According to Example 4

A display apparatus 50-4 according to Example 4 (see FIG. 15) displays an image in substantially the entire region of the extended visual field area of the left eye.

Figure 14:
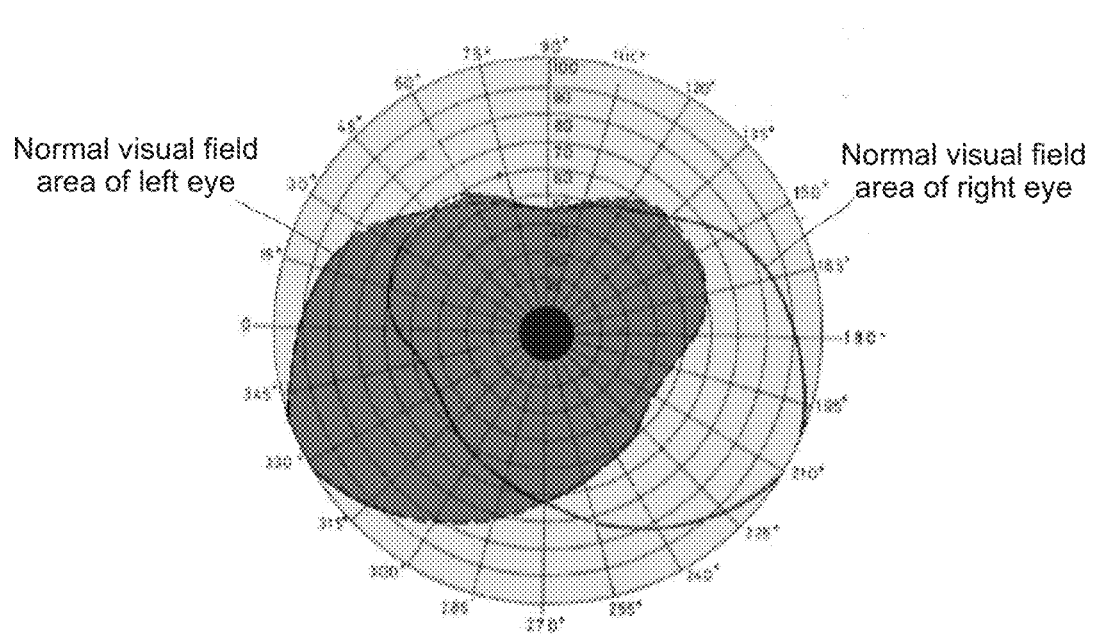
FIG. 14 A diagram showing a resolution distribution of regions in which an image is displayed by a display apparatus according to Example 4 of the present technology.

FIG. 14 shows a resolution distribution of an image displayed on the extended visual field area of the left eye. In FIG. 14, the image has a higher resolution in the darker region. To be more specific, in FIG. 14, an image displayed in the central visual field has the highest resolution, an image displayed in areas that are areas in which the visual field areas of the both eyes overlap each other and that exclude the central visual field and an image displayed inside the visual field area of the left eye and outside the visual field area of the right eye have the third-highest resolution, and an image displayed outside the visual field area of the left eye and inside the visual field area of the right eye and an image displayed outside the binocular visual field area have the lowest resolution.

Figure 15:
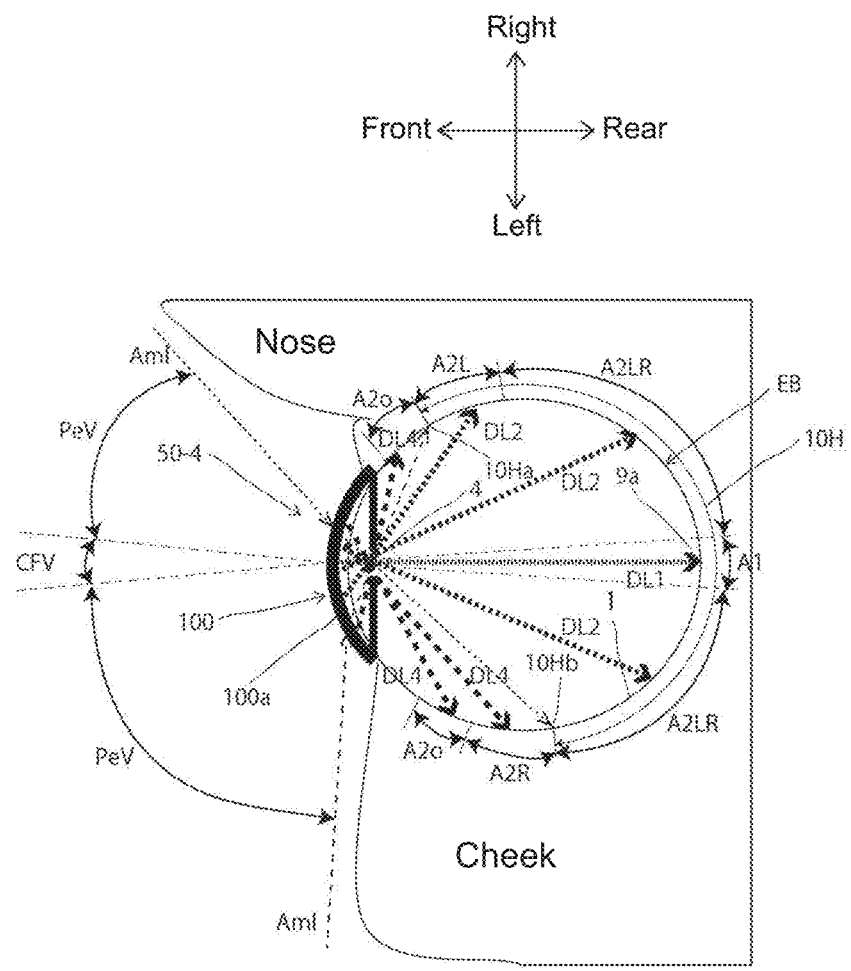
FIG. 15 A horizontal cross-sectional view showing a state in which display light is radiated to the retina from the display apparatus according to Example 4 of the present technology.

In order to achieve the resolution distribution in FIG. 14, in the display apparatus 50-4 according to Example 4, display light DL1 is radiated to the first region A1 at the highest density, display light DL2 is radiated to the first peripheral visual field corresponding regions A2LR and the second peripheral visual field corresponding region A2L at the second-highest density, and display light DL4 is radiated to the third peripheral visual field corresponding region A2R corresponding to the inside of the visual field area of the right eye and the outside of the visual field area of the left eye and the binocular visual field area outside corresponding regions A2o at the lowest density in the horizontal cross-section as shown in FIG. 15 via the pupil 4 from the display element 100a.

In order to achieve the resolution distribution in FIG. 14, in the display apparatus according to Example 4, display light DL1 is radiated to the first region A1 at the highest density, display light DL2 is radiated to the peripheral visual field corresponding regions A2i at the second-highest density, and display light DL4 is radiated to the binocular visual field area outside corresponding regions A2o at the lowest density (see FIG. 10) in the vertical cross-section via the pupil 4 from the display element 100a as in the display apparatus 50-1 according to Example 1.

As it can be seen from FIG. 15, the display light DL1, DL2, and DL4 are emitted from the display element 100a so as to intersect with each other in the vicinity of the pupil 4. Accordingly, substantially the entire region of the retina 1 can be irradiated with the display light via the pupil 4. That is, the respective display light rays can be prevented from being blocked (shielded) by the peripheral part (e.g., the iris) of the pupil 4.

In accordance with the display apparatus according to Example 4 described hereinabove, less degrees of resolution (three resolutions) are used as compared to the display apparatus 50-1 according to Example 1. Therefore, the light deflector control is easy and the left-eye visibility of the image displayed, superimposed on the background, can be further improved.

(5) Display Apparatus According to Example 5

A display apparatus 50-5 according to Example 5 (see FIGS. 17 and 18) displays an image in substantially the entire regions of the normal visual field areas of the both eyes in the extended visual field area of the left eye.

Figure 16:
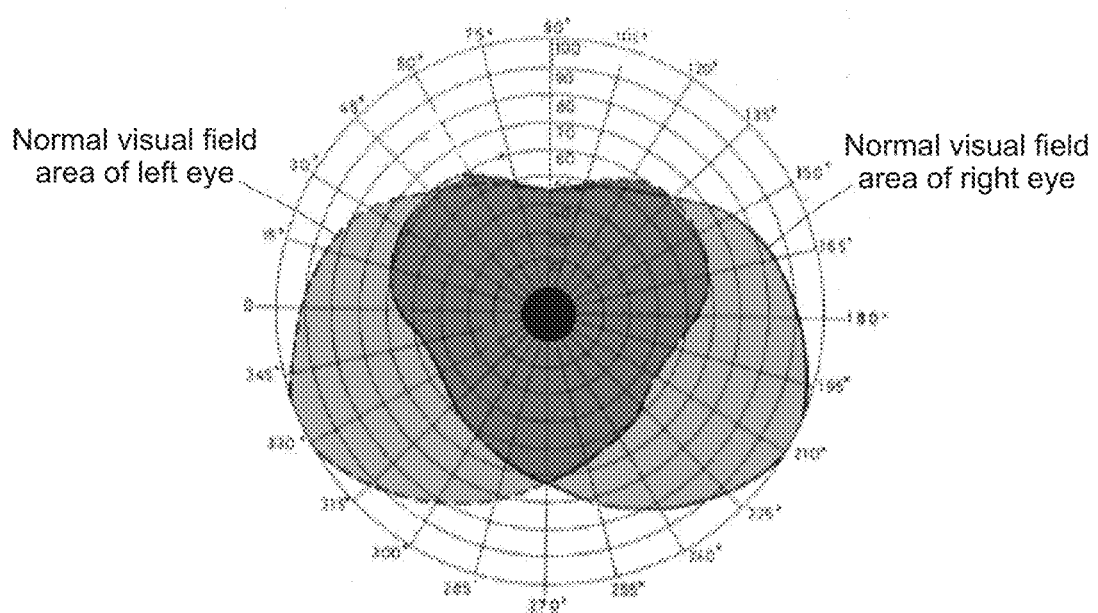
FIG. 16 A diagram showing a resolution distribution of regions in which an image is displayed by a display apparatus according to Example 5 of the present technology.

FIG. 16 shows a resolution distribution of the image displayed in the normal visual field areas of the both eyes in the extended visual field area of the left eye. In FIG. 16, the image has a higher resolution in the darker region. To be more specific, in FIG. 16, an image displayed in the central visual field has the highest resolution, an image displayed in areas that are areas in which the visual field areas of the both eyes overlap each other and that exclude the central visual field has the second-highest resolution, and an image displayed inside the visual field area of the left eye and outside the visual field area of the right eye and an image displayed outside the visual field area of the left eye and inside the visual field area of the right eye have the lowest resolution.

Figure 17:
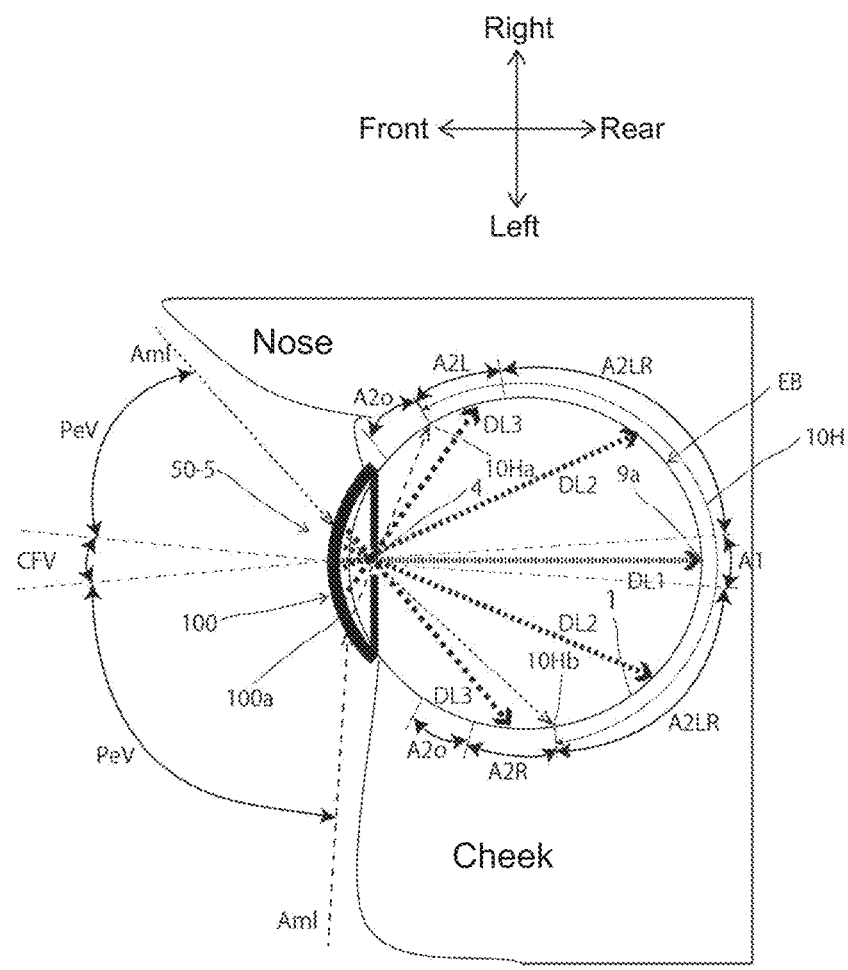
FIG. 17 A horizontal cross-sectional view showing a state in which display light is radiated to the retina from the display apparatus according to Example 5 of the present technology.

In order to achieve the resolution distribution in FIG. 16, in the display apparatus 50-5 according to Example 5, display light DL1 is radiated to the first region A1 at the highest density, display light DL2 is radiated to the first peripheral visual field corresponding regions A2LR at the second-highest density, and display light DL3 is radiated to the second peripheral visual field corresponding region A2L and the third peripheral visual field corresponding region A2R at the lowest density in the horizontal cross-section as shown in FIG. 17 via the pupil 4 from the display element 100a.

Figure 18:
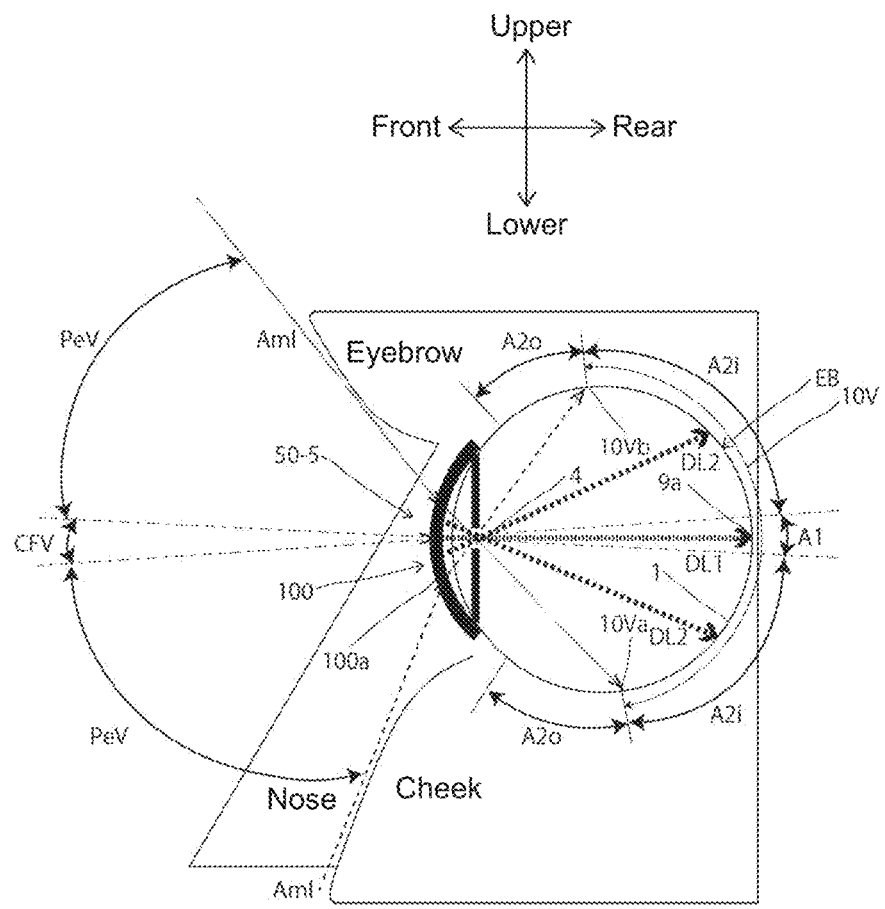
FIG. 18 A vertical cross-sectional view showing a state in which display light is radiated to the retina from the display apparatus according to Example 5 of the present technology.

In order to achieve the resolution distribution in FIG. 16, in the display apparatus 50-5 according to Example 5, display light DL1 is radiated to the first region A1 at relatively high density and display light DL2 is radiated to the peripheral visual field corresponding regions A2i at relatively low density in the vertical cross-section as shown in FIG. 18 via the pupil 4 from the display element 100a.

As it can be seen from FIGS. 17 and 18, the display light DL1, DL2, and DL3 are emitted from the display element 100a so as to intersect with each other in the vicinity of the pupil 4. Accordingly, substantially the entire region of the retina 1 can be irradiated with the display light via the pupil 4. That is, the respective display light rays can be prevented from being blocked (shielded) by the peripheral part (e.g., the iris) of the pupil 4.

In the display apparatus 50-5 according to Example 5, the irradiation system 100 changes the irradiation area so that light radiated to one region on the retina 1 is radiated to another region. The one region is a region in which the visual field of the user is not ensured and the other region is a region in which the visual field of the user is ensured. The region in which the visual field of the user is not ensured includes, as an example, a region of the retina 1, which corresponds to the outside of the visual field areas of the both eyes. The region in which the visual field of the user is ensured includes at least a part of the normal visual field area of the left eye (e.g., substantially the entire region of the normal visual field area of the left eye). In accordance with the display apparatus 50-5 according to Example 5 described hereinabove, in a case of using a display element 100a having a constant number of pixels, display can be performed in a narrower area (normal visual field areas of the both eyes) at a high resolution as compared to the display apparatus 50-1 according to Example 1 that displays an image in the entire region of the extended visual field area. Therefore, although the display area is narrower, the visibility of the display image can be much more improved.

In addition, in accordance with the display apparatus according to Example 5, less degrees of resolution (three resolutions) are used. Therefore, the light deflector control is easy.

(6) Display Apparatus According to Example 6

A display apparatus 50-6 according to Example 6 (see FIG. 20) displays an image in substantially the entire regions of the normal visual field areas of the both eyes in the extended visual field area of the left eye.

Figure 19:
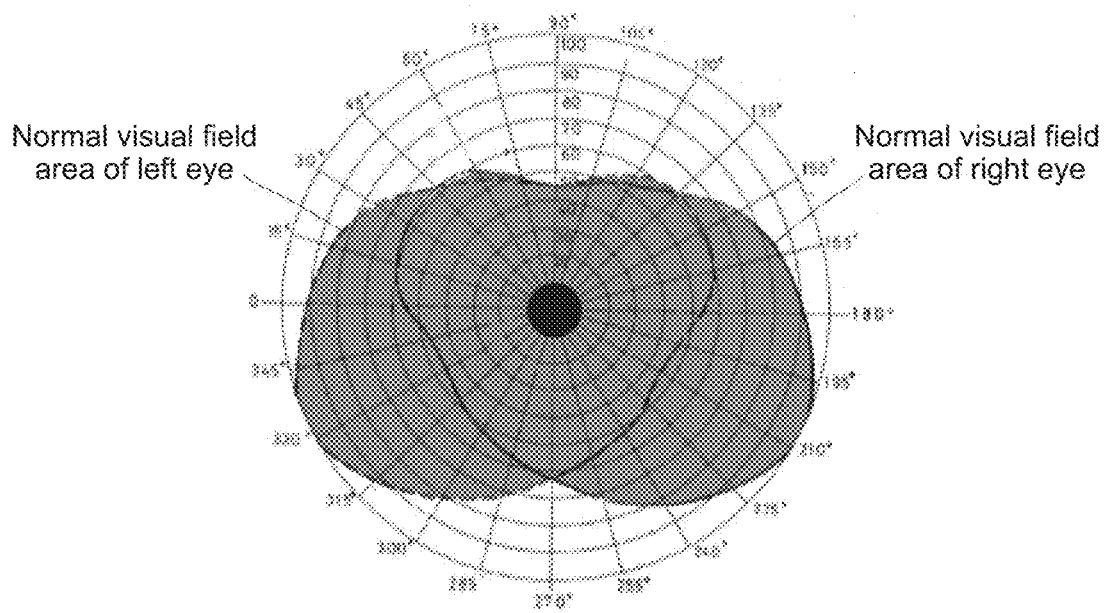
FIG. 19 A diagram showing a resolution distribution of regions in which an image is displayed by a display apparatus according to Example 6 of the present technology.

FIG. 19 shows a resolution distribution of the image displayed in the normal visual field areas of the both eyes in the extended visual field area of the left eye. In FIG. 19, the image has a higher resolution in the darker region. To be more specific, in FIG. 19, an image displayed in the central visual field has a relatively high resolution and an image displayed in the peripheral visual field has a relatively low resolution.

Figure 20:
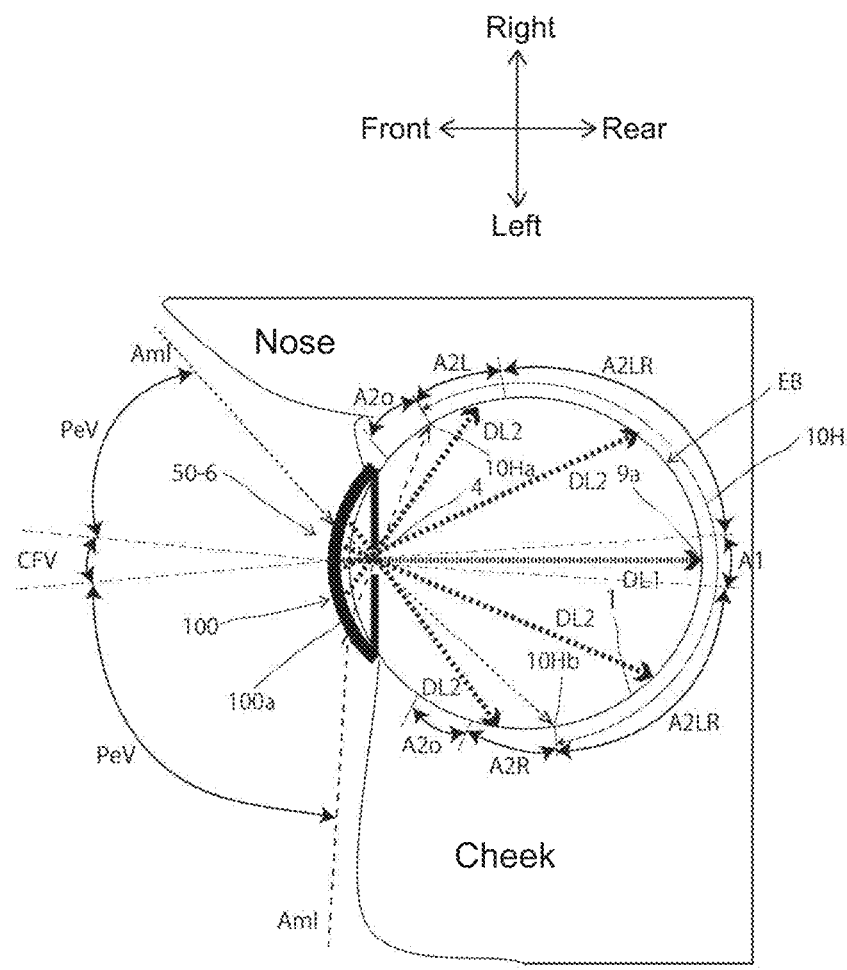
FIG. 20 A horizontal cross-sectional view showing a state in which display light is radiated to the retina from the display apparatus according to Example 6 of the present technology.

In order to achieve the resolution distribution in FIG. 19, in the display apparatus 50-6 according to Example 6, display light DL1 is radiated to the first region A1 at relatively high density and display light DL2 is radiated to the first peripheral visual field corresponding regions A2LR, the second peripheral visual field corresponding region A2L, and the third peripheral visual field corresponding region A2R at relatively low density in the horizontal cross-section as shown in FIG. 20 via the pupil 4 from the display element 100a.

In the display apparatus 50-6 according to Example 6, the irradiation system 100 changes the irradiation area so that light radiated to one region on the retina 1 is radiated to another region. The one region is a region in which the visual field of the user is not ensured and the other region is a region in which the visual field of the user is ensured. The region in which the visual field of the user is not ensured includes, as an example, a region of the retina 1, which corresponds to the outside of the visual field areas of the both eyes. The region in which the visual field of the user is ensured includes at least a part of the normal visual field area of the left eye (e.g., the entire region of the normal visual field area of the left eye).

In accordance with the display apparatus 50-6 according to Example 6 described hereinabove, in a case of using a display element 100a having a constant number of pixels, display can be performed in a narrower area (normal visual field areas of the both eyes) at a high resolution as compared to the display apparatus according to Example 1 that displays an image in the entire region of the extended visual field area. Therefore, although the display area is narrower, the visibility can be much more improved.

In addition, in accordance with the display apparatus 50-6 according to Example 6, less degrees of resolution (two resolutions) are used. Therefore, the light deflector control is easier.

(7) Display Apparatus According to Example 7

A display apparatus 50-7 according to Example 7 (see FIG. 22) displays an image in substantially the entire regions of the areas in which the visual field areas of the both eyes overlap each other in the extended visual field area of the left eye.

Figure 21:
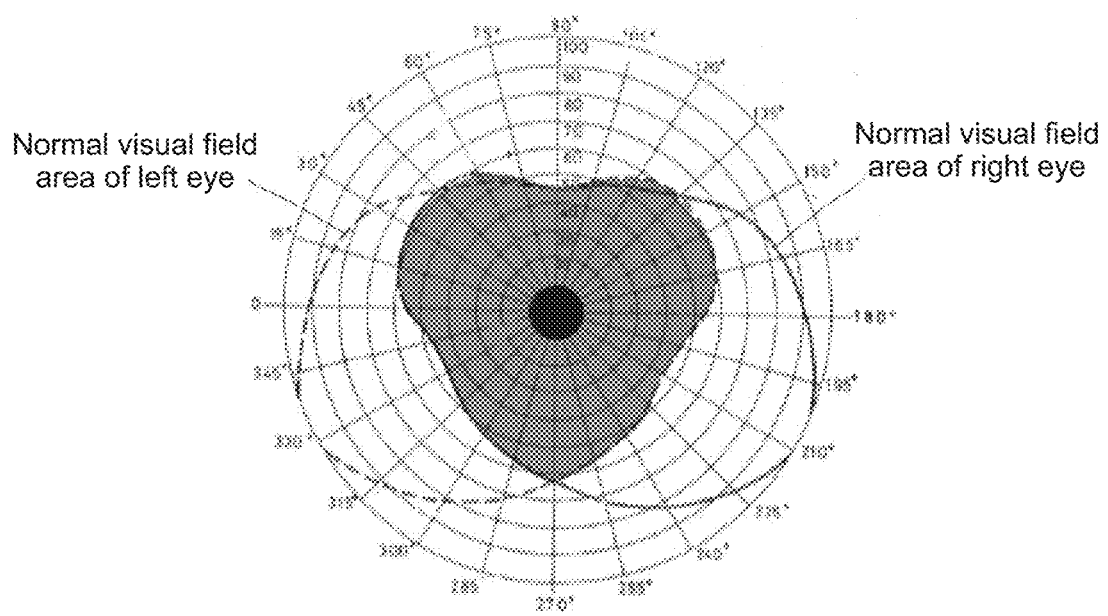
FIG. 21 A diagram showing a resolution distribution of regions in which an image is displayed by a display apparatus according to Example 7 of the present technology.

FIG. 21 shows a resolution distribution of an image displayed in the areas in which the visual field areas of the both eyes overlap each other in the extended visual field area of the left eye. In FIG. 21, the image has a higher resolution in the darker region. To be more specific, in FIG. 21, an image displayed in the central visual field has a relatively high resolution and an image displayed in areas that are areas in which the visual field areas of the both eyes overlap each other and that exclude the central visual field has a relatively low resolution.

Figure 22:
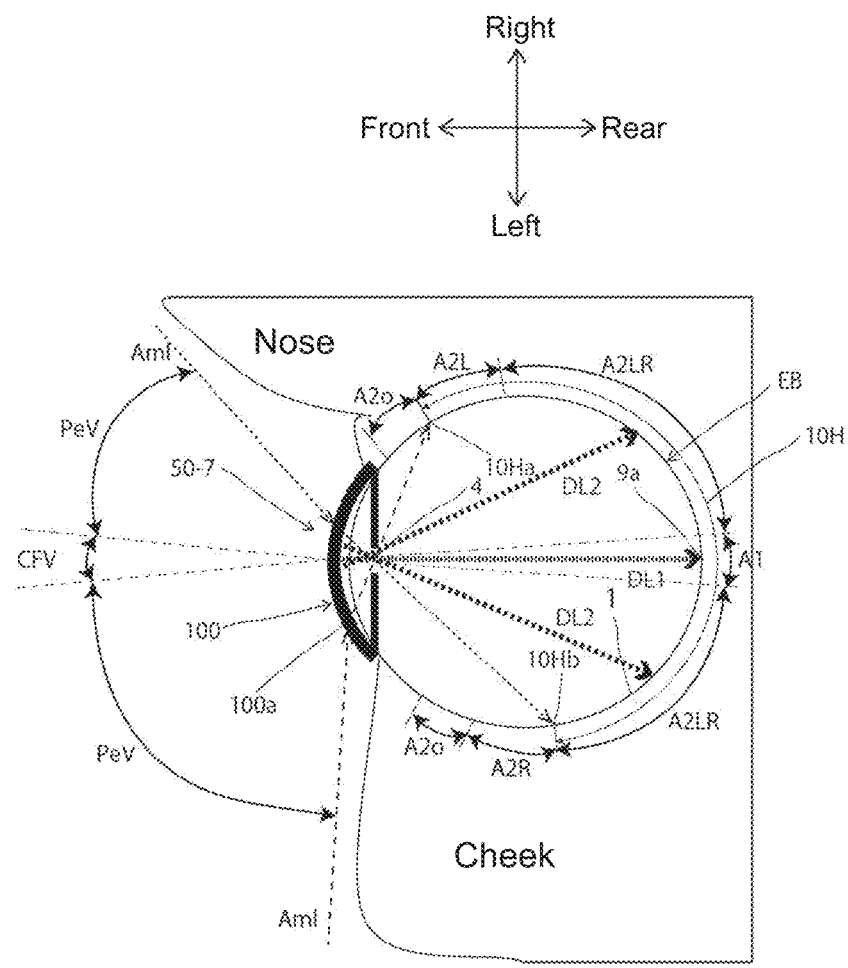
FIG. 22 A horizontal cross-sectional view showing a state in which display light is radiated to the retina from the display apparatus according to Example 7 of the present technology.

In order to achieve the resolution distribution in FIG. 21, in the display apparatus 50-7 according to Example 7, display light DL1 is radiated to the first region A1 at relatively high density and display light DL2 is radiated to the first peripheral visual field corresponding regions A2LR at relatively low density in the horizontal cross-section as shown in FIG. 22 via the pupil 4 from the display element 100a.

In order to achieve the resolution distribution in FIG. 21, in the display apparatus 50-7 according to Example 7, display light DL1 is radiated to the first region A1 at relatively high density and display light DL2 is radiated to the peripheral visual field corresponding regions A2i at relatively low density (see FIG. 18) in the vertical cross-section via the pupil 4 from the display element 100a.

In the display apparatus 50-7 according to Example 7, the irradiation system 100 changes the irradiation area so that light radiated to one region on the retina 1 is radiated to another region. The one region is a region in which the visual field of the user is not ensured and the other region is a region in which the visual field of the user is ensured. The region in which the visual field of the user is not ensured includes, as an example, the binocular visual field area outside corresponding regions Ao and the third peripheral visual field corresponding region A2R on the retina of the left eye 1. The region in which the visual field of the user is ensured includes at least a part of the normal visual field area of the left eye (e.g., areas in which the visual field areas of the both eyes overlap each other).

In accordance with the display apparatus 50-7 according to Example 7 described hereinabove, in a case of using a display element 100a having a constant number of pixels, display can be performed at a high resolution in an extremely narrow area (areas in which the visual field areas of the both eyes overlap each other) as compared to the display apparatus according to Example 1 that displays an image in the entire region of the extended visual field area. Therefore, although the display area is narrower, the visibility of the display image can be remarkably improved.

In addition, in accordance with the display apparatus 50-7 according to Example 7, less degrees of resolution (two resolutions) are used. Therefore, the light deflector control is easier.

It should be noted that the display according to Example 7 is effective especially in a case where information is desired to be displayed mainly in the areas in which the visual field areas of the both eyes overlap each other, and switching to the display according to Example 7 may be performed as necessary during the display according to any one of Examples 1 to 6, for example.

(8) Display Apparatus According to Example 8

A display apparatus 50-8 according to Example 8 (see FIG. 24) displays an image in substantially the entire region of the normal visual field area of the left eye in the extended visual field area of the left eye.

Figure 23:
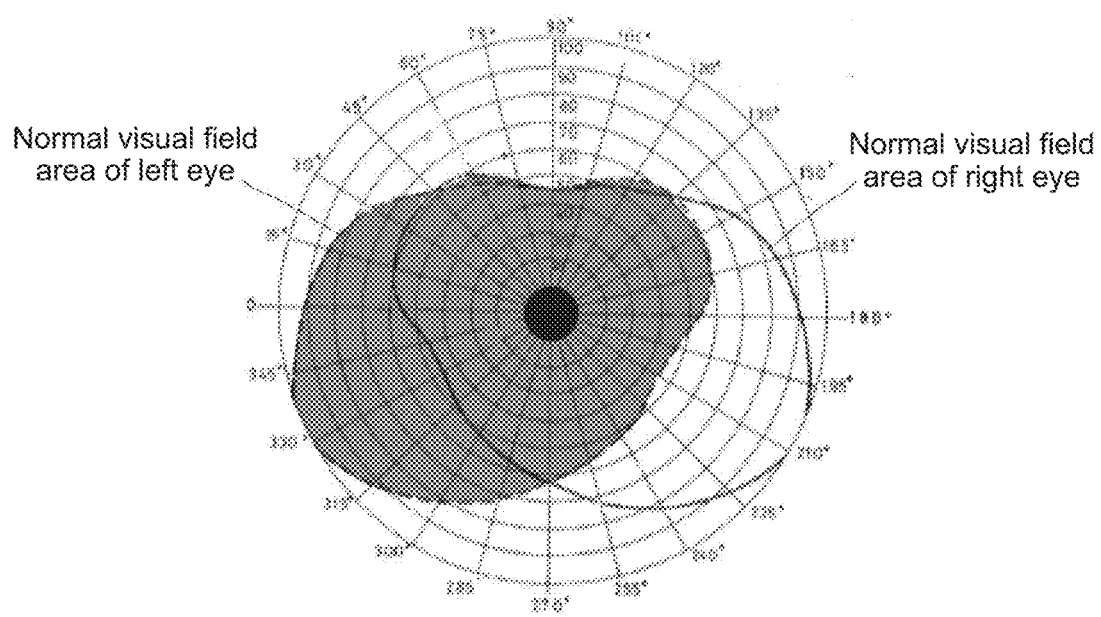
FIG. 23 A diagram showing a resolution distribution of regions in which an image is displayed by a display apparatus according to Example 8 of the present technology.

FIG. 23 shows a resolution distribution of an image displayed in the normal visual field area of the left eye. In FIG. 23, the image has a higher resolution in the darker region. To be more specific, in FIG. 23, an image displayed in the central visual field has a relatively high resolution and an image displayed inside the normal visual field area of the left eye and outside the central visual field has a relatively low resolution.

Figure 24:
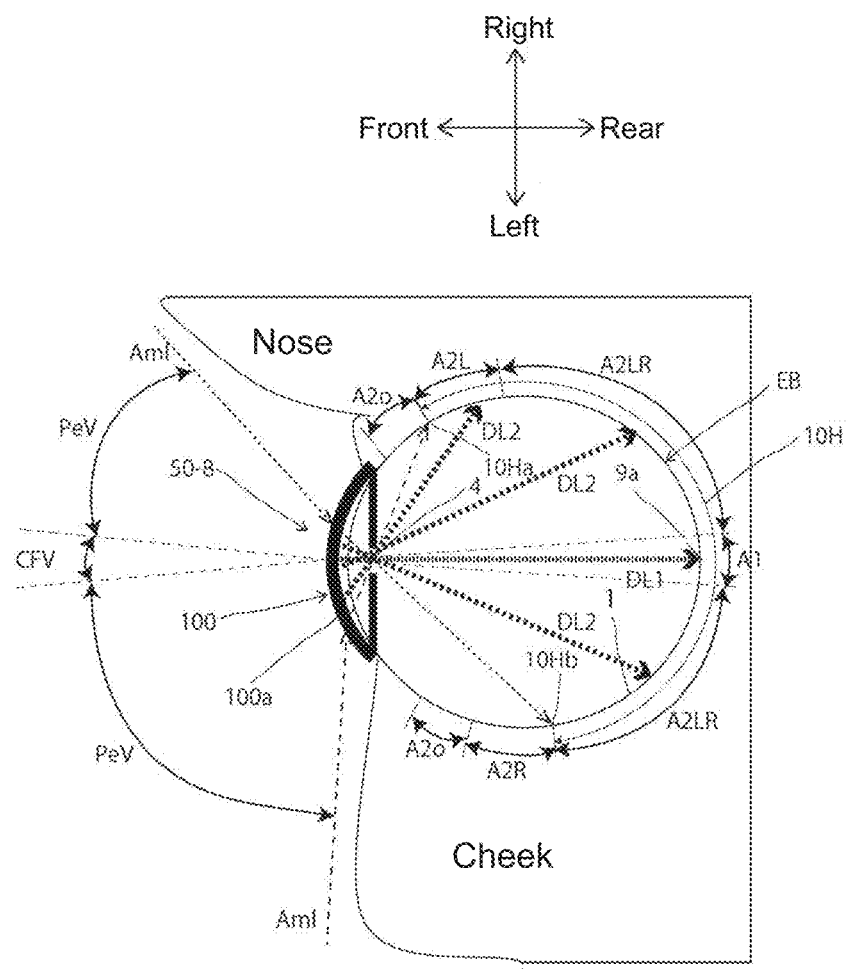
FIG. 24 A horizontal cross-sectional view showing a state in which display light is radiated to the retina from the display apparatus according to Example 8 of the present technology.

In order to achieve the resolution distribution in FIG. 23, in the display apparatus 50-8 according to Example 8, display light DL1 is radiated to the first region A1 at relatively high density and display light DL2 is radiated to the first peripheral visual field corresponding regions A2LR and the second peripheral visual field corresponding region A2L at relatively low density in the horizontal cross-section as shown in FIG. 24 via the pupil 4 from the display element 100a.

In order to achieve the resolution distribution in FIG. 23, in the display apparatus 50-8 according to Example 8, display light DL1 is radiated to the first region A1 at relatively high density and display light DL2 is radiated to the peripheral visual field corresponding regions A2i at relatively low density (see FIG. 18) in the vertical cross-section via the pupil 4 from the display element 100a.

In the display apparatus according to Example 8, the irradiation system 100 changes the irradiation area so that light radiated to one region on the retina 1 is radiated to another region. The one region is a region in which the visual field of the user is not ensured and the other region is a region in which the visual field of the user is ensured. The region in which the visual field of the user is not ensured includes, as an example, the binocular visual field area outside corresponding regions Ao and the third peripheral visual field corresponding region A2R on the retina of the left eye 1. The region in which the visual field of the user is ensured includes at least a part of the normal visual field area of the left eye (e.g., substantially the entire region of the normal visual field area of the left eye).

In accordance with the display apparatus 50-8 according to Example 8 described hereinabove, in a case of using a display element 100a having a constant number of pixels, display can be performed at a high resolution in a narrower area (substantially the entire region of the normal visual field area of the left eye) as compared to the display apparatus according to Example 1 that displays an image in the entire region of the extended visual field area. Therefore, although the display area is narrower, the visibility of the display image can be much more improved.

In addition, in accordance with the display apparatus according to Example 8, less degrees of resolution (two resolutions) are used. Therefore, the light deflector control is easier.

It should be noted that the display according to Example 8 is effective especially in a case where information is desired to be displayed mainly in the areas in which the visual field areas of the both eyes overlap each other, and switching to the display according to Example 8 may be performed as necessary during the display according to any one of Examples 1 to 6, for example.

It should be noted that although it has also been described in Example 7 or 8, the display apparatus according to the first embodiment may switch the display by the display apparatuses according to Examples 1 to 8 as necessary by, for example, a switching operation or automatically.

By the way, in a case where different images appear in the visual field areas of the both eyes as described above, binocular rivalry affects the visibility.

In view of this, the inventor has conducted to an experiment targeted to a plurality of subjects. In this experiment, the presence/absence of binocular rivalry was determined when an image was displayed only to one eye in a case where there was an object in the visual field areas of both eyes.

As a result, binocular rivalry frequently occurred when the image was displayed, superimposed on the central visual field of the one eye, and almost no binocular rivalry occurred when the image was displayed, superimposed on the peripheral visual field of the one eye.

Moreover, the binocular rivalry is estimated not to occur when the image is displayed, superimposed on the inside of the visual field area of the one eye and the outside of the visual field area of the other eye or the outside of the visual field areas of the both eyes. It is because the binocular rivalry can be theoretically considered not to be caused by an image displayed in a region in which the visual field of at least one eye is not ensured.

In view of this, the inventor has made a display apparatus capable of performing image display while suppressing the occurrence of the binocular rivalry by displaying an image in an area of the extended visual field area of at least one of both eyes, which excludes the central visual field, as a display apparatus according to a second embodiment.

8. Display Apparatus According to Second Embodiment of Present Technology

Hereinafter, the display apparatus according to the second embodiment of the present technology will be described taking some examples.

In a display apparatus 60 according to the second embodiment, an irradiation system 100 radiates light only to at least a part of second regions A2. The irradiation system 100 includes a display element 100a worn by the left eye of the user.

Hereinafter, display apparatuses according to the respective examples will be described with reference to a horizontal cross-sectional view and a vertical cross-sectional view of the left eye. However, a similar discussion can be established also as to a horizontal cross-section and a vertical cross-section of the right eye.

(1) Display Apparatus According to Example 1

Figure 25:
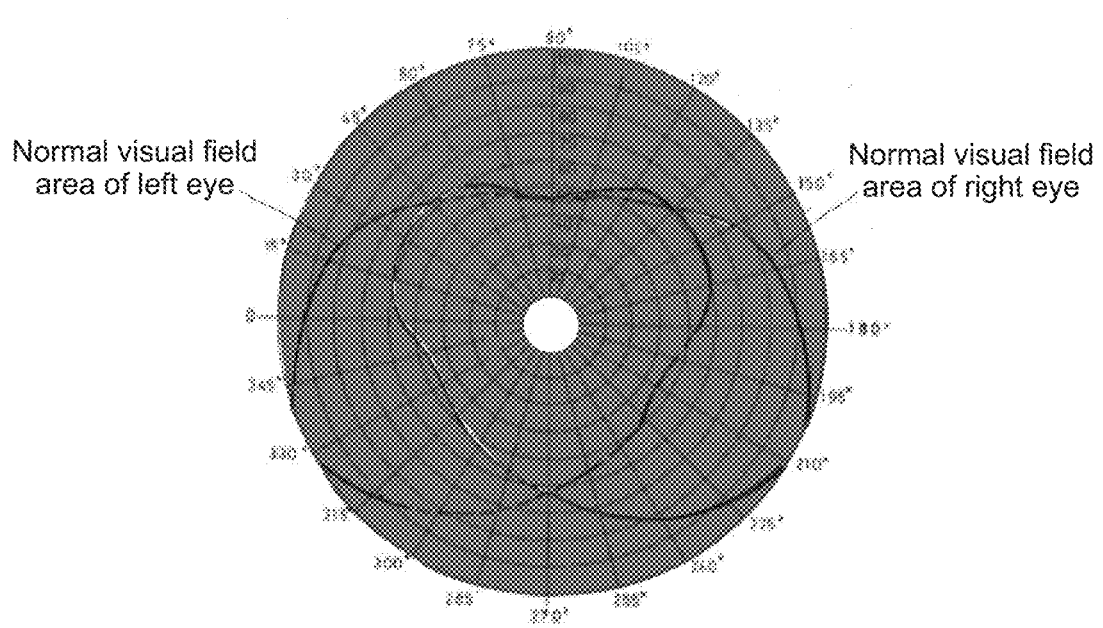
FIG. 25 A diagram showing a region in which an image is displayed by a display apparatus according to Example 1 of a second embodiment of the present technology.
Figure 26:
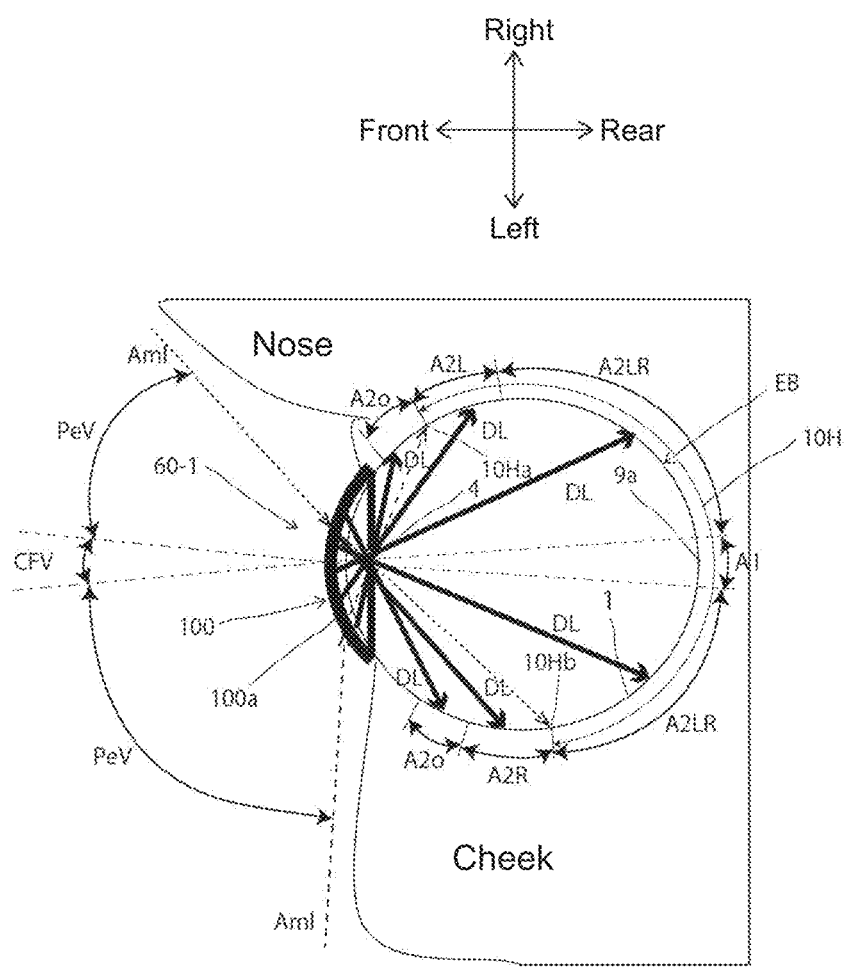
FIG. 26 A horizontal cross-sectional view showing a state in which display light is radiated to the retina from a display apparatus according to Example 1 of the second embodiment of the present technology.

FIG. 25 shows a distribution of an image displayed in the extended visual field area of the left eye by a display apparatus 60-1 according to Example 1 (see FIG. 26, 27). In FIG. 25, an area in which the image is displayed is shown in gray and an area in which no image is displayed is shown in white.

The display apparatus 60-1 according to Example 1 displays the image in an area of the extended visual field area of the left eye, which excludes the central visual field, as shown in FIG. 25.

In order to achieve the image distribution in FIG. 25, in the display apparatus 60-1 according to Example 1, display light DL is radiated to the first peripheral visual field corresponding regions A2LR, the second peripheral visual field corresponding region A2L, the third peripheral visual field corresponding region A2R, and the binocular visual field area outside corresponding regions A2o in the horizontal cross-section as shown in FIG. 26 via the pupil 4 from the display element 100a.

Figure 27:
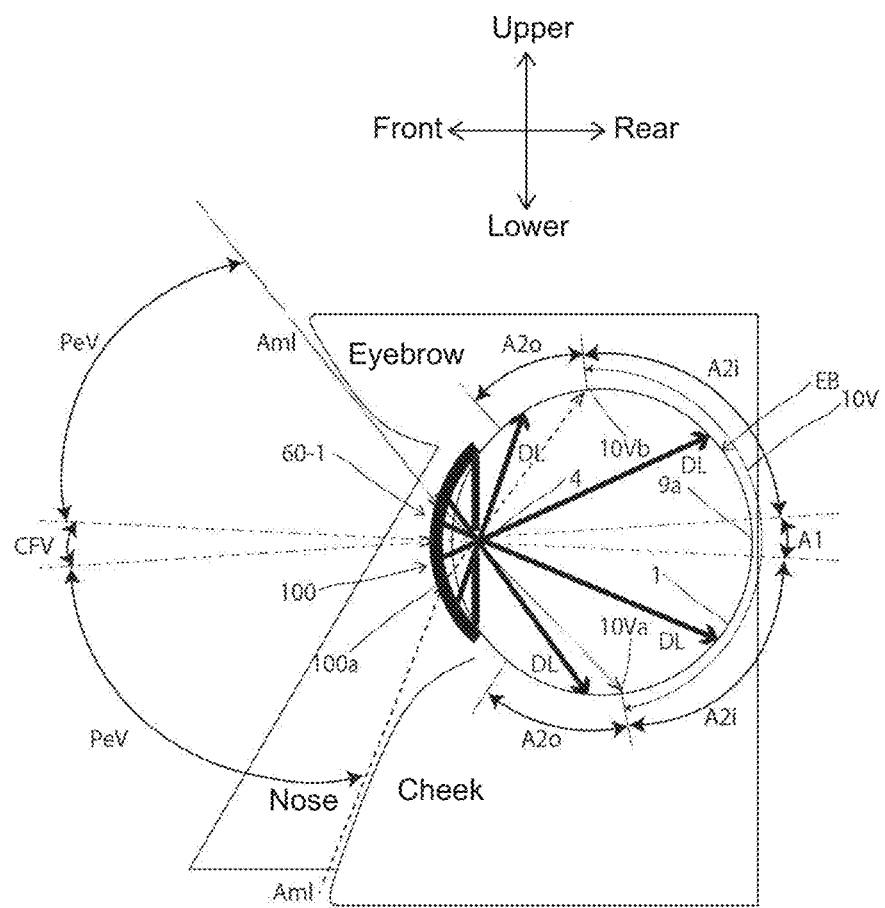
FIG. 27 A vertical cross-sectional view showing a state in which display light is radiated to the retina from the display apparatus according to Example 1 of the second embodiment of the present technology.

In order to achieve the image display distribution in FIG. 25, in the display apparatus 60-1 according to Example 1, display light DL is radiated to the peripheral visual field corresponding regions A2i and the binocular visual field area outside corresponding regions A2o in the vertical cross-section as shown in FIG. 27 via the pupil 4 from the display element 100a.

In accordance with the display apparatus 60-1 according to Example 1 described hereinabove, the image is displayed in substantially the entire region of the region of the extended visual field area, which excludes the central visual field. Therefore, image display can be performed in a very wide area while suppressing the occurrence of the binocular rivalry.

It should be noted that in the display apparatus 60-1 according to Example 1, the resolution may be varied between the areas as in the display apparatus according to the first embodiment. Accordingly, image display with good visibility can be performed in a very wide area while suppressing the occurrence of the binocular rivalry.

(2) Display Apparatus According to Example 2

Figure 28:
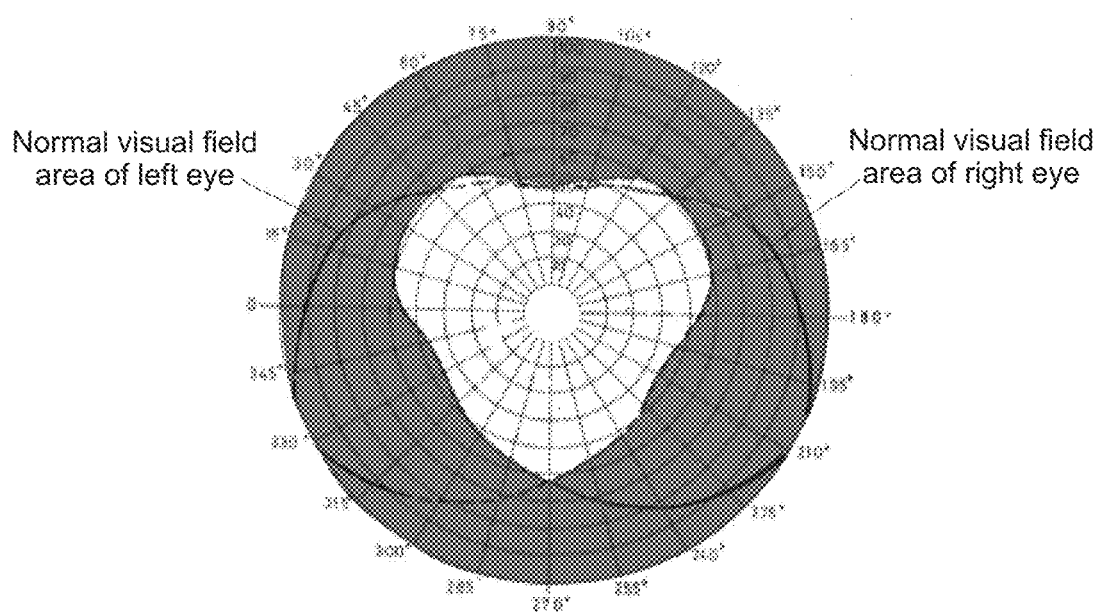
FIG. 28 A diagram showing a region in which an image is displayed by a display apparatus according to Example 2 of the second embodiment of the present technology.
Figure 29:
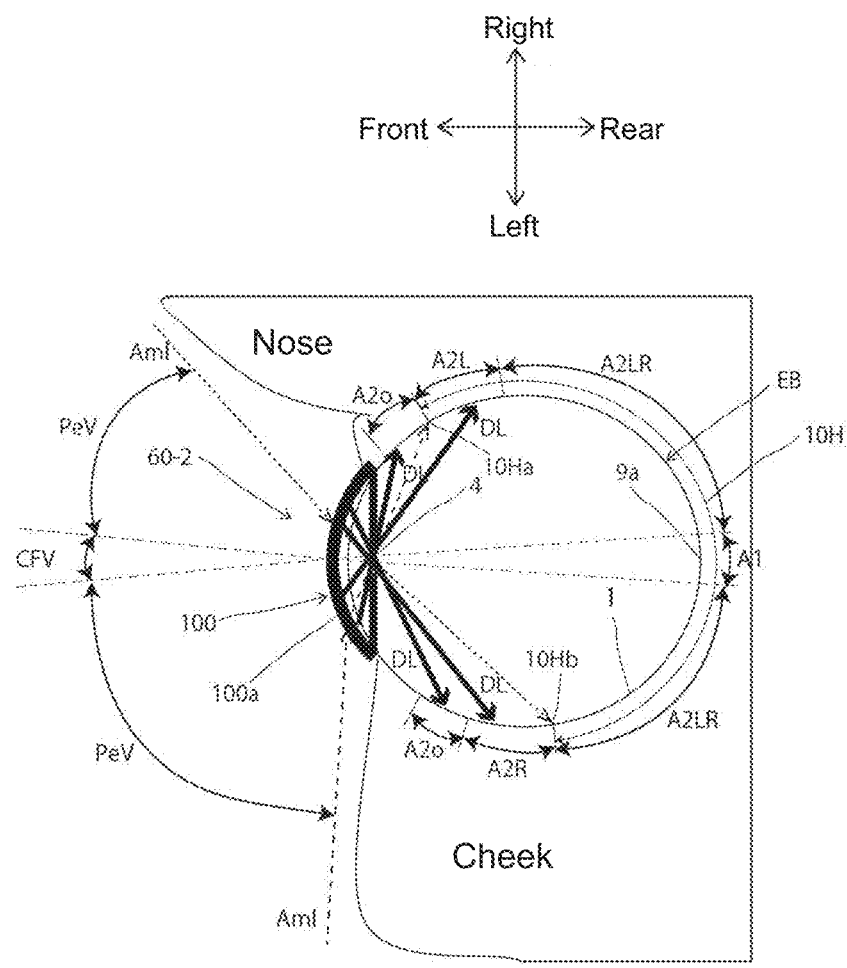
FIG. 29 A horizontal cross-sectional view showing a state in which display light is radiated to the retina from a display apparatus according to Example 2 of the second embodiment of the present technology.

FIG. 28 shows a distribution of an image displayed in the extended visual field area of the left eye by a display apparatus 60-2 according to Example 2 (see FIG. 29, 30). In FIG. 26, the area in which the image is displayed is shown in dark gray and the area in which no image is displayed is shown in white.

The display apparatus 60-2 according to Example 2 displays the image in an area of the extended visual field area of the left eye, which excludes the areas in which the visual field areas of the both eyes overlap each other as shown in FIG. 28.

In order to achieve the image distribution in FIG. 28, in the display apparatus 60-2 according to Example 2, display light DL is radiated to the second peripheral visual field corresponding region A2L, the third peripheral visual field corresponding region A2R, and the binocular visual field area outside corresponding regions A2o in the horizontal cross-section as shown in FIG. 29 via the pupil 4 from the display element 100*a*.

Figure 30:
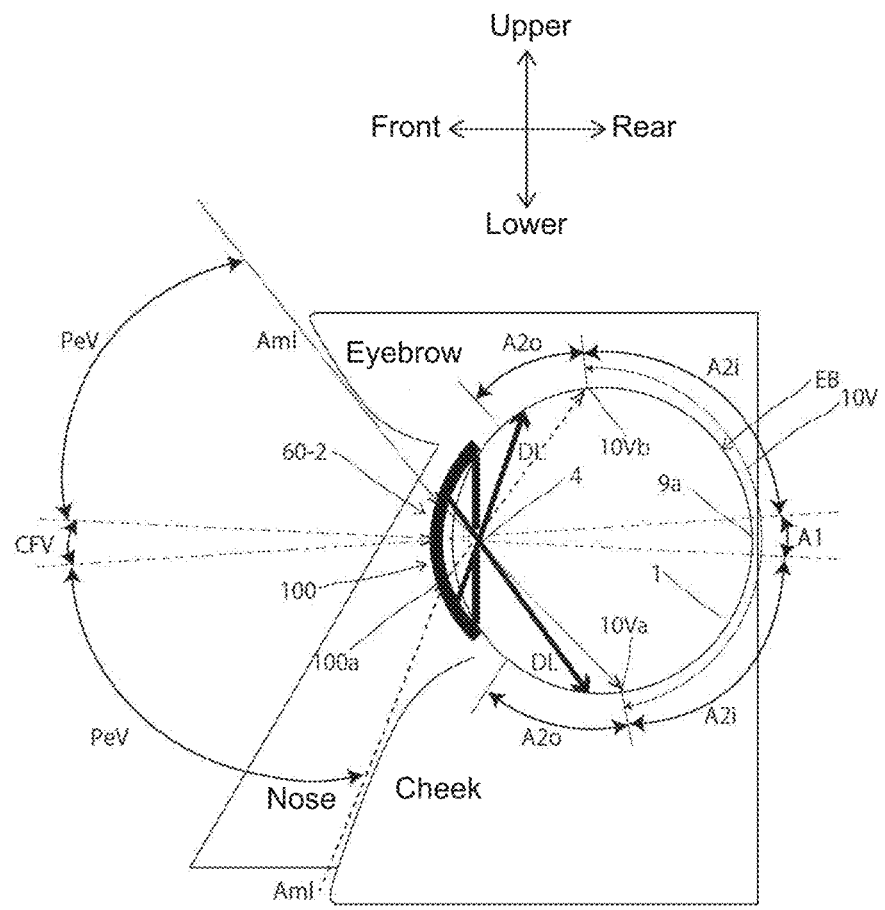
FIG. 30 A vertical cross-sectional view showing a state in which display light is radiated to the retina from the display apparatus according to Example 2 of the second embodiment of the present technology.

In order to achieve the image distribution in FIG. 28, in the display apparatus 60-2 according to Example 2, display light DL is radiated to at least the binocular visual field area outside corresponding regions A2o (also to the peripheral visual field corresponding regions A2i depending on a vertical cross-section) in the vertical cross-section as shown in FIG. 30 via the pupil 4 from the display element 100*a*.

In accordance with the display apparatus 60-2 according to Example 2 described hereinabove, the image in substantially the entire region of the area of the extended visual field area, which excludes the areas in which the visual field areas of the both eyes overlap each other, is displayed. Therefore, image display can be performed in a wide area while reliably suppressing the occurrence of the binocular rivalry.

It should be noted that in the display apparatus 60-2 according to Example 2, the resolution may be varied between the areas as in the display apparatus according to the first embodiment. Accordingly, image display with good visibility can be performed in a wide area while reliably suppressing the occurrence of the binocular rivalry.

(3) Display Apparatus According to Example 3

Figure 31:
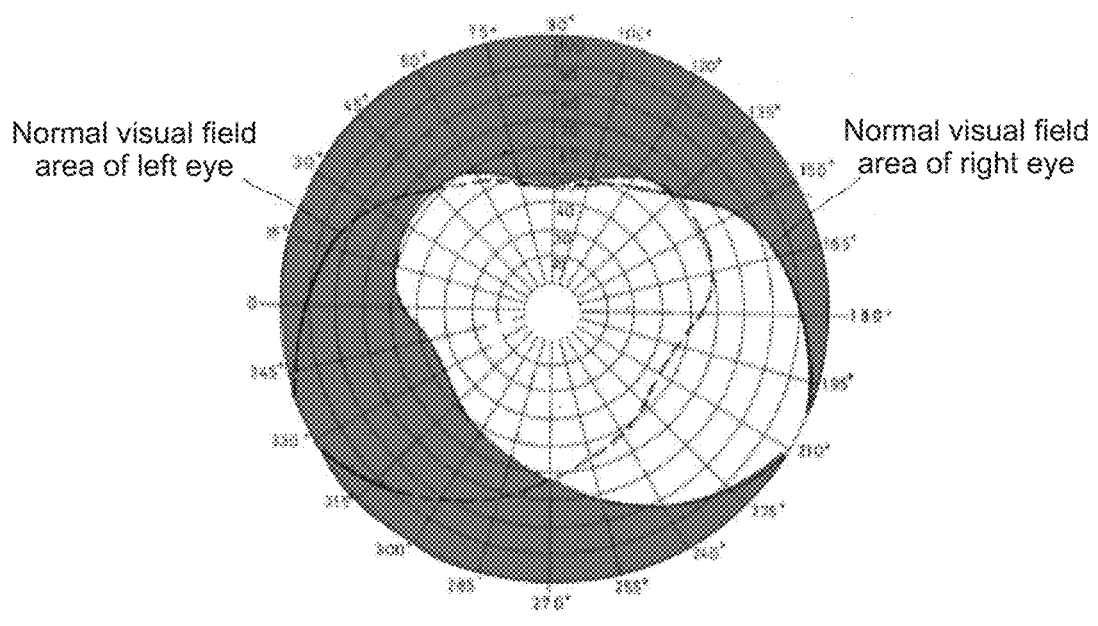
FIG. 31 A diagram showing a region in which an image is displayed by a display apparatus according to Example 3 of the second embodiment of the present technology.
Figure 32:
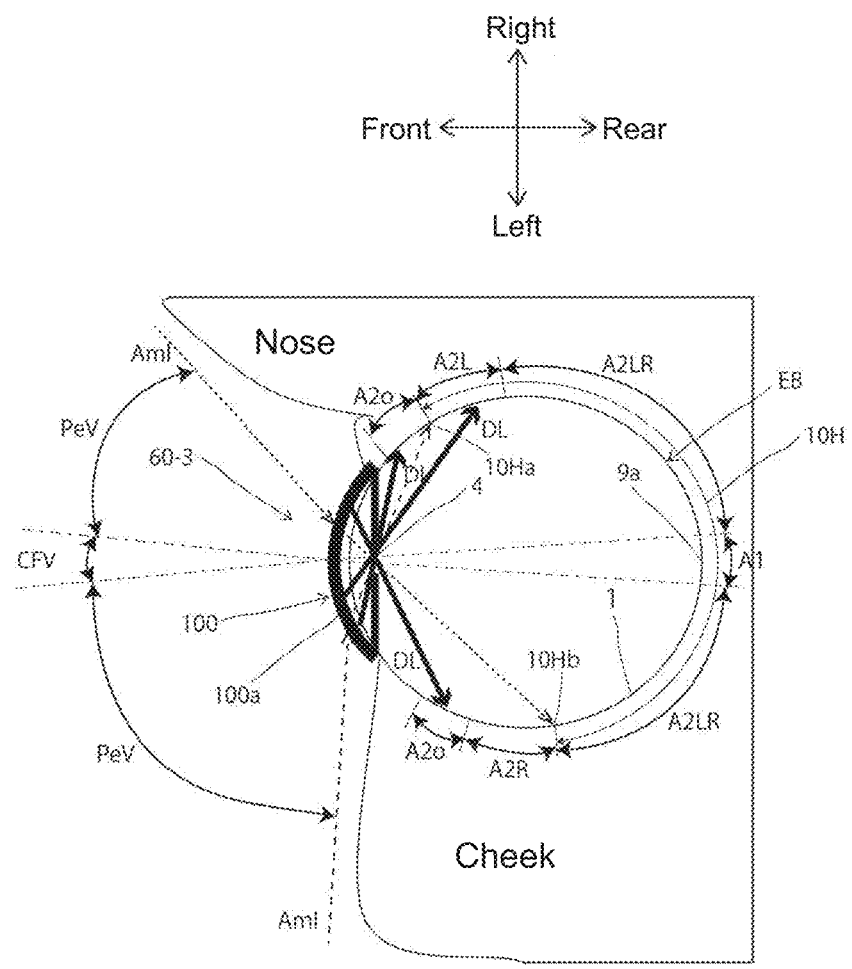
FIG. 32 A horizontal cross-sectional view showing a state in which display light is radiated to the retina from a display apparatus according to Example 3 of the second embodiment of the present technology.

FIG. 31 shows a distribution of an image displayed in the extended visual field area of the left eye by a display apparatus 60-3 according to Example 3 (see FIG. 32). In FIG. 31, the area in which the image is displayed is shown in dark gray and the area in which no image is displayed is shown in white.

The display apparatus 60-3 according to Example 3 displays the image in areas of the extended visual field area of the left eye as shown in FIG. 31, the areas being an area obtained by removing the visual field area of the right eye from the peripheral visual field (area combining the normal visual field area of the left eye and the normal visual field area of the right eye) and an area outside the visual field areas of the both eyes.

In order to achieve the image distribution in FIG. 31, in the display apparatus 60-3 according to Example 3, display light DL is radiated to the second peripheral visual field corresponding region A2L and the binocular visual field area outside corresponding regions A2o in the horizontal cross-section as shown in FIG. 32 via the pupil 4 from the display element 100*a*.

In order to achieve the image distribution in FIG. 31, in the display apparatus 60-3 according to Example 3, display light DL is radiated (see FIG. 30) to at least the binocular visual field area outside corresponding regions A2o (also to the peripheral visual field corresponding regions A2i depending on a vertical cross-section) in the vertical cross-section via the pupil 4 from the display element 100*a* as in the display apparatus 60-2 according to Example 2.

In accordance with the display apparatus 60-3 according to Example 3 described hereinabove, the image is displayed in the areas of the extended visual field area, the areas being the area obtained by removing the visual field area of the right eye from the peripheral visual field and the area outside the visual field areas of the both eyes. Therefore, image display can be performed in a slightly wide area while reliably suppressing the occurrence of the binocular rivalry.

It should be noted that in the display apparatus 60-3 according to Example 3, the resolution may be varied between the areas as in the display apparatus according to the first embodiment. Accordingly, image display with better visibility can be performed in a slightly wide area while reliably suppressing the occurrence of the binocular rivalry.

(4) Display Apparatus According to Example 4

Figure 33:
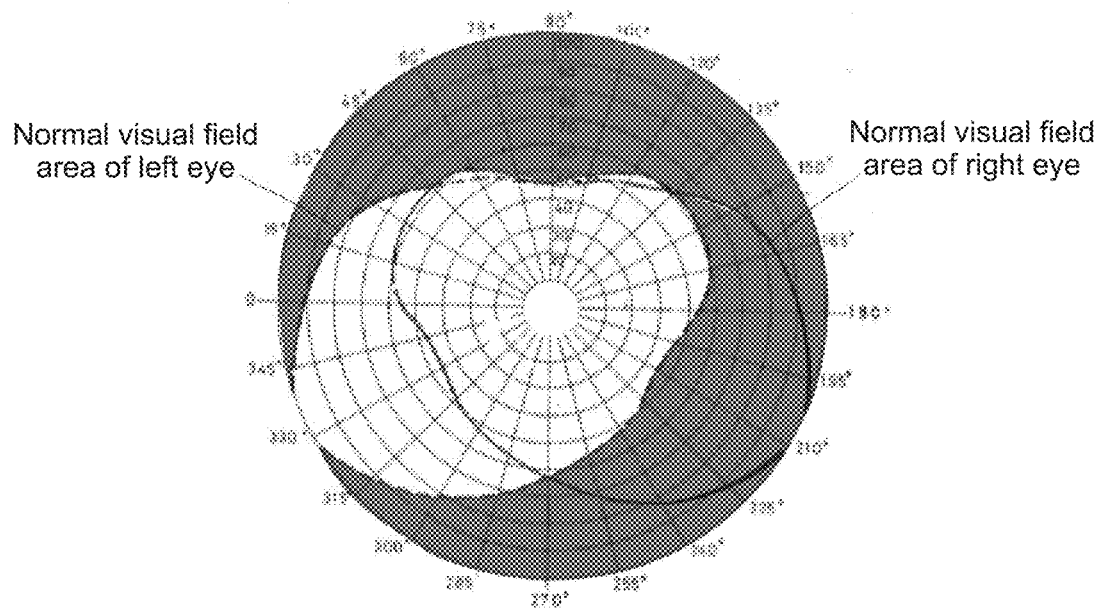
FIG. 33 A diagram showing a region in which an image is displayed by a display apparatus according to Example 4 of the second embodiment of the present technology.
Figure 34:
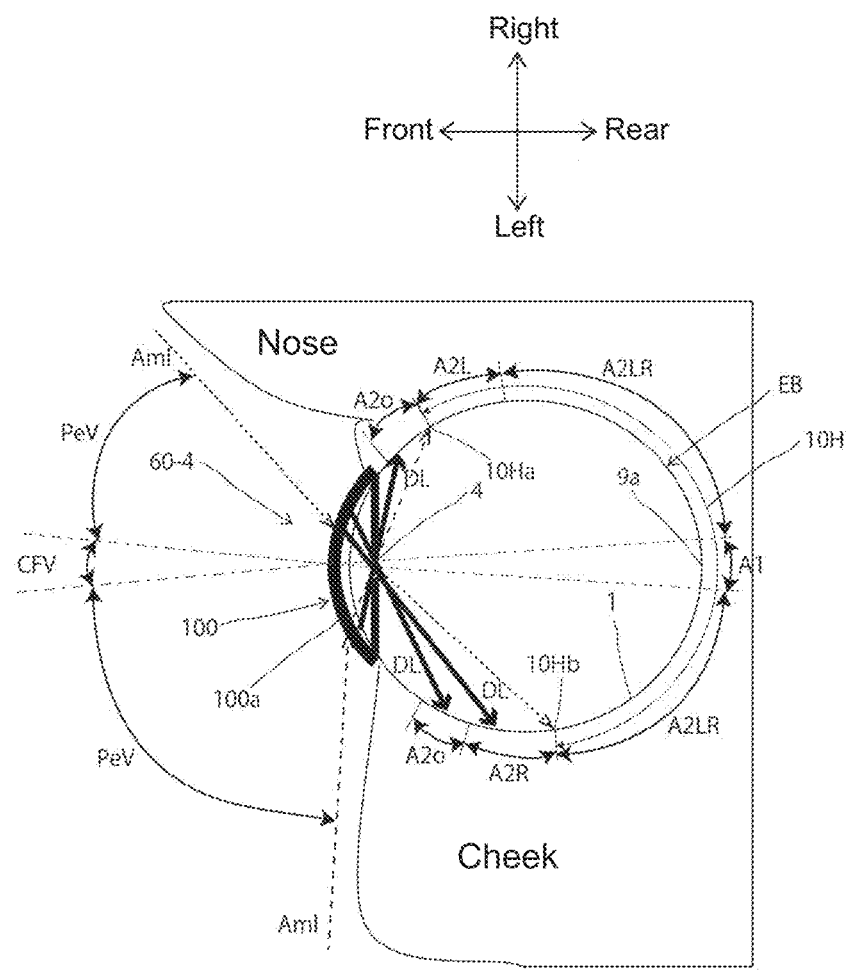
FIG. 34 A horizontal cross-sectional view showing a state in which display light is radiated to the retina from a display apparatus according to Example 4 of the second embodiment of the present technology.

FIG. 33 shows a distribution of an image displayed in the extended visual field area of the left eye by a display apparatus 60-4 according to Example 4 (see FIG. 34). In FIG. 33, the area in which the image is displayed is shown in dark gray and the area in which no image is displayed is shown in white.

The display apparatus 60-4 according to Example 4 displays the image in areas of the extended visual field area of the left eye as shown in FIG. 33, the areas being obtained by removing the visual field area of the left eye from the peripheral visual field and an area outside the visual field areas of the both eyes.

In order to achieve the image distribution in FIG. 33, in the display apparatus 60-4 according to Example 4, display light DL is radiated to the third peripheral visual field corresponding region A2R (region corresponding to the outside of the visual field area of the left eye and the inside of the visual field area of the right eye) and the binocular visual field area outside corresponding regions A2o in the horizontal cross-section as shown in FIG. 34 via the pupil 4 from the display element 100*a*.

In order to achieve the image distribution in FIG. 33, in the display apparatus 60-4 according to Example 4, display light DL is radiated (see FIG. 30) to at least the binocular visual field area outside corresponding regions A2o (also to the peripheral visual field corresponding regions A2i depending on a vertical cross-section) in the vertical cross-section via the pupil 4 from the display element 100*a* as in the display apparatus 60-2 according to Example 2.

In accordance with the display apparatus 60-4 according to Example 4 described hereinabove, the image is displayed in the areas of the extended visual field area, the areas being obtained by removing the visual field area of the left eye from the peripheral visual field and the area outside the visual field areas of the both eyes. Therefore, the image display in a slightly wide area can be performed while reliably suppressing the occurrence of the binocular rivalry.

It should be noted that in the display apparatus according to Example 4, the resolution may be varied between the areas as in the display apparatus according to the first embodiment. Accordingly, image display with good visibility can be performed in a slightly wide area while reliably suppressing the occurrence of the binocular rivalry.

(5) Display Apparatus According to Example 5

Figure 35:
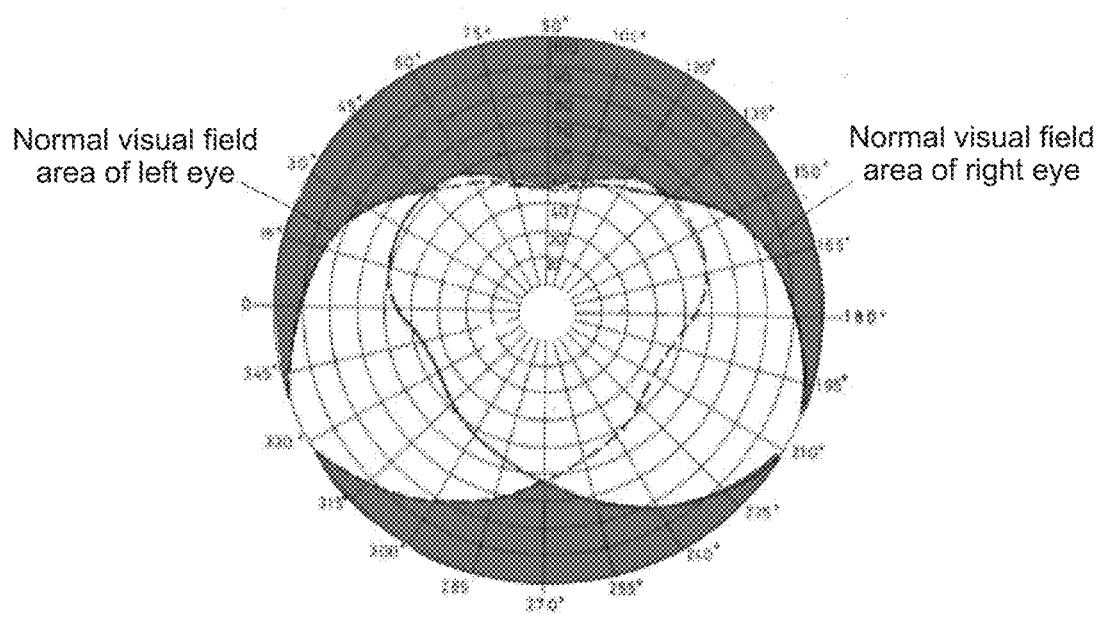
FIG. 35 A diagram showing a region in which an image is displayed by a display apparatus according to Example 5 of the second embodiment of the present technology.
Figure 36:
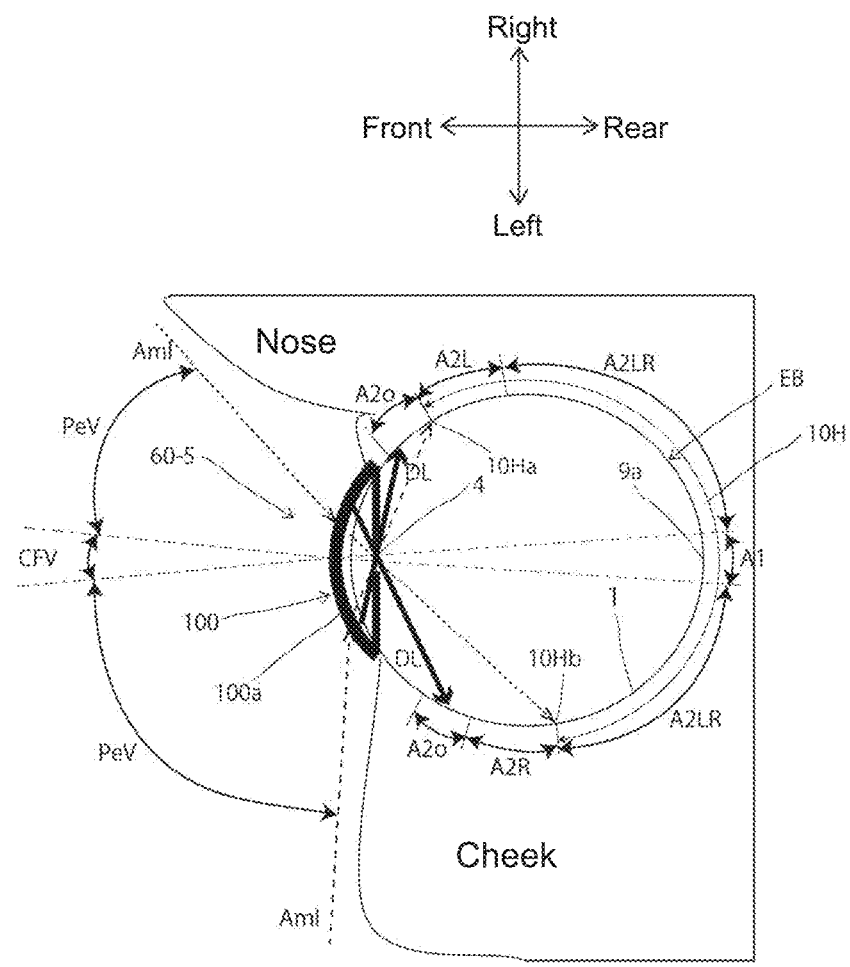
FIG. 36 A horizontal cross-sectional view showing a state in which display light is radiated to the retina from a display apparatus according to Example 5 of the second embodiment of the present technology.

FIG. 35 shows a distribution of an image displayed in the extended visual field area of the left eye by a display apparatus 60-5 according to Example 5 (see FIG. 36). In FIG. 35, the area in which the image is displayed is shown in dark gray and the area in which no image is displayed is shown in white.

The display apparatus 60-5 according to Example 5 displays the image in an area of the extended visual field area of the left eye, which is outside the visual field areas of the both eyes, as shown in FIG. 35.

In order to achieve the image distribution in FIG. 35, in the display apparatus 60-5 according to Example 5, display light DL is radiated to the binocular visual field area outside corresponding regions A2o in the horizontal cross-section as shown in FIG. 36 via the pupil 4 from the display element 100a.

In order to achieve the image distribution in FIG. 35, in the display apparatus 60-5 according to Example 5, display light DL is radiated (see FIG. 30) to the binocular visual field area outside corresponding regions A2o in the vertical cross-section via the pupil 4 from the display element 100a as in the display apparatus 60-2 according to Example 2.

In accordance with the display apparatus 60-5 according to Example 5 described hereinabove, the image is displayed only to the area of the extended visual field area, which is outside the visual field areas of the both eyes. Therefore, the image display can be performed in a limited area while reliably suppressing the occurrence of the binocular rivalry.

It should be noted that in the display apparatus 60-5 according to Example 5, the resolution may be varied between the areas as in the display apparatus according to the first embodiment.

(6) Display Apparatus According to Example 6

Figure 37:
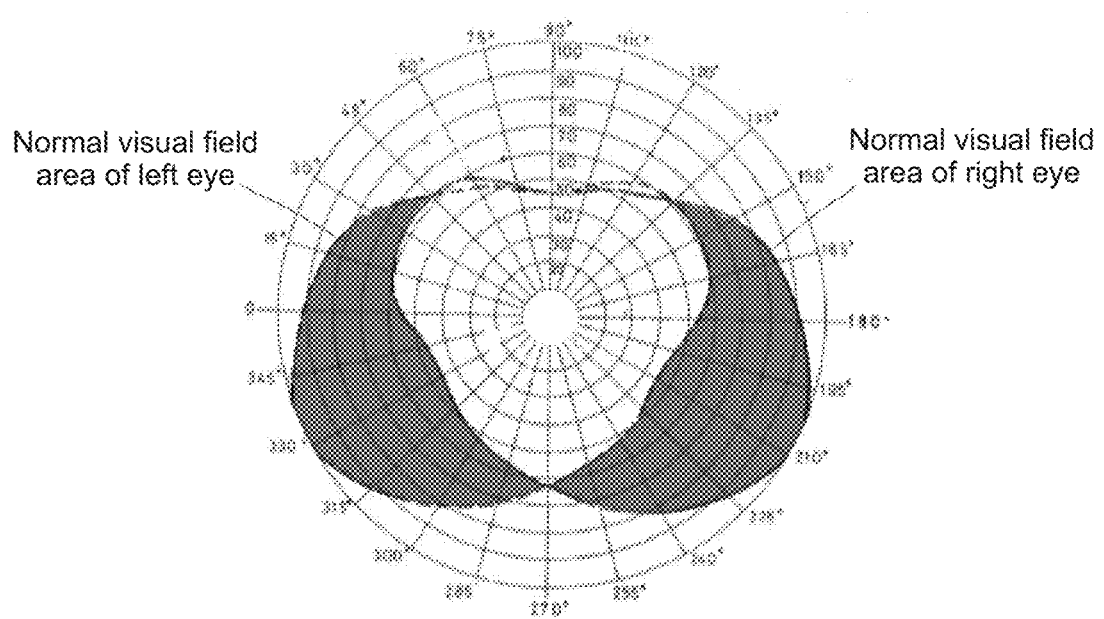
FIG. 37 A diagram showing a region in which an image is displayed by a display apparatus according to Example 6 of the second embodiment of the present technology.
Figure 38:
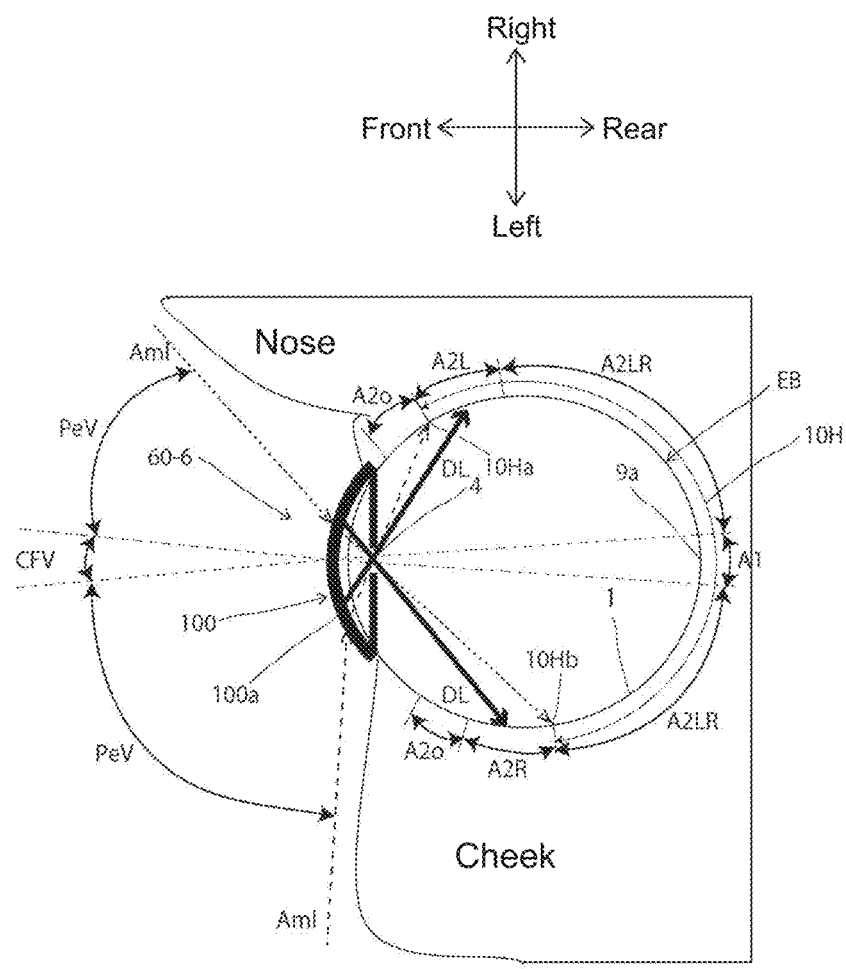
FIG. 38 A horizontal cross-sectional view showing a state in which display light is radiated to the retina from a display apparatus according to Example 6 of the second embodiment of the present technology.
Figure 39:
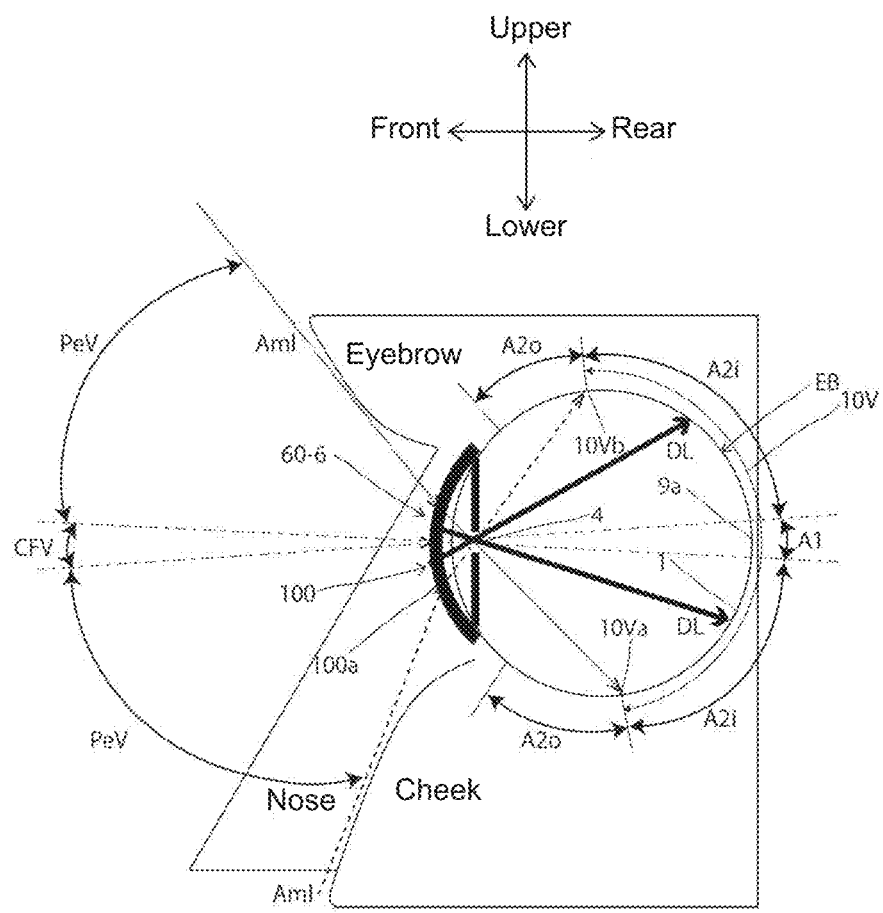
FIG. 39 A vertical cross-sectional view showing a state in which display light is radiated to the retina from the display apparatus according to Example 6 of the second embodiment of the present technology.

FIG. 37 shows a distribution of the image displayed in the extended visual field area by the display apparatus 60-6 according to Example 6 (see FIGS. 38 and 39). In FIG. 37, the area in which the image is displayed is shown in dark gray and the area in which no image is displayed is shown in white.

The display apparatus 60-1 according to Example 6 displays the image in the area inside the visual field area of the left eye and outside the visual field area of the right eye and the area outside the visual field area of the left eye and inside the visual field area of the right eye in the extended visual field area of the left eye as shown in FIG. 37.

In order to achieve the image distribution in FIG. 37, in the display apparatus 60-6 according to Example 6, display light DL is radiated to the second peripheral visual field corresponding region A2L and the third peripheral visual field corresponding region A2R in the horizontal cross-section as shown in FIG. 38 via the pupil 4 from the display element 100a.

In order to achieve the image distribution in FIG. 37, in the display apparatus 60-6 according to Example 6, as shown in FIG. 39, display light DL is radiated to the peripheral visual field corresponding regions A2i in a vertical cross-section (it should be noted that a vertical cross-section excluding a vertical cross-section at the center) via the pupil 4 from the display element 100a.

In accordance with the display apparatus 60-6 according to Example 6 described hereinabove, the image is displayed in the area inside the visual field area of the left eye and outside the visual field area of the right eye and the area outside the visual field area of the left eye and inside the visual field area of the right eye in the extended visual field area of the left eye. Therefore, image display can be performed in a slightly narrow area while reliably suppressing the occurrence of the binocular rivalry.

It should be noted that in the display apparatus 60-6 according to Example 6, the resolution may be varied between the areas as in the display apparatus according to the first embodiment. Accordingly, image display with good visibility can be performed in a slightly narrow area while reliably suppressing the occurrence of the binocular rivalry.

(7) Display Apparatus According to Example 7

Figure 40:
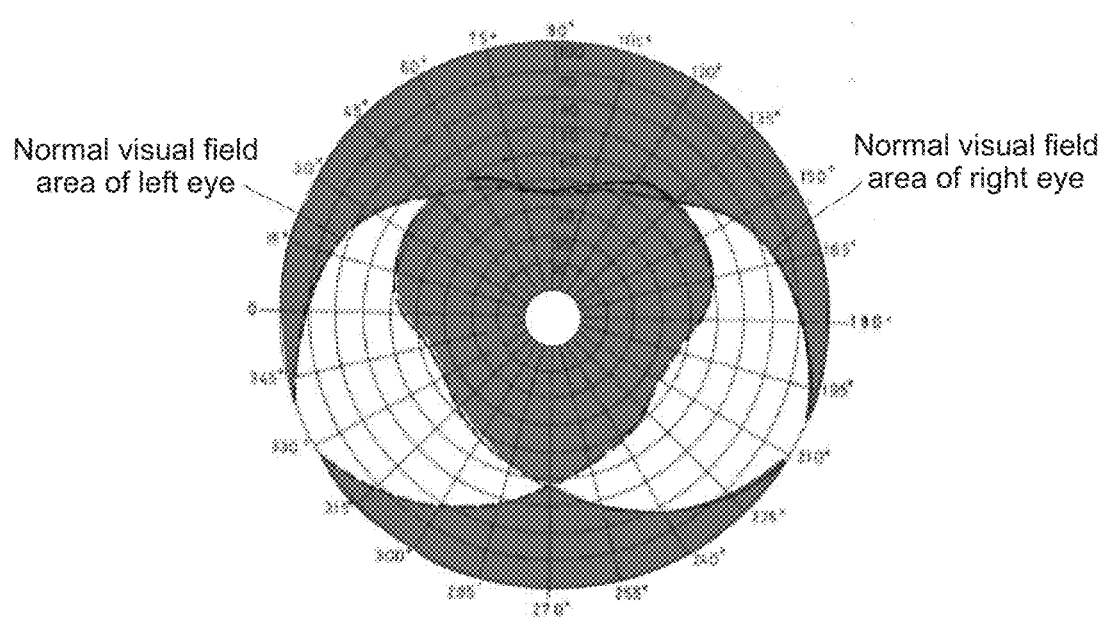
FIG. 40 A diagram showing a region in which an image is displayed by a display apparatus according to Example 7 of the second embodiment of the present technology.
Figure 41:
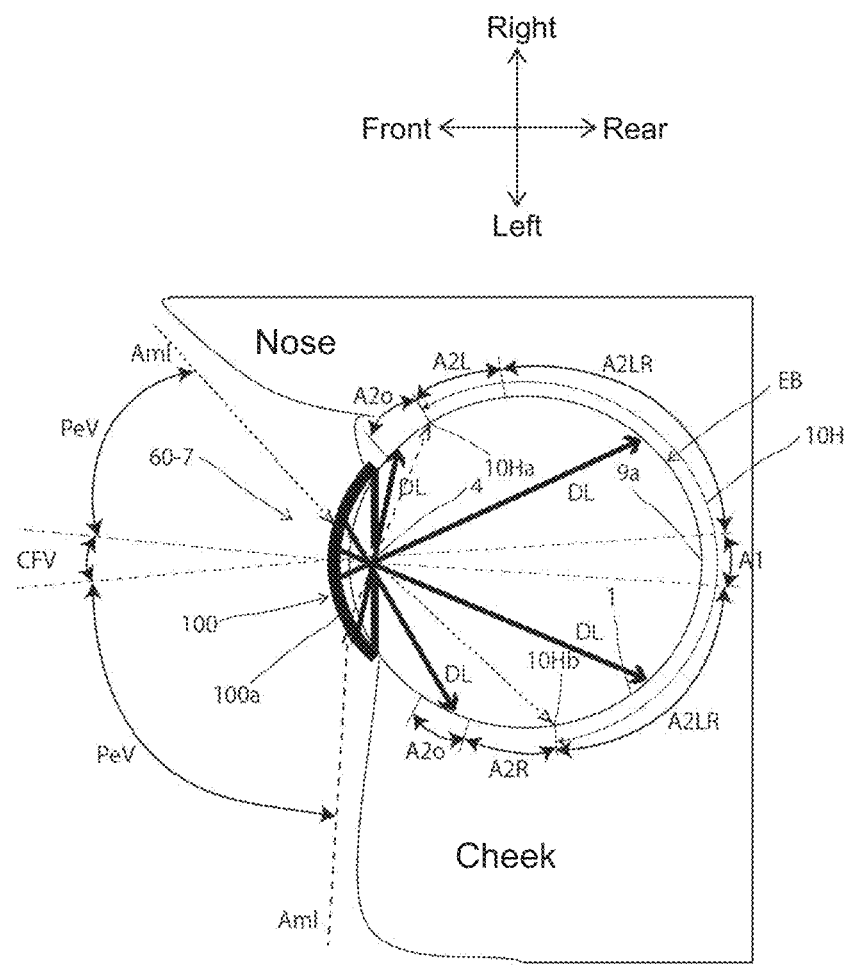
FIG. 41 A horizontal cross-sectional view showing a state in which display light is radiated to the retina from a display apparatus according to Example 7 of the second embodiment of the present technology.

FIG. 40 shows a distribution of an image displayed in the extended visual field area of the left eye by a display apparatus 60-7 according to Example 7 (see FIG. 41). In FIG. 40, the area in which the image is displayed is shown in dark gray and the area in which no image is displayed is shown in white.

The display apparatus 60-7 according to Example 7 displays the image in an area obtained by removing, from the extended visual field area of the left eye, the central visual field, the area inside the visual field area of the left eye and outside the visual field area of the right eye, and the area outside the visual field area of the left eye and inside the visual field area of the right eye as shown in FIG. 40.

In order to achieve the image distribution in FIG. 40, in the display apparatus 60-7 according to Example 7, display light DL is radiated to the first peripheral visual field corresponding regions A2LR and the binocular visual field area outside corresponding regions A2o in the horizontal cross-section as shown in FIG. 41 via the pupil 4 from the display element 100a.

In order to achieve the image distribution in FIG. 40, in the display apparatus 60-7 according to Example 7, display light DL is radiated (see FIG. 27) to the peripheral visual field corresponding regions A2i and the binocular visual field area outside corresponding regions A2o in the vertical cross-section via the pupil 4 from the display element 100a as in the display apparatus 60-1 according to Example 1.

In accordance with the display apparatus 60-7 according to Example 7 described hereinabove, the image is displayed in the area obtained by removing, from the extended visual field area, the area inside the visual field area of the left eye and outside the visual field area of the right eye and the area outside the visual field area of the left eye and inside the visual field area of the right eye. Therefore, image display can be performed in a slightly wide area while suppressing the occurrence of the binocular rivalry.

It should be noted that in the display apparatus 60-7 according to Example 7, the resolution may be varied between the areas as in the display apparatus according to the first embodiment. Accordingly, image display with good visibility can be performed in a slightly wide area while suppressing the occurrence of the binocular rivalry.

(8) Display Apparatus According to Example 8

Figure 42:
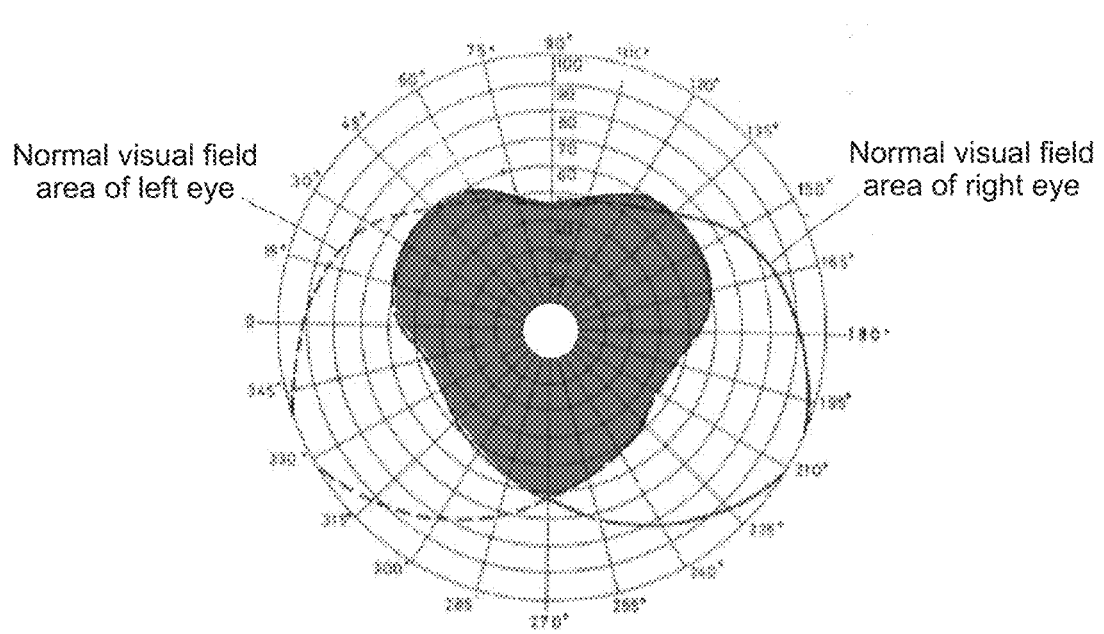
FIG. 42 A diagram showing a region in which an image is displayed by a display apparatus according to Example 8 of the second embodiment of the present technology.
Figure 43:
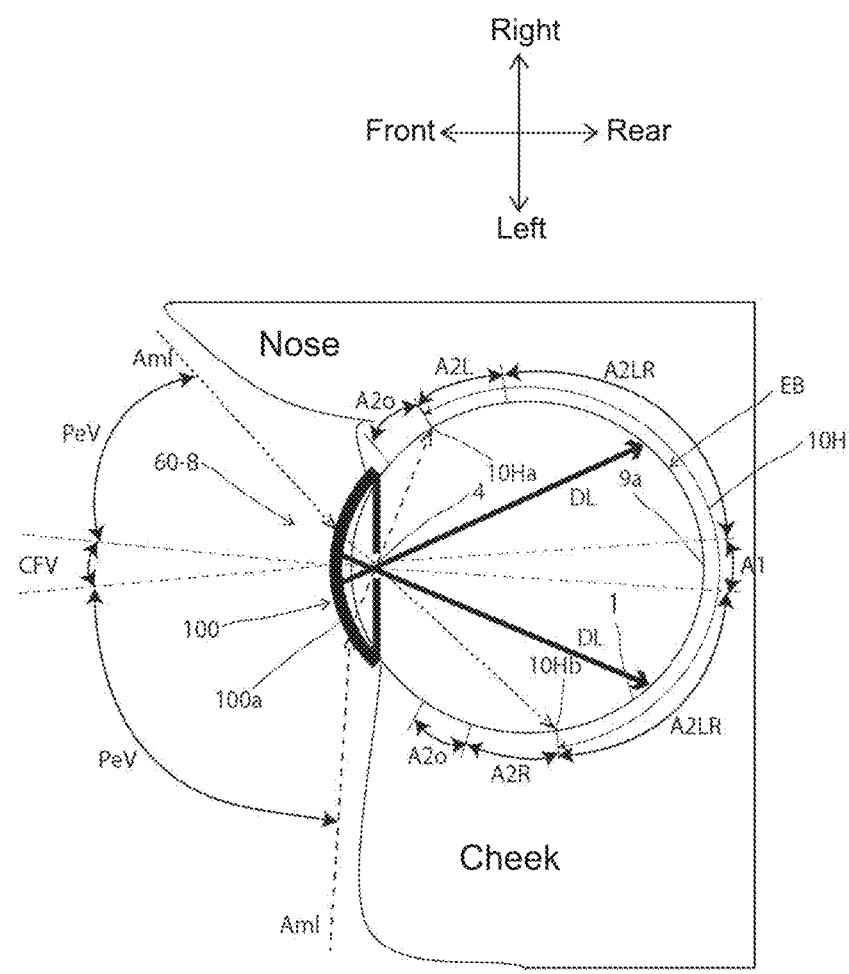
FIG. 43 A horizontal cross-sectional view showing a state in which display light is radiated to the retina from a display apparatus according to Example 8 of the second embodiment of the present technology.
Figure 44:
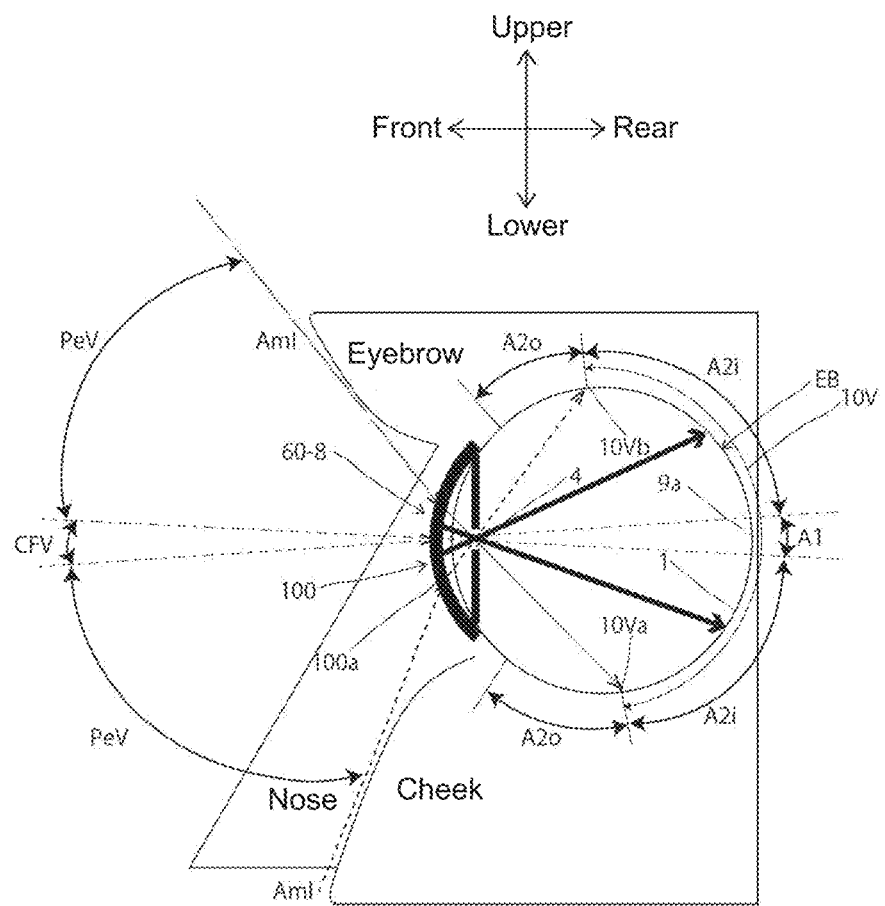
FIG. 44 A vertical cross-sectional view showing a state in which display light is radiated to the retina from the display apparatus according to Example 8 of the second embodiment of the present technology.

FIG. 42 shows a distribution of an image displayed in the extended visual field area of the left eye by the display apparatus 60-8 according to Example 8 (see FIGS. 43 and 44). In FIG. 42, the area in which the image is displayed is shown in dark gray and the area in which no image is displayed is shown in white.

The display apparatus 60-8 according to Example 8 displays the image in an area of the extended visual field area of the left eye, which is areas in which the visual field areas of the both eyes overlap each other and excludes the central visual field, as shown in FIG. 42.

In order to achieve the image distribution in FIG. 42, in the display apparatus 60-8 according to Example 8, display light DL is radiated to the first peripheral visual field corresponding regions A2LR in the horizontal cross-section as shown in FIG. 43 via the pupil 4 from the display element 100*a*.

In order to achieve the image distribution in FIG. 42, in the display apparatus 60-8 according to Example 8, display light DL is radiated to the peripheral visual field corresponding regions A2*i* in the vertical cross-section as shown in FIG. 44 via the pupil 4 from the display element 100*a*.

In accordance with the display apparatus 60-8 according to Example 8 described hereinabove, the image is displayed in the area of the extended visual field area of the left eye, which is the areas in which the visual field areas of the both eyes overlap each other and excludes the central visual field. Therefore, image display can be performed in an area having relatively excellent visual perception while suppressing the occurrence of the binocular rivalry.

It should be noted that in the display apparatus 60-8 according to Example 8, the resolution may be varied between the areas as in the display apparatus according to the first embodiment. Accordingly, image display with good visibility can be performed in an area having relatively excellent visual perception while suppressing the occurrence of the binocular rivalry.

Hereinabove, the display apparatuses according to Examples 1 to 8 of the second embodiment have been described. However, the display apparatus according to the second embodiment may switch and perform the image display by the display apparatuses according to Examples 1 to 8 as necessary by, for example, a switching operation or automatically.

By the way, in a case where there is a defect of the visual field in the user's eyes, higher-resolution display can be performed by using a display element 100*a* having a constant number of pixels by displaying an image in a region in which the visual perception of the user is ensured rather than displaying the image in a visual field area lost due to the defect of the visual field (an area in which the visual perception of the user is not ensured). Hereinafter, modified examples of performing such display will be described.

Figure 45:
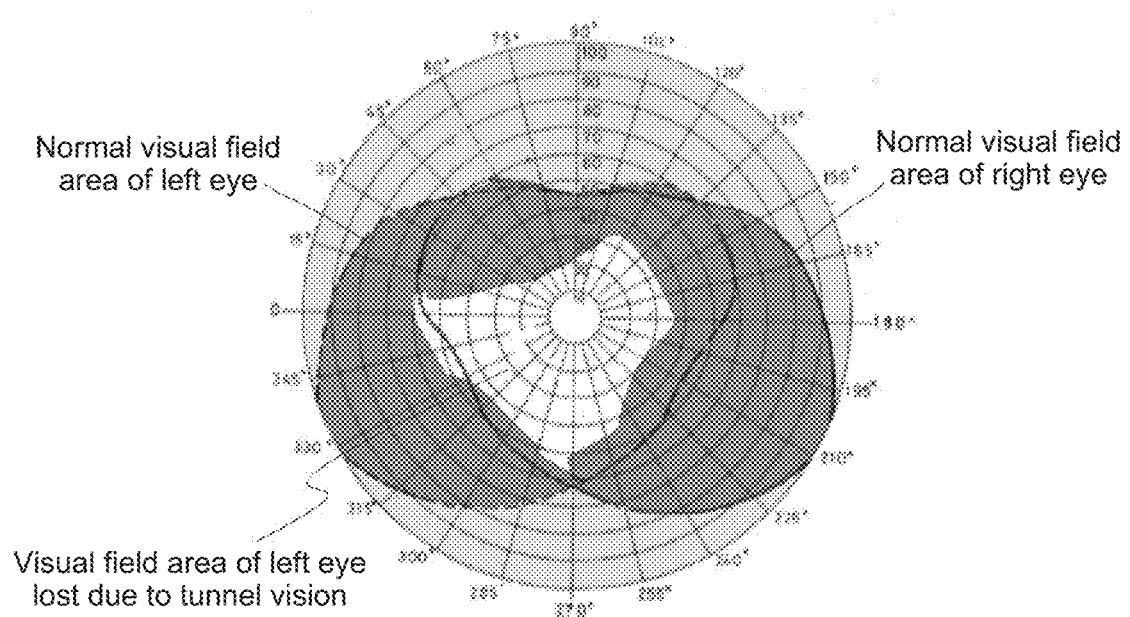
FIG. 45 A diagram showing a region in which an image is displayed by a display apparatus according to a modified example of the first embodiment.

9. Display Apparatus According to Modified Example of First Embodiment of Present Technology For example, in the display apparatus according to any one of the modified examples of the first embodiment, high-resolution image display is performed in an area (dark gray region) other than a visual field area (white region) lost due to the defect of the visual field of the left eye in the peripheral visual field and low-resolution display is performed in areas (light gray regions) outside the visual field areas of the both eyes as shown in FIG. 45.

It should be noted that the image may be displayed only in the area other than the visual field area lost due to the defect of the visual field of the left eye in the peripheral visual field. In this case, higher-resolution image display can be performed.

Figure 46:
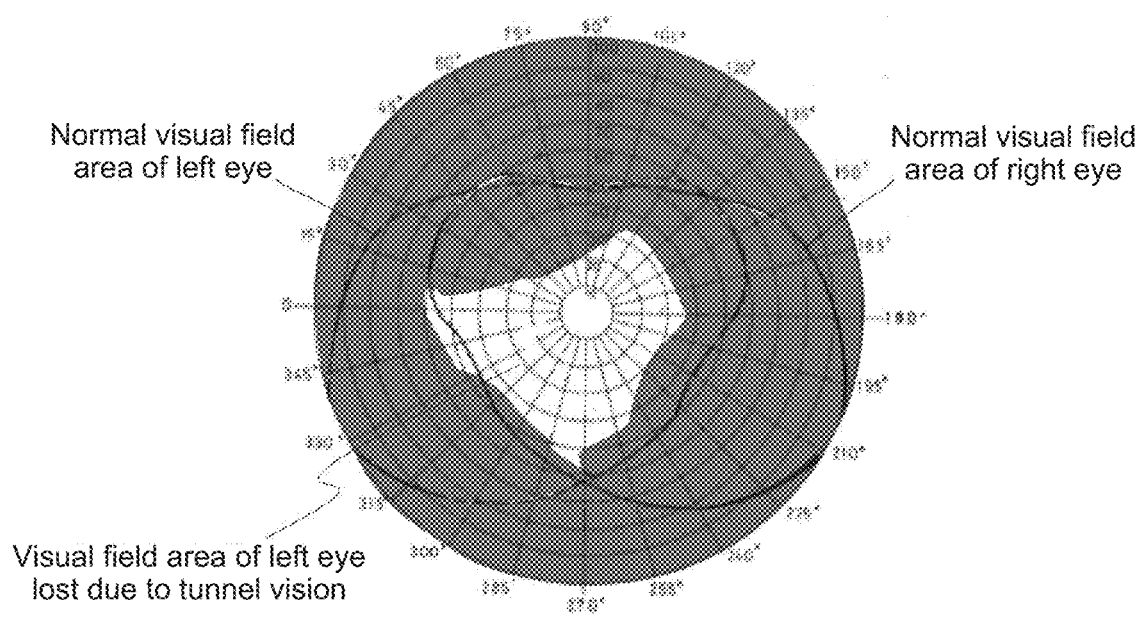
FIG. 46 A diagram showing a region in which an image is displayed by a display apparatus according to a modified example of the second embodiment.

10. Display Apparatus According to Modified Example of Second Embodiment of Present Technology For example, in the display apparatus according to any one of the modified examples of the second embodiment, image display is performed in an area (dark gray region) of the extended visual field area other than a visual field area (here, a white region including the central visual field) lost due to the defect of the visual field of the left eye as shown in FIG. 46.

It should be noted that the image may be displayed only in the area of the peripheral visual field other than the visual field area lost due to the defect of the visual field of the left eye.

11. <Display Apparatus According to Modified Example 1 of Present Technology>

Hereinafter, a display apparatus 150 according to Modified Example 1 of the present technology will be described with reference to FIGS. 47 and 48.

Figure 47:
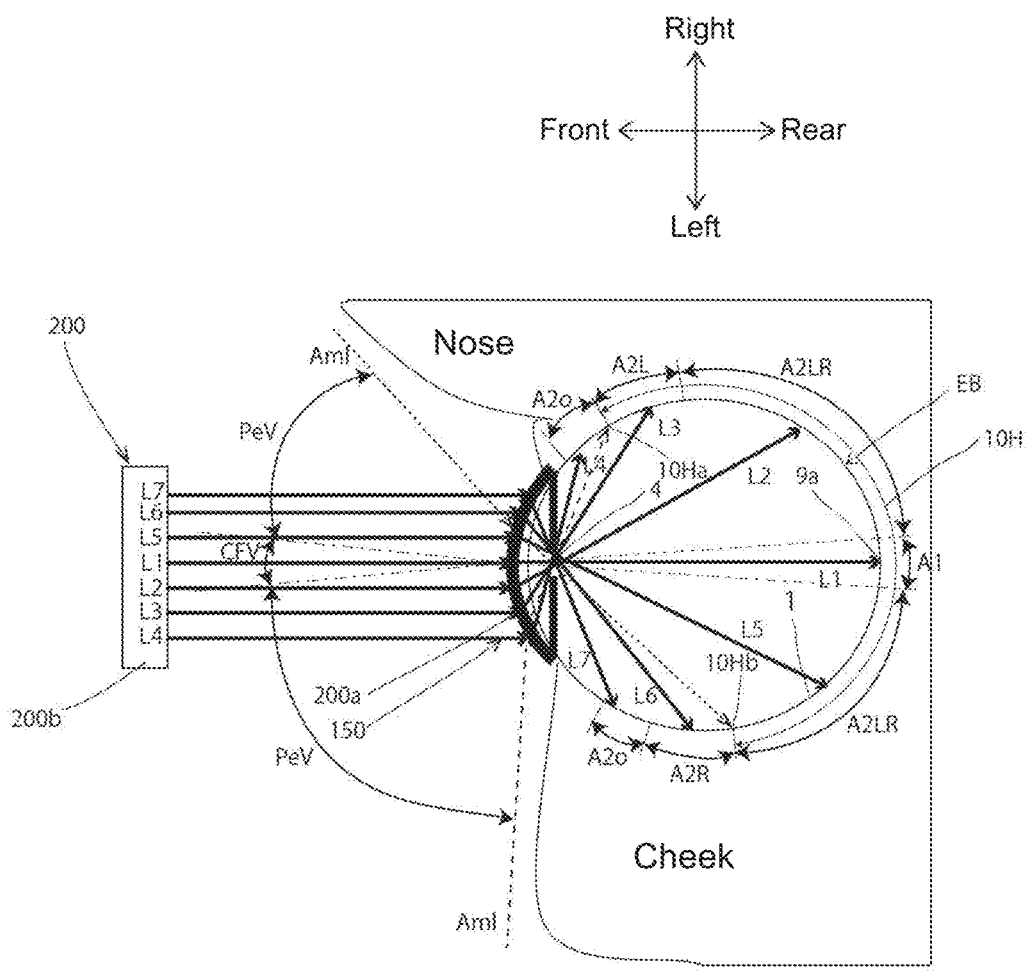
FIG. 47 A horizontal cross-sectional view for describing a display apparatus according to Modified Example 1 of the present technology.
Figure 48:
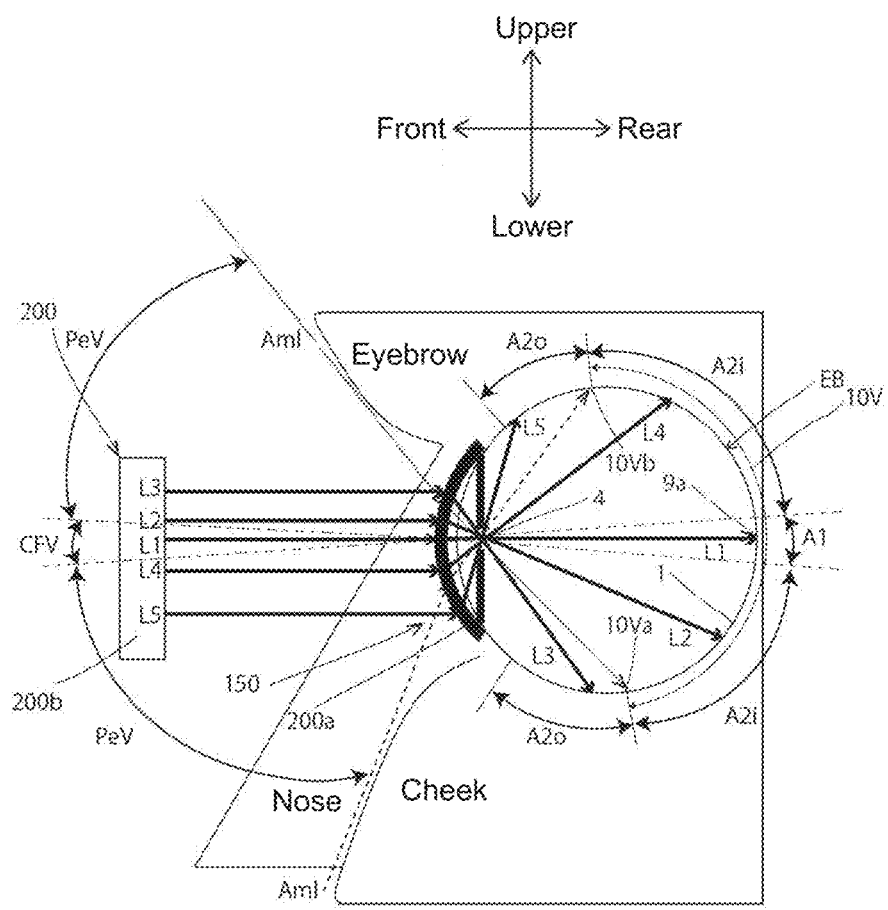
FIG. 48 A vertical cross-sectional view for describing the display apparatus according to Modified Example 1 of the present technology.

In a display apparatus 150 according to Modified Example 1, an irradiation system 200 includes an optical element 200*a* integrated with the eyeball at least during use and a light projection unit 200*b* that projects light toward the optical element 200*a* as shown in FIGS. 47 and 48.

The optical element 200*a* is an optical element (e.g., a lens) wearable on an eye (e.g., a contact lens-type). The optical element 200*a* has a function of bending an incident light beam by refraction or diffraction. The optical element 200*a* is worn by the eyeball EB so as to cover the cornea 5. FIGS. 47 and 48 show an example in which the optical element 200*a* is worn by the left eye of the user.

The light projection unit 200*b* includes, for example, a light source (e.g., a laser) and a collimating lens that makes light from the light source parallel light. This configuration is suitable for image display by the display apparatus according to the second embodiment.

It should be noted that the light projection unit 200*b* may include a self-light-emitting element such as a MOLED, an LED array, and an organic EL element array, may include a liquid-crystal display unit and a light source (e.g., an LED), or may include a light deflector (e.g., a MEMS mirror) and a light source (e.g., a laser) that radiates light to the light deflector.

In the horizontal cross-section as shown in FIG. 47, light L1 projected from the light projection unit 200*b* is made incident on the center portion of the optical element 200*a*, travels straight as it is, passes through the pupil 4, and is made incident on the first region A1.

In the horizontal cross-section as shown in FIG. 47, light L2, L3, L4, L5, L6, and L7 projected from the light projection unit 200*b* are respectively made incident on and are refracted by the optical element 200*a* and pass through the pupil 4, and are made incident on the first peripheral visual field corresponding regions A2LR on the right-hand side, the second peripheral visual field corresponding region A2L, the binocular visual field area outside corresponding regions Ao on the right-hand side, the first peripheral visual field corresponding regions A2LR on the left-hand side, the third peripheral visual field corresponding region A2R, and the binocular visual field area outside corresponding regions Ao on the left-hand side.

In the vertical cross-section as shown in FIG. 48, the light L1 projected from the light projection unit 200*b* is made incident on the center portion of the optical element 200*a*, travels straight as it is, passes through the pupil 4, and is made incident on the first region A1.

In the vertical cross-section as shown in FIG. 48, light L2, L3, L4, and L5 projected from the light projection unit 200b are respectively made incident on and are refracted by the optical element 200a, pass through the pupil 4, and are made incident on the peripheral visual field corresponding region A2i on the lower side, the binocular visual field area outside corresponding regions Ao on the lower side, the peripheral visual field corresponding region A2i on the upper side, and the binocular visual field area outside corresponding regions Ao on the upper side.

The light projection unit 200b is capable of selectively projecting light of at least one of the light L1 to L7.

The light projection unit 200b may include, for example, a light source and a light deflector that deflects and scans light from the light source. This configuration is compatible with the image display of both the display apparatuses according to the first and second embodiments.

In the display apparatus 150 according to Modified Example 1, the positions of the light L1 to L7 projected from the light projection unit 200b may be controlled so that light is radiated to a desired position on the retina 1 even when the line of sight is changed by using a sensor that detects the line of sight of the user (e.g., a sensor including a plurality of PDs or an image sensor).

12. Display Apparatus According to Modified Example 2 of Present Technology

Hereinafter, a display apparatus 250-1 according to Modified Example 2 of the present technology will be described with reference to FIG. 49. Here, the display apparatus 250-1 will be described only with reference to a horizontal cross-section. However, a similar discussion can be established also as to the vertical cross-section.

Figure 49:
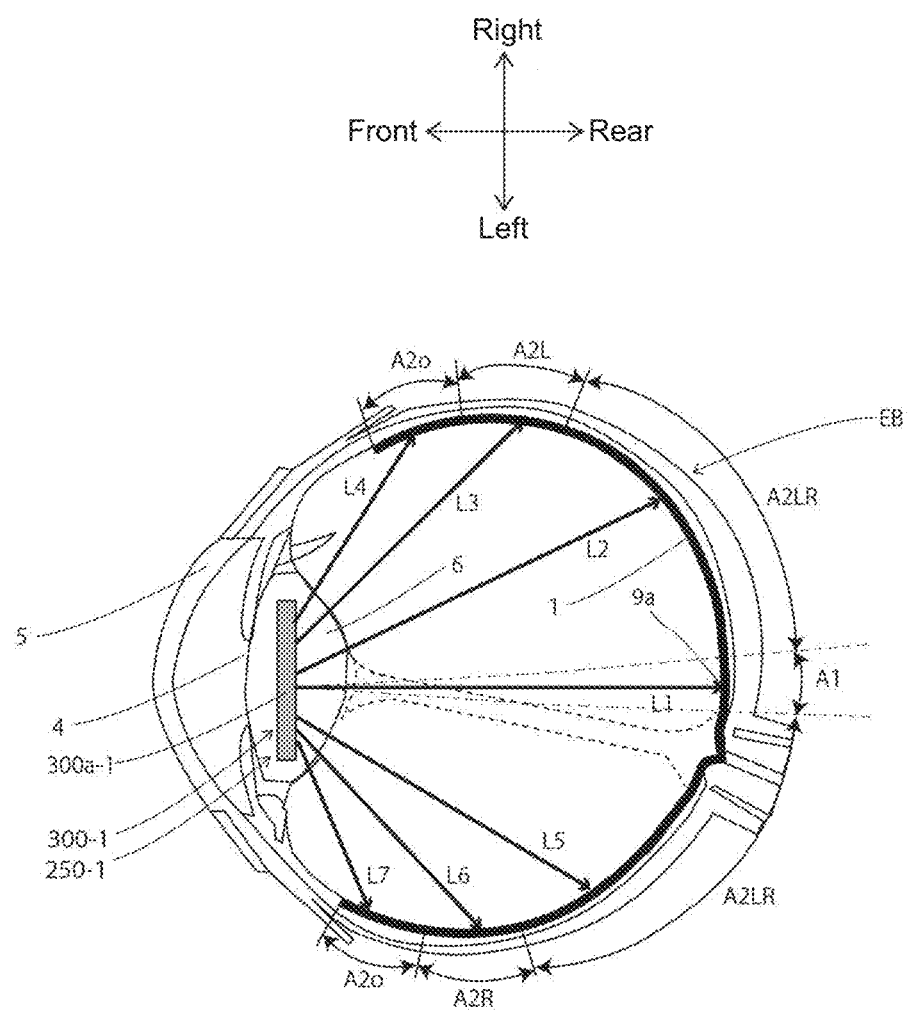
FIG. 49 A horizontal cross-sectional view for describing a display apparatus according to Modified Example 2 of the present technology.

In the display apparatus 250-1 according to Modified Example 2, a display element 300a-1 of an irradiation system 300-1 is implanted in the lens 6 as shown in FIG. 49.

The display element 300a-1 is implanted in the form of a substantially flat plate so as to face the pupil 4 at the center inside the lens 6.

Light L1 emitted from the display element 300a-1 is made incident on the first region A1.

Light L2 emitted from the display element 300a-1 is made incident on the first peripheral visual field corresponding regions A2LR on the right-hand side.

Light L3 emitted from the display element 300a-1 is made incident on the second peripheral visual field corresponding region A2L.

Light L4 emitted from the display element 300a-1 is made incident on the binocular visual field area outside corresponding regions Ao on the right-hand side.

Light L5 emitted from the display element 300a-1 is made incident on the first peripheral visual field corresponding regions A2LR on the left-hand side.

Light L6 emitted from the display element 300a-1 is made incident on the third peripheral visual field corresponding region A2R.

Light L7 emitted from the display element 300a-1 is made incident on the binocular visual field area outside corresponding regions Ao on the left-hand side.

The display element 300a-1 is capable of selectively emitting light of at least one of the light L1 to L7.

The display element 300a-1 may include, for example, a light source and a light deflector that deflects and scans light from the light source. This configuration is compatible with the image display of both the display apparatuses according to the first and second embodiments.

13. Display Apparatus According to Modified Example 3 of Present Technology

Hereinafter, a display apparatus 350-1 according to Modified Example 3 of the present technology will be described with reference to FIG. 50. Here, the display apparatus 350-1 will be described only with reference to a horizontal cross-sectional view. However, a similar discussion can be established also as to the vertical cross-section.

Figure 50:
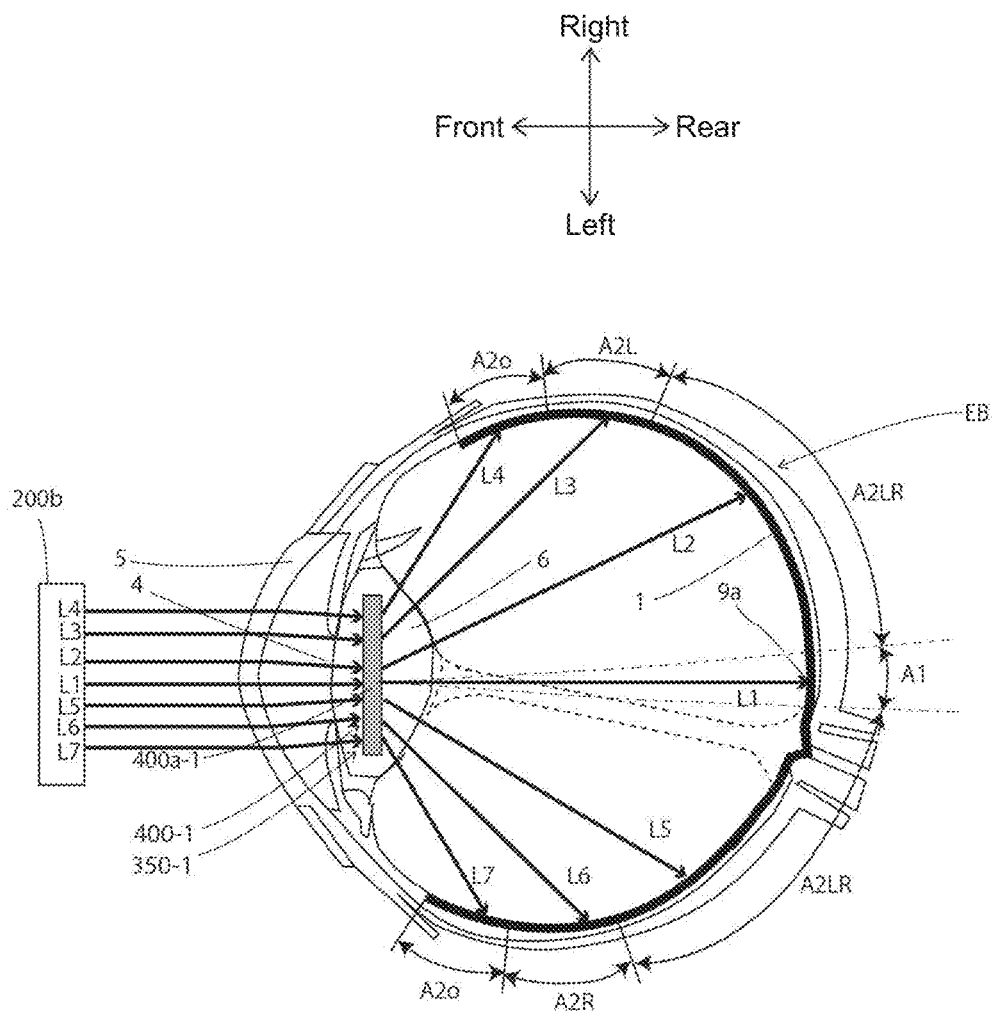
FIG. 50 A horizontal cross-sectional view for describing a display apparatus according to Modified Example 3 of the present technology.

In the display apparatus 350-1 according to Modified Example 3, an irradiation system 400-1 includes an optical element 400a-1 and a light projection unit 200b that projects light to the optical element 400a-1 as shown in FIG. 50.

The optical element 400a-1 of the display apparatus 350-1 according to Modified Example 3 is implanted in the form of a substantially flat plate so as to face the pupil 4 at the center inside the lens 6.

The optical element 400a-1 has, as an example, a refractive index distribution in which the refractive index for refracting incident light outward (a direction toward the peripheral portion from the center portion) increases toward the peripheral portion from the center portion. Moreover, as another example, in a case of using an optical element that diffracts an incident light beam, a light beam that enters the peripheral portion has an angle of diffracting outward larger than that of a light beam that enters the center portion of the optical element.

In FIG. 50, for example, a light beam L1 that is projected from the light projection unit 200b, passes through the cornea 5 and the pupil 4, enters the center position of the optical element 400a-1 travels straight inside the optical element 400a-1 as it is, and is made incident on the first region A1.

In FIG. 50, for example, light beams L2, L3, L4, L5, L6, and L7 that are projected from the light projection unit 200b and pass through the cornea 5 and the pupil 4 are respectively refracted by the cornea 5, pass through the pupil 4, and are made incident on the first peripheral visual field corresponding regions A2LR on the right-hand side, the second peripheral visual field corresponding region A2L, the binocular visual field area outside corresponding regions Ao on the right-hand side, the first peripheral visual field corresponding regions A2LR on the left-hand side, the third peripheral visual field corresponding region A2R, and the binocular visual field area outside corresponding regions A2o on the left-hand side.

The light projection unit 200b is capable of selectively projecting light of at least one of the light L1 to L7.

The light projection unit 200b may include, for example, a light source and a light deflector that deflects and scans light from the light source. This configuration is compatible with the image display of both the display apparatuses according to the first and second embodiments.

In the display apparatus 350-1 according to Modified Example 3, the positions of the light L1 to L7 projected from the light projection unit 200b may be controlled so that light is radiated to a desired position on the retina 1 even when the line of sight is changed by using a sensor that detects the line of sight of the user (e.g., a sensor including a plurality of PDs or an image sensor).

14. Display System According to Third Embodiment of Present Technology

Figure 51:
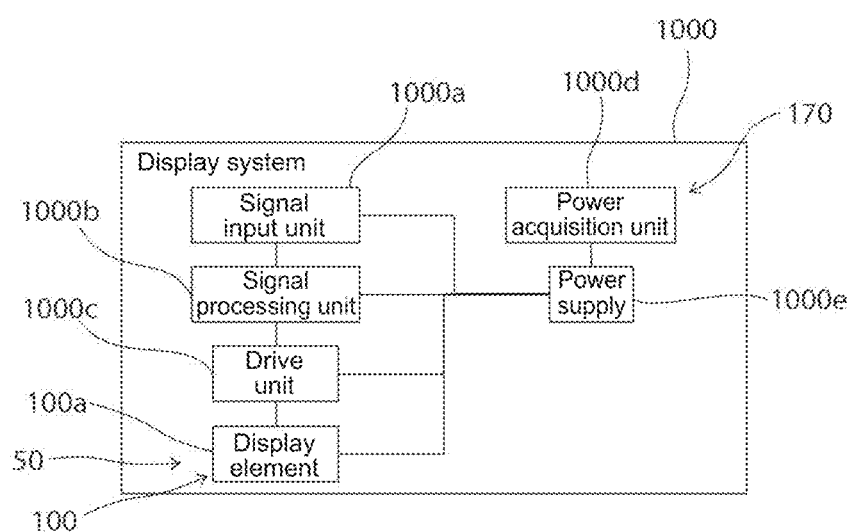
FIG. 51 A block diagram showing exemplary functions of a display system according to a third embodiment of the present technology.

Hereinafter, a display system 1000 that is an example of a display system according to a third embodiment of the present technology will be described with reference to FIG. 51. FIG. 51 is a block diagram showing functions of the display system 1000.

The display system 1000 includes a display apparatus 50 and a control apparatus 170. The control apparatus 170 includes, for example, a signal input unit 1000a, a signal processing unit 1000b, a drive unit 1000c, a power acquisition unit 1000d, and a power supply 1000e.

The signal input unit 1000a inputs a video signal from an external apparatus (e.g., a sensor).

The signal processing unit 1000b processes a video signal input via the signal input unit 1000a and generates a driving signal (modulation signal) for driving a display element 100a.

The drive unit 1000c applies the driving signal from the signal processing unit 1000b to the display element 100a and drives the display element 100a.

The power acquisition unit 1000d acquires electric power from the power supply 1000e in a wired or wireless manner and allocates electric power to the signal input unit 1000a, the signal processing unit 1000b, the drive unit 1000c, and the display element 100a.

The power supply 1000e may be a storage battery (e.g., a battery or a secondary battery) or may be a power generation supply.

It should be noted that the display system 1000 may include any one of the display apparatuses 50-1 to 50-8, 60-1 to 60-8, and 250-1 instead of the display apparatus 50.

Figure 52:
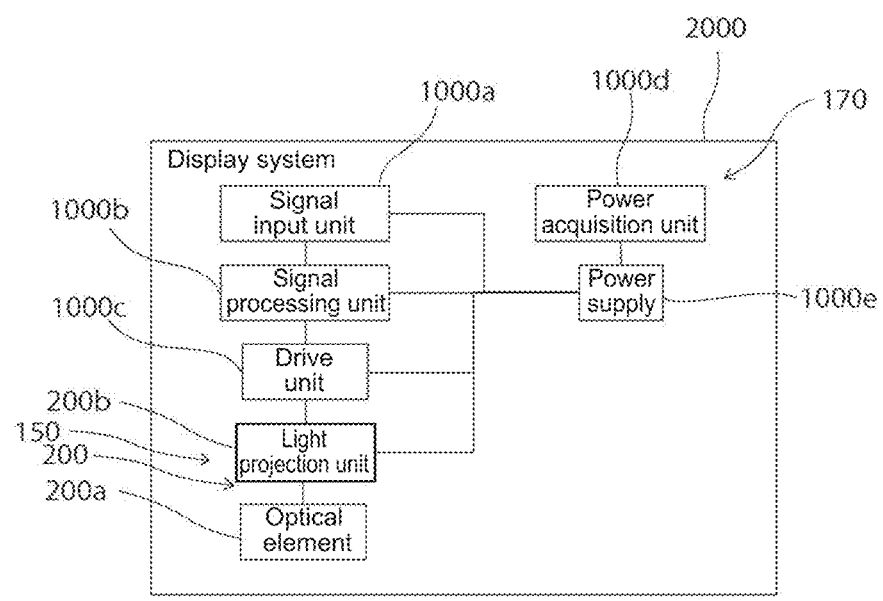
FIG. 52 A block diagram showing other exemplary functions of the display system according to the third embodiment of the present technology.

FIG. 52 is a block diagram of a display system 2000 that is another example of the display system according to the third embodiment of the present technology. The irradiation system 200 of the display apparatus 150 in the display system 2000 includes the optical element 200a and the light projection unit 200b as shown in FIG. 52.

The display system 2000 has configurations and functions similar to those of the display system 1000 shown in FIG. 51 except for the point that a driving target of the drive unit 1000c is the light projection unit 200b (more particularly, the light source of the light projection unit 200b).

It should be noted that the display system 2000 may include the display apparatus 350-1 instead of the display apparatus 150.

15. Other Modified Example of Present Technology

The display apparatuses according to the first and second embodiments described above can be modified as appropriate.

For example, the display apparatuses according to the respective examples and the respective modified examples of the first and second embodiments may be combined as appropriate in a reasonable range.

For example, as to the display apparatus according to the first embodiment, in short, it is sufficient that the light (display light) is radiated to at least a part, not limited to the entire regions of the respective regions (the central visual field, the first peripheral visual field corresponding region, the second peripheral visual field corresponding region, the third peripheral visual field corresponding region, and the binocular visual field area outside corresponding region) in the extended visual field area.

In the display apparatus according to each of the examples and the modified examples of the first and second embodiments, the irradiation system includes the element (display element or optical element) worn by or implanted in the left eye. However, in addition to or instead of this, the irradiation system may include the element (display element or optical element) worn by or implanted in the right eye.

It should be noted that the present technology can also take the following configurations.

(1) A display apparatus, including
an irradiation system that radiates light to at least a part of a second region outside a first region corresponding to a central visual field of a retina of at least one of both eyes of a user.

(2) The display apparatus according to (1), in which
the central visual field has a visual angle of 3 degrees or less.

(3) The display apparatus according to (1) or (2), in which
the central visual field has a visual angle of 6.5 degrees or less.

(4) The display apparatus according to any one of (1) to (3), in which
the first region is included in a fovea centralis of the retina.

(5) The display apparatus according to any one of (1) to (4), in which
a center of the central visual field substantially corresponds to a center of a fovea centralis of the retina.

(6) The display apparatus according to any one of (1) to (5), in which
a center of the first region substantially matches a center of a fovea centralis of the retina.

(7) The display apparatus according to any one of (1) to (6), in which
the second region is positioned outside a fovea centralis of the retina.

(8) The display apparatus according to any one of (1) to (7), in which
the irradiation system radiates the light only to at least the part of the second region.

(9) The display apparatus according to any one of (1) to (8), in which
the second region includes a peripheral visual field corresponding region on the retina, the peripheral visual field corresponding region corresponding to a peripheral visual field, and
the irradiation system radiates the light to at least the peripheral visual field corresponding region.

(10) The display apparatus according to (9), in which
the peripheral visual field corresponding region includes a region corresponding to areas in which visual field areas of the both eyes overlap each other, the areas excluding the central visual field, and
the irradiation system radiates the light to at least the region.

(11) The display apparatus according to claim (9) or (10), in which
the peripheral visual field corresponding region includes a region corresponding to an inside of a visual field area of one eye of the both eyes and an outside of a visual field area of another eye, and
the irradiation system radiates the light to at least a region of a retina of the one eye of the both eyes, the region corresponding to an inside of the visual field area of the one eye and an outside of the visual field area of the other eye.

(12) The display apparatus according to any one of (9) to (11), in which
the peripheral visual field corresponding region includes a region corresponding to an outside of a visual field area of one eye of the both eyes and an inside of a visual field area of another eye, and the irradiation system radiates the light to at least a region on the retina of the one eye of the both eyes, the region corresponding to an outside of the visual field area of the one eye and an inside of the visual field area of the other eye.

(13) The display apparatus according to any one of (1) to (12), in which
the second region includes a binocular visual field area outside corresponding region on the retina, the binocular visual field area outside corresponding region corresponding to an outside of visual field areas of the both eyes, and
the irradiation system radiates the light to at least the binocular visual field area outside corresponding region.

(14) The display apparatus according to any one of (9) to (12), in which
the second region further includes a binocular visual field area outside corresponding region on the retina, the binocular visual field area outside corresponding region corresponding to an outside of visual field areas of the both eyes, and
the irradiation system radiates the light to the peripheral visual field corresponding region and the binocular visual field area outside corresponding region.

(15) The display apparatus according to any one of (1) to (14), in which
the irradiation system also radiates light to the first region, and
a resolution of an image displayed by the light radiated to the second region is lower than a resolution of an image displayed by the light radiated to the first region.

(16) The display apparatus according to any one of (1) to (15), in which
the second region includes a peripheral visual field corresponding region on the retina, the peripheral visual field corresponding region corresponding to a peripheral visual field.

(17) The display apparatus according to (16), in which
the peripheral visual field corresponding region includes
a first peripheral visual field corresponding region corresponding to areas in which visual field areas of the both eyes overlap each other, the areas excluding the central visual field, and
a second peripheral visual field corresponding region corresponding to an inside of a visual field area of one eye of the both eyes and an outside of a visual field area of another eye,
the irradiation system radiates the light to the first peripheral visual field corresponding region and the second peripheral visual field corresponding region on the retina of the one eye of the both eyes, and
a resolution of an image displayed by the light radiated to the second peripheral visual field corresponding region is lower than a resolution of an image displayed by the light radiated to the first peripheral visual field corresponding region and/or the light that displays content simpler than content displayed by the light radiated to the first peripheral visual field corresponding region is radiated to the second peripheral visual field corresponding region.

(18) The display apparatus according to (16), in which
the peripheral visual field corresponding region includes
a first peripheral visual field corresponding region corresponding to areas in which visual field areas of the both eyes overlap each other, the areas excluding the central visual field, and
a third peripheral visual field corresponding region corresponding to an outside of the visual field area of the one eye of the both eyes and an inside of the visual field area of another eye,
the irradiation system radiates the light to the first peripheral visual field corresponding region and the third peripheral visual field corresponding region on the retina of the one eye of the both eyes, and
a resolution of an image displayed by the light radiated to the first peripheral visual field corresponding region is lower than a resolution of an image displayed by the light radiated to the third peripheral visual field corresponding region and/or the light that displays content simpler than content displayed by the light radiated to the first peripheral visual field corresponding region is radiated to the third peripheral visual field corresponding region.

(19) The display apparatus according to (16), in which
the peripheral visual field corresponding region includes
a second peripheral visual field corresponding region corresponding to an inside of a visual field area of one eye of the both eyes and an outside of a visual field area of another eye, and
a third peripheral visual field corresponding region corresponding to an outside of the visual field area of the one eye and an inside of the visual field area of the other eye,
the irradiation system radiates the light to the second peripheral visual field corresponding region and the third peripheral visual field corresponding region on the retina of the one eye of the both eyes, and
an image displayed by the light radiated to the second peripheral visual field corresponding region and an image displayed by the light radiated to the third peripheral visual field corresponding region are different from each other in resolution and/or simplicity of display content.

(20) The display apparatus according to (19), in which
the resolution of the image displayed by the light radiated to the second peripheral visual field corresponding region is lower than the resolution of the image displayed by the light radiated to the third peripheral visual field corresponding region and/or the content displayed by the light radiated to the second peripheral visual field corresponding region is simpler than the content displayed by the light radiated to the third peripheral visual field corresponding region.

(21) The display apparatus according to (19), in which
the resolution of the image displayed by the light radiated to the second peripheral visual field corresponding region is lower than the resolution of the image displayed by the light radiated to the third peripheral visual field corresponding region and/or the content displayed by the light radiated to the second peripheral visual field corresponding region is simpler than the content displayed by the light radiated to the third peripheral visual field corresponding region.

(22) The display apparatus according to any one of (16) to (21), in which
the second region further includes a binocular visual field area outside corresponding region on the retina, the binocular visual field area outside corresponding region corresponding to an outside of visual field areas of the both eyes,
the irradiation system radiates the light to the peripheral visual field corresponding region and the binocular visual field area outside corresponding region, and a resolution of an image displayed by light radiated to the binocular visual field area outside corresponding region is lower than a resolution of an image displayed by light radiated to the peripheral visual field corresponding region and/or content displayed by the light radiated to the binocular visual field area outside corresponding region is simpler than content displayed by the light radiated to the peripheral visual field corresponding region.
(23) The display apparatus according to any one of (1) to (22), in which
the irradiation system changes an irradiation area so that light radiated to one region on the retina is radiated to another region.
(24) The display apparatus according to (23), in which
the one region is a region on the retina in which a visual field of the user is not ensured, and
the other region is a region on the retina in which the visual field of the user is ensured.
(25) The display apparatus according to (24), in which
the region in which the visual field of the user is not ensured includes a visual field region lost due to a defect of the visual field.
(26) The display apparatus according to (24) or (25), in which
the region in which the visual field of the user is not ensured includes a region on the retina, the region corresponding to an outside of visual field areas of the both eyes.
(27) The display apparatus according to any one of (1) to (26), in which
the irradiation system includes a display element integrated with one eye of the both eyes and/or a display element integrated with another eye at least during use.
(28) The display apparatus according to (27), in which
the display element is a display element wearable on an eye.
(29) The display apparatus according to (27), in which
the display element is a display element implantable in an eye.
(30) The display apparatus according to any one of (27) to (29), in which
the display element is a self light emitting-type display element.
(31) The display apparatus according to any one of (27) to (29), in which
the display element includes a light deflector and a light source.
(32) The display apparatus according to (27) to (29), in which
the display element includes a liquid-crystal display unit and a light source.
(33) The display apparatus according to any one of (1) to (32), in which
the irradiation system includes
an optical element integrated with one eye of the both eyes and/or an optical element integrated with another eye at least during use, and
a light projection unit that projects light toward the optical element.
(34) The display apparatus according to (33), in which
the optical element is an optical element wearable on the eyes.
(35) The display apparatus according to (33), in which
the optical element is an optical element implantable in the eyes.
(36) The display apparatus according to any one of (33) to (35), in which
the light projection unit includes a light deflector and a light source.
(37) The display apparatus according to any one of (33) to (35), in which
the light projection unit includes a self-light-emitting element or a liquid-crystal display unit and a light source.
(38) A display system, including:
a display apparatus according to any one of (1) to (37); and
a control apparatus that controls the display apparatus.

REFERENCE SIGNS LIST

1: retina, 9: fovea centralis, 9a: center of fovea centralis, 50-1 to 50-8, 60-1 to 60-8, 150, 250-1, 350-1: display apparatus, 100, 200, 300-1, 400-1: irradiation system, 100a, 300a-1: display element, 200a, 400a-1: optical element, 200b: light projection unit, light L1 to L7, display light DL, DL1 to D4: light, CFV: central visual field, peripheral visual field: PeV, A1: first region, A2LR: first peripheral visual field corresponding region, A2L: second peripheral visual field corresponding region, A2R: third peripheral visual field corresponding region, A2i, peripheral visual field corresponding region, A2o: binocular visual field area outside corresponding region.

What is claimed is:

1. A display apparatus, comprising:
an irradiation system that radiates light to a first region corresponding to a central visual field of a retina of at least one of both eyes of a user and at least a part of a second region outside the first region, wherein the second region includes a first peripheral visual field region corresponding to areas in which visual field areas of both eyes overlap each other and excluding the central visual field and a second peripheral visual field region corresponding to an inside of a visual field area of one of both eyes and an outside of a visual field area of the other eye, wherein the irradiation system radiates the light to the first peripheral visual field region and the second peripheral visual field region on the retina of one of both eyes, wherein a resolution of an image displayed by the light radiated to the second region is lower than a resolution of the image displayed by the light radiated to the first region, and wherein a resolution of the image displayed by the light radiated to the second peripheral visual field region is lower than a resolution of the image displayed by the light radiated to the first peripheral visual field region.

2. The display apparatus according to claim 1, wherein the central visual field has a visual angle of 3 degrees or less.

3. The display apparatus according to claim 1, wherein the central visual field has a visual angle of 6.5 degrees or less.

4. The display apparatus according to claim 1, wherein the first region is included in a fovea centralis of the retina.

5. The display apparatus according to claim 1, wherein a center of the central visual field substantially corresponds to a center of a fovea centralis of the retina.

6. The display apparatus according to claim 1, wherein a center of the first region substantially matches a center of a fovea centralis of the retina.

7. The display apparatus according to claim 1, wherein the second region is positioned outside a fovea centralis of the retina.

8. The display apparatus according to claim 1, wherein the irradiation system radiates the light only to at least the part of the second region.

9. The display apparatus according to claim 8, wherein the second region includes a binocular visual field area outside region on the retina, the binocular visual field area outside region corresponding to an outside of the visual field areas of the both eyes, and wherein the irradiation system radiates the light to at least the binocular visual field area outside region.

10. The display apparatus according to claim 1, wherein the second region further includes a binocular visual field area outside region on the retina, the binocular visual field area outside region corresponding to an outside of the visual field areas of the both eyes, and wherein the irradiation system radiates the light to the peripheral visual field region and the binocular visual field area outside region.

11. The display apparatus according to claim 1, wherein the second region further includes
- a third peripheral visual field region corresponding to an outside of the visual field area of one of both eyes and an inside of the visual field area of the other eye,
- the irradiation system radiates the light to the first peripheral visual field region and the third peripheral visual field region on the retina of the one eye of the both eyes, and
- a resolution of an image displayed by the light radiated to the first peripheral visual field region is lower than a resolution of an image displayed by the light radiated to the third peripheral visual field region and/or the light that displays content simpler than content displayed by the light radiated to the first peripheral visual field region is radiated to the third peripheral visual field region.

12. The display apparatus according to claim 11, wherein the resolution of the image displayed by the light radiated to the second peripheral visual field region is lower than the resolution of the image displayed by the light radiated to the third peripheral visual field region.

13. The display apparatus according to claim 11, wherein the content displayed by the light radiated to the second peripheral visual field region is simpler than the content displayed by the light radiated to the third peripheral visual field region.

14. The display apparatus according to claim 11, wherein the second region further includes a binocular visual field area outside region on the retina, the binocular visual field area outside region corresponding to an outside of visual field areas of the both eyes, and
wherein the irradiation system radiates the light to the third peripheral visual field region and the binocular visual field area outside region, and
a resolution of an image displayed by light radiated to the binocular visual field area outside region is lower than a resolution of an image displayed by light radiated to the third peripheral visual field region and/or content displayed by the light radiated to the binocular visual field area outside region is simpler than content displayed by the light radiated to the third peripheral visual field region.

15. The display apparatus according to claim 1, wherein the irradiation system changes an irradiation area so that light radiated to one region on the retina is radiated to another region.

16. The display apparatus according to claim 15, wherein the one region is a region on the retina in which a visual field of the user is not ensured, and wherein the other region is a region on the retina in which the visual field of the user is ensured.

17. The display apparatus according to claim 16, wherein the region in which the visual field of the user is not ensured includes a visual field region lost due to a defect of the visual field.

18. The display apparatus according to claim 16, wherein the region in which the visual field of the user is not ensured includes a region on the retina, the region corresponding to an outside of visual field areas of the both eyes.

19. The display apparatus according to claim 1, wherein the irradiation system includes a display element integrated with one eye of the both eyes and/or a display element integrated with another eye at least during use.

20. The display apparatus according to claim 19, wherein the display element is a display element wearable on an eye.

21. The display apparatus according to claim 19, wherein the display element is a display element implantable in an eye.

22. The display apparatus according to claim 19, wherein the display element is a self-light emitting-type display element.

23. The display apparatus according to claim 19, wherein the display element includes a light deflector and a light source.

24. The display apparatus according to claim 19, wherein the display element includes a liquid-crystal display unit and a light source.

25. The display apparatus according to claim 1, wherein the irradiation system includes:
- an optical element integrated with one eye of the both eyes and/or an optical element integrated with another eye at least during use; and
- a light projection unit that projects light toward the optical element.

26. The display apparatus according to claim 25, wherein the optical element is an optical element wearable on the eyes.

27. The display apparatus according to claim 25, wherein the optical element is an optical element implantable in the eyes.

28. The display apparatus according to claim 25, wherein the light projection unit includes a light deflector and a light source.

29. The display apparatus according to claim 25, wherein the light projection unit includes a self-light-emitting element or a liquid-crystal display unit and a light source.

30. A display system, comprising:
- a display apparatus according to claim 1; and
- a control apparatus that controls the display apparatus.

* * * * *